US012737819B2

(12) United States Patent
Lewis-Weber et al.

(10) Patent No.: US 12,737,819 B2
(45) Date of Patent: Sep. 15, 2026

(54) INJURY ASSISTANCE MODEL

(71) Applicant: Assured Insurance Technologies, Inc., Stanford, CA (US)

(72) Inventors: Justin Lewis-Weber, Stanford, CA (US); Theo Patt, Stanford, CA (US)

(73) Assignee: Assured Insurance Technologies, Inc., Stanford, CA (US)

( * ) Notice: Subject to any disclaimer, the term of this patent is extended or adjusted under 35 U.S.C. 154(b) by 0 days.

(21) Appl. No.: 18/809,127

(22) Filed: Aug. 19, 2024

(65) Prior Publication Data

US 2026/0050986 A1 Feb. 19, 2026

(51) Int. Cl.
*G06Q 40/08* (2012.01)
*G06Q 30/015* (2023.01)

(52) U.S. Cl.
CPC ........... *G06Q 40/08* (2013.01); *G06Q 30/015* (2023.01)

(58) Field of Classification Search
None
See application file for complete search history.

(56) References Cited

U.S. PATENT DOCUMENTS 5,839,112 A 11/1998 Schreitmueller
6,246,954 B1 6/2001 Berstis
6,969,809 B2 11/2005 Rainey
7,359,821 B1 4/2008 Smith
7,392,201 B1 6/2008 Binns et al.
7,720,699 B2 5/2010 Santoloci
8,095,394 B2 1/2012 Nowak et al.
8,239,220 B2 8/2012 Kidd
8,712,893 B1 4/2014 Brandmaier
8,751,270 B1 6/2014 Hanson et al.
8,751,528 B2 6/2014 Huang
8,830,322 B2 9/2014 Nerayoff
8,848,879 B1 9/2014 Coughlan et al.
9,824,453 B1 11/2017 Collins
9,866,673 B2 1/2018 Gabel
9,870,609 B2 1/2018 Kompalli
9,898,619 B1 2/2018 Hadsall
9,904,928 B1 2/2018 Leise
10,360,601 B1 7/2019 Adegan
(Continued)

FOREIGN PATENT DOCUMENTS

CA 2502336 9/2006
CN 107194989 A 9/2017
(Continued)

OTHER PUBLICATIONS

S.A. Jebamani, et al., "Vehicular Assistance Using ML Algorithm", 2024 International Conference on Communication, Computing and Internet Things (IC3IoT), Chennai, India, 2024, pp. 1-6, doi: 10.1109/IC3IoT841. 10550406 (Year: 2024).
(Continued)

*Primary Examiner* — Christopher Bridges
(74) *Attorney, Agent, or Firm* — Mahamedi IP Law LLP

(57) ABSTRACT

A computing system can train an injury assistance model to provide individualized injury assistance to users involved in injury events. The system can receive incident data identifying an injury to a user. The system may then initiate the injury assistance model on the incident data to provide individualized injury assistance to the user while the user recovers from the injury.

8 Claims, 55 Drawing Sheets

(56) References Cited

U.S. PATENT DOCUMENTS

| | | | | |
|---|---|---|---|---|
| 10,417,816 | B2 | 9/2019 | Satzoda et al. | |
| 10,580,075 | B1 | 3/2020 | Brandmaier | |
| 10,657,824 | B1 | 5/2020 | Barth | |
| 10,867,285 | B2 | 12/2020 | Kelley | |
| 11,049,334 | B2 | 6/2021 | Zhang et al. | |
| 11,120,574 | B1 | 9/2021 | Tomlinson | |
| 11,127,087 | B1 | 9/2021 | Zankat et al. | |
| 11,188,411 | B1 | 11/2021 | Shen et al. | |
| 11,275,985 | B2 * | 3/2022 | Neumann | G06F 40/30 |
| 11,347,970 | B2 | 5/2022 | Anghel et al. | |
| 11,367,141 | B1 | 6/2022 | Wang et al. | |
| 11,430,069 | B1 | 8/2022 | Pedersen | |
| 11,769,356 | B2 | 9/2023 | Flanagan et al. | |
| 12,374,035 | B1 | 7/2025 | Lopez et al. | |
| 12,475,513 | B1 | 11/2025 | Stark et al. | |
| 2002/0007289 | A1 | 1/2002 | Malin | |
| 2003/0154111 | A1 | 8/2003 | Dutra | |
| 2004/0113783 | A1 | 6/2004 | Yagesh | |
| 2004/0183673 | A1 | 9/2004 | Nageli | |
| 2006/0103568 | A1 | 5/2006 | Powell | |
| 2006/0124377 | A1 | 6/2006 | Lichtinger | |
| 2006/0136273 | A1 | 6/2006 | Zizzamia et al. | |
| 2006/0267799 | A1 | 11/2006 | Mendelson | |
| 2007/0038480 | A1 | 2/2007 | Kay | |
| 2007/0164862 | A1 | 7/2007 | Dhanjal | |
| 2008/0052134 | A1 | 2/2008 | Nowak | |
| 2009/0033540 | A1 | 2/2009 | Breed | |
| 2009/0256736 | A1 | 10/2009 | Orr | |
| 2010/0067420 | A1 | 3/2010 | Twitchell, Jr. | |
| 2010/0073194 | A1 | 3/2010 | Ghazarian | |
| 2010/0100319 | A1 | 4/2010 | Trinko | |
| 2010/0106413 | A1 | 4/2010 | Mudalige | |
| 2010/0265104 | A1 | 10/2010 | Zlojutro | |
| 2010/0265325 | A1 | 10/2010 | Lo | |
| 2010/0271196 | A1 | 10/2010 | Schmitt | |
| 2011/0068954 | A1 | 3/2011 | McQuade | |
| 2011/0102232 | A1 | 5/2011 | Orr | |
| 2012/0029759 | A1 | 2/2012 | Suh | |
| 2012/0029764 | A1 | 2/2012 | Payne | |
| 2012/0062395 | A1 | 3/2012 | Sonnabend | |
| 2014/0025404 | A1 | 1/2014 | Jackson | |
| 2014/0052531 | A1 | 2/2014 | Kent et al. | |
| 2014/0081675 | A1 | 3/2014 | Ives | |
| 2014/0122133 | A1 | 5/2014 | Weisberg | |
| 2015/0039397 | A1 | 2/2015 | Fuchs | |
| 2015/0046342 | A1 | 2/2015 | Lee | |
| 2015/0112800 | A1 | 4/2015 | Binion et al. | |
| 2015/0221218 | A1 | 8/2015 | Downs et al. | |
| 2015/0287130 | A1 | 10/2015 | Vercollone | |
| 2016/0371785 | A1 | 12/2016 | Bray | |
| 2017/0048109 | A1 | 2/2017 | Kant et al. | |
| 2017/0162041 | A1 | 6/2017 | Downs et al. | |
| 2017/0186093 | A1 | 6/2017 | Jones | |
| 2017/0293894 | A1 | 10/2017 | Taliwal | |
| 2018/0053503 | A1 | 2/2018 | Ogunyoku et al. | |
| 2020/0210924 | A1 | 7/2020 | Ghosh et al. | |
| 2020/0219199 | A1 | 7/2020 | Rabinowitz | |
| 2020/0334928 | A1 | 10/2020 | Bourke et al. | |
| 2020/0364800 | A1 | 11/2020 | Fujii et al. | |
| 2020/0402327 | A1 | 12/2020 | Vijayan et al. | |
| 2021/0027387 | A1 * | 1/2021 | Westhues | G06Q 40/08 |
| 2021/0082554 | A1 * | 3/2021 | Kalia | G06N 3/0464 |
| 2021/0160459 | A1 | 5/2021 | Kuruvilla et al. | |
| 2021/0166323 | A1 | 6/2021 | Fields | |
| 2021/0264523 | A1 | 8/2021 | Schuster | |
| 2021/0264533 | A1 | 8/2021 | Feit | |
| 2021/0287297 | A1 | 9/2021 | Hayward | |
| 2021/0334767 | A1 | 10/2021 | Utke et al. | |
| 2021/0344798 | A1 | 11/2021 | Ginwala | |
| 2021/0366048 | A1 | 11/2021 | Westhues et al. | |
| 2021/0398683 | A1 | 12/2021 | Clifford et al. | |
| 2022/0005121 | A1 | 1/2022 | Hayward | |
| 2022/0172475 | A1 | 6/2022 | Hayman | |
| 2022/0270181 | A1 * | 8/2022 | Tyrrell | G06V 10/768 |
| 2022/0327235 | A1 | 10/2022 | Rakhimbekov et al. | |
| 2022/0392644 | A1 * | 12/2022 | Saliman | G16H 10/60 |
| 2023/0020642 | A1 | 1/2023 | Brandmaier | |
| 2023/0104795 | A1 | 4/2023 | Cassol et al. | |
| 2023/0110486 | A1 | 4/2023 | Patt | |
| 2023/0110710 | A1 | 4/2023 | Patt | |
| 2023/0113765 | A1 | 4/2023 | Patt | |
| 2023/0114918 | A1 | 4/2023 | Patt | |
| 2023/0115084 | A1 | 4/2023 | Byers | |
| 2023/0116639 | A1 | 4/2023 | Patt | |
| 2023/0208869 | A1 | 6/2023 | Bisht et al. | |
| 2023/0252233 | A1 | 8/2023 | Gutierrez et al. | |
| 2023/0268039 | A1 | 8/2023 | Tran | |
| 2023/0282350 | A1 | 9/2023 | Devore et al. | |
| 2023/0282358 | A1 | 9/2023 | Shah et al. | |
| 2023/0334438 | A1 | 10/2023 | Horstmann | |
| 2023/0353603 | A1 | 11/2023 | Shen | |
| 2023/0377047 | A1 | 11/2023 | Bouette | |
| 2024/0046361 | A1 | 2/2024 | Marlow | |
| 2024/0086734 | A1 | 3/2024 | Singh et al. | |
| 2024/0144812 | A1 | 5/2024 | Nayak et al. | |
| 2024/0153321 | A1 | 5/2024 | Kellett et al. | |
| 2024/0161204 | A1 | 5/2024 | Bien | |
| 2024/0163419 | A1 | 5/2024 | Watkins | |
| 2024/0281897 | A1 | 8/2024 | Patt | |
| 2024/0303745 | A1 * | 9/2024 | Fields | G06N 3/006 |
| 2024/0403596 | A1 | 12/2024 | Brannan | |
| 2024/0411782 | A1 | 12/2024 | Patt | |
| 2025/0022274 | A1 | 1/2025 | Malalur | |
| 2025/0045491 | A1 | 2/2025 | Reschka | |
| 2025/0166083 | A1 | 5/2025 | Fujii et al. | |
| 2025/0298987 | A1 | 9/2025 | Buchanan et al. | |

FOREIGN PATENT DOCUMENTS

| | | | | |
|---|---|---|---|---|
| CN | 108596047 A | 9/2018 | | |
| CN | 110570513 | 12/2019 | | |
| CN | 112434368 | 3/2021 | | |
| CN | 119006174 A | * | 11/2024 | G06Q 30/0185 |
| WO | WO 2018/0191421 | 10/2018 | | |
| WO | 2022178969 A1 | 9/2022 | | |
| WO | WO 2023/0205230 | 10/2023 | | |
| WO | WO-2023230075 A1 | * | 11/2023 | G16H 20/30 |

OTHER PUBLICATIONS

Gong CA, et al., "How to Implement Automotive Fault Diagnosis Using Artificial Intelligence Scheme", Micromachines (Basel), Aug. 24, 2022; 13(9): 1380. doi: 10.3390/mi13091380 PMID: 36144003; PMCID: PMC9502948 (Year: 2022).

ISR in PCT/US2025/042675 mailed Dec. 3, 2025.

Kharlamova, et al. "State-of-the-Art Review of Life insurtech Machine learning for underwriting decisions and a Shift Toward Data-Driven, Society oriented Environment". May 22, 2024, 2024 International Congress on Human-Computer Interaction, Optimization and Robotic Applications (HORA) , IEEE 2024, (Year 2024).

Sobhani, Amir, et al. A kenetic energy model of two-vehicle crash injury severity, Dec. 4, 2022.

* cited by examiner

200

Carrier Insured Policy Info Introduction

230

207

Let's go over the policy involved.

Continue

Press Enter

204

D-5454-6565

Reported by Jane Doe

Phone number not provided

Policy info not provided

Date not provided

Accident

Location not provided

INJURY ASSISTANCE MODEL

BACKGROUND

Software as a Service (Saas) providers offer client applications and products that enable access to software-based services and manage the physical and software resources used by the applications. SaaS providers can provide both native and browser applications to facilitate their various services.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
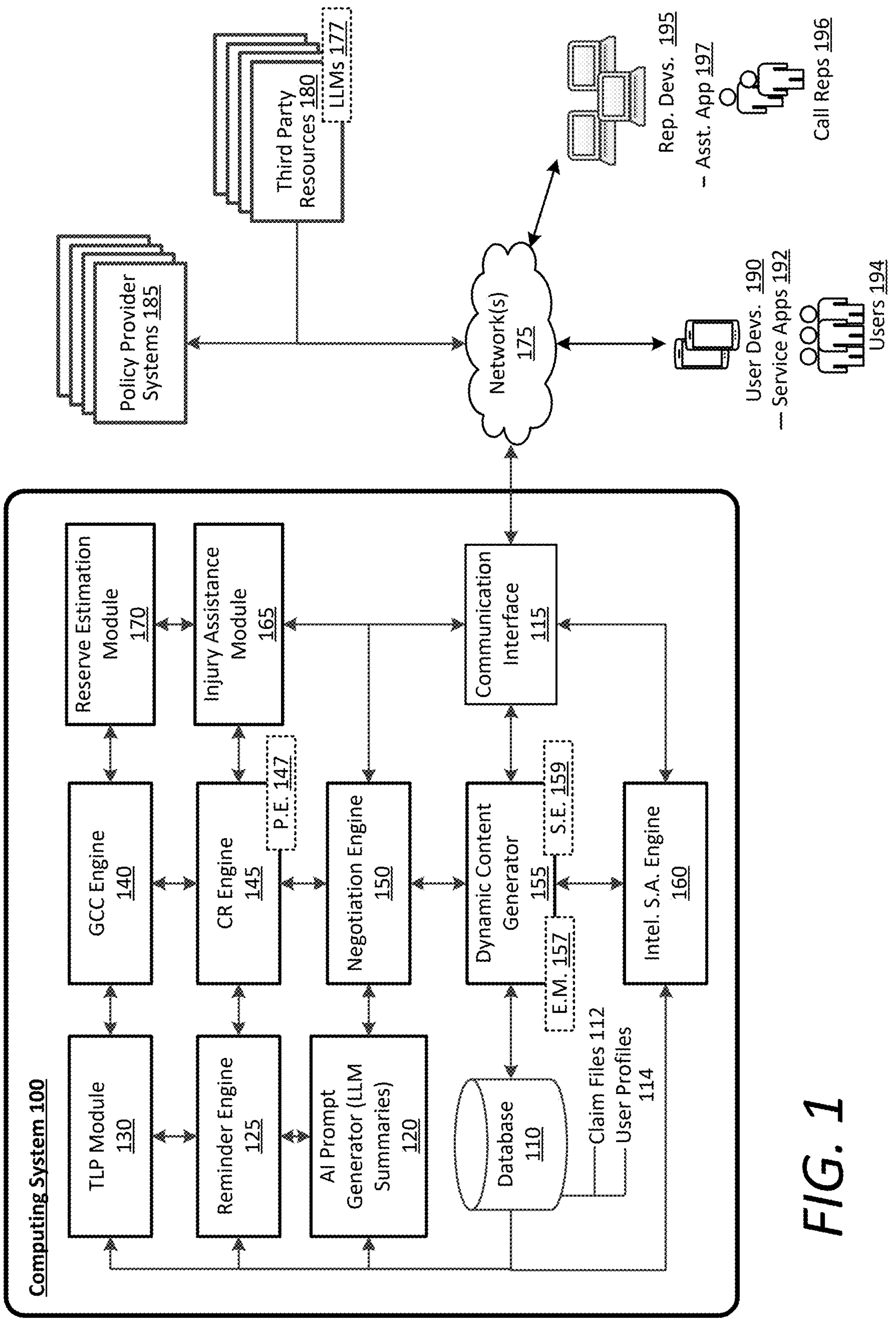
FIG. 1 is a block diagram illustrating an example computing system implementing a suite of SaaS operations, in accordance with examples described herein.

A computing system is described herein that provides computational resources for a Software as a Service (Saas) provider. The computing system implements a set of optimizations that results in more efficient usage of the computational resources, providing a set of application services that require less computing power and less energy than current implementations. These optimizations are correlated to optimizations in the service operations of the SaaS provider, which involve more efficient implementations of current services provided by current SaaS providers.

In various implementations, the computing system can operate to generate artificial intelligence (AI) prompts to transmit to one or more remote computing systems executing one or more large language models (LLMs) for providing LLM summarizations of individual corpuses of data. Each corpus of data can be compiled through various specialized computing modules and engines that communicate with computing devices of users and call center representatives, and that provide certain machine learning tools to optimize communications between these computing systems and devices. The result is more efficient and optimal usage of computational resources for the SaaS provider as well as the computing systems executing LLMs. As such, the various examples described herein achieve technical effects of optimizing both (i) communications between computing systems and devices, and (ii) the usage of computer hardware in the various computing systems and devices.

In various examples described herein, a computing system of the SaaS provider can generate structured, machine-readable data based on user information provided through optimized claim processes in connection with claim events, such as a vehicle collision, injury event, or property damage event. The computing system can further augment the provided data with data from various contextual sources, such as satellite data sources, weather data sources, construction records, traffic data sources, historical data sources (e.g., accident history, crime statistics and trends, previous accident data, traffic incident data for road portions or intersections, etc.), property statistics, vehicle databases, and the like.

The optimized claim processes involve information gathering, augmentation, and AI and deep-learning support to provide policy providers with an efficient and streamlined claim handling process. The optimized claim processes can involve real-time communications with native and/or browser applications executing on computing devices of users and call center representatives to aid users in the information gathering process corresponding to a claim event. The real-time communications can provide call center representatives with an assistance interface that includes dynamic scripting and dynamic content flows that guide the call center representatives and users through the information gathering process. The assistance interface also provides the call center representative with assistive tools that enable the representative to navigate and jump to individual portions or groupings of the content flow, as well as acceleration and search tools to expedite inputs provided by the call center representative via the assistance interface.

The optimized claim processes can further include guided content capture for the user in submitting real-time photo and/or video content of any damage (e.g., vehicle damage and/or property damage) or injuries to the user. This guided capture process can be performed through independent application sessions by the user, or through call sessions between the user and one or more call center representatives (e.g., via the content flow provided on the assistance interface presented on the call center representative's computing device). The computing system can further perform machine-learning content engagement monitoring techniques and individualized content flow adaptation techniques to increase user engagement of the content flows to further expedite the information gathering process, as described in detail herein. In further implementations, the computing system can perform machine learning reminder techniques to dynamically adapt, on an individual basis, reminder strategies comprising the methods (e.g., email, SMS, phone call, etc.), cadence or timing, and the content or styling of individual reminders to further induce user engagement with content flows or call representatives in the information gathering process.

The computing system can further perform machine-learning computer vision techniques in the guided content gathering process to assist the user in capturing images and/or video, as well as assessing damage and/or injury severity in the captured content. Such techniques may be performed for determining whether repair or replacement of individual parts of a vehicle is required, whether the vehicle is repairable or totaled, intelligent rankings or assignments of service providers in connection with vehicle or property damage (e.g., towing providers, damage repair providers, scrapyards, construction or home service providers, etc.), generating repair or replacement estimates, and performing fraud detection.

For examples in which a vehicle incident occurs, the computing system can obtain a corpus of information related to the incident from the driver, claimant, passenger(s), witnesses, and the like, and can further cascade the information gathering based on information provided by other individuals identified by the original set of individuals. The computing system can contact each of these individuals through various means, and can further leverage the engagement monitoring, reminder strategy, and adaptive content flow techniques described herein for each of these individuals to maximize information gathering for the vehicle incident. These techniques are not limited to vehicle incidents, but may also be performed for any information gathering process involving an event, such as an injury event, property damage event, catastrophic weather or disaster event, and the like. When the corpus of information is gathered for a particular incident (e.g., a claim event that may correspond to a subsequent claim filing), the computing system can generate an event reconstruction and LLM summarization of the incident. For a vehicle incident, the reconstruction can include a collision simulation that utilizes the speed and trajectory of the user's vehicle and any other vehicle involved, and can be generated in a simulated location that corresponds to the actual location of the incident (e.g., using satellite imagery of the collision location). In various examples, the computing system can generate an AI prompt and feed an AI model with the corpus of information to obtain the LLM summarization of the incident (e.g., a single sentence to four sentence summary). In certain examples, the computing system can provide the AI model with all or a selected portion of the corpus, and/or can utilize machine learning to generate the AI prompt that will return the most effective LLM summarization of the incident. Further description of LLM summarization techniques is described in detail below.

In various examples, the computing system can further perform the information gathering process for a single incident (e.g., a vehicle incident) or multiple related incidents (e.g., property damage of multiple properties resulting from a single storm) to generate a highly accurate reserve estimate. This reserve estimate can be generated for a single policy provider for a single incident, or multiple reserve estimates may be generated for multiple policy providers based on their individual exposure risks resulting from the incident. For example, the computing system can perform an optimized information gathering process for a single vehicle incident involving two cars, obtain contextual information directly from passengers, drivers, and/or witnesses, augment this contextual information with information from any number of third-party resources (e.g., determine the weather and road conditions at the time of the incident from a weather service, determine the accident history of each driver, determine the accident history at the incident location, determine the right-of-way rules and speed limit(s) at the incident location, determine the time-of-day of the incident, etc.), obtain evidence of vehicle damage from relevant users (e.g., using the guided content capture process), optionally perform image analysis on images and video of the damage to determine estimate repair and/or loss costs due to the incident. The computing system may then process all the information to generate a reserve estimate for a policy provider of each vehicle owner involved in the incident, and/or policy providers of any individuals injured due to the incident.

For incidents involving personal injuries, the computing system can further perform machine-learning investigative techniques to both check in on the injured user and ensure that the injured user achieves a stable state with regard to the injury (e.g., the user fully heals), and to determine whether the nature of the injury is consistent with the information provided by the user and any other witnesses to the injury. Using all injury data for a particular user, the computing system can initiate an automated negotiator to negotiate a settlement with the user. The automated negotiation techniques described herein can utilize the corpus of information from the information gathering process, simulation data from the incident, photographic or video analysis data showing and/or estimating the damage resulting from the incident, reserve estimate information based on the incident, and the injury investigation process to generate a settlement negotiation strategy for the user. This strategy can further leverage the reminder engine to communicate with the user strategically (e.g., to provide the user with most effective communication methods, cadence, and content) to induce responsiveness. The injury investigation and settlement negotiation techniques described herein may be performed for injury incidents, property damage incidents, and/or vehicle collision incidents.

Examples described herein achieve a technical solution of optimizing information gathering processes, particularly for insurance claims and claim processing for insurance policy providers, in furtherance of a practical application of reducing time from an initial incident to the final step in the claim process (e.g., a settlement or payout). The technical solutions achieved by the various embodiments described herein also involve significantly reduced computing time using machine-learning techniques and LLM summarization that also significantly reduce claim processing time, automating previously time-consuming manual procedures that have been observed to cause frustration in policy holders and inefficient delays for policy providers. The SaaS provider implementing the techniques described herein can comprise a single intervening entity between policy holder and policy provider that utilizes deep-learning and artificial intelligence technologies to achieve significant efficiencies in the information gathering and claim administration processes.

As used herein, a computing device refers to devices corresponding to desktop computers, smartphones or tablet computing devices, laptop computers, virtual reality (VR) or augmented reality (AR) headsets, etc., that can provide network connectivity and processing resources for communicating with a computing system over one or more networks. The computing device can also operate a designated application or initiate a browser application configured to communicate with the network services described herein.

One or more examples described herein provide that methods, techniques, and actions performed by a computing device are performed programmatically, or as a computer-implemented method.

Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, tablet computers or smartphones, laptop computers, VR or AR devices, or network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples include processors and various forms of memory for storing data and computer-executable instructions (including machine learning instructions and/or artificial intelligence instructions).

Examples of computer-readable mediums include permanent memory storage devices, such as hard drives on personal computers or servers. Other examples of computer storage mediums include portable storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer programs, or a computer usable carrier medium capable of carrying such a program.

Examples provided herein can involve the use of machine-learning or machine-learned computer models that are trained using historical and/or real-time training data to mimic cognitive functions associated with humans, such as learning, problem-solving, and prediction, and can comprise computer models trained using unsupervised, supervised, and/or reinforcement learning techniques. The computer models may further comprise artificial neural networks comprising interconnected nodes akin to networks of neurons in the human brain, predictive models comprising one or more decision trees, support vector machines for classification and regression processes, regression analysis models, Bayesian network or Gaussian processing models, and/or federated learning models that perform one or more computing techniques described herein.

Such machine learning models may further be support, combined, or augmented with the use of artificial intelligence (AI) systems (e.g., executing on backend computing systems or third-party computing systems) that implement large language models (LLMs) to achieve generative AI or automated text generation. Such models may provide text, image, video, simulations, and/or augmented reality outputs based on AI prompts that can be configured or fine-tuned for effectiveness using one or more machine-learning techniques described herein.

System Description

FIG. 1 is a block diagram illustrating an example computing system implementing a suite of SaaS operations, in accordance with examples described herein. In various examples, the computing system 100 can include a communication interface 115 that enables communications, over one or more networks 175, with computing devices 190 of users 194 of the various services described throughout the present disclosure. The computing devices 190 of the users 194 can execute one or more service applications 192 (e.g., native and/or browser applications) that provide access to the services implemented by the computing system 100. The communication interface 115 further enables communications with computing systems of policy providers 185 and other third-party resources 180 (e.g., real estate databases, tax record databases, insurance record databases, criminal records databases, medical record databases, weather resources, satellite data resources, traffic data resources, vehicular accident history databases, LLM service provides, etc.).

In various examples, the computing system 100 can provide users 194 with a data input service in which users can provide data related to an event (e.g., via a native and/or browser application 192). These events can comprise injury events, collision events involving one or more automobiles, and/or property damage events in which the user's property has been damaged (e.g., by a weather event or natural disaster). In certain implementations, the users 194 can initiate a communication session, such as a first notice of loss (FNOL) session, to provide information related to these events to the computing system 100. For example, the computing system 100 can acquire data related to these events over time and optimize a set of processes for mitigating loss arising from such events. As provided herein, an FNOL session or FNOL filing can comprise an initial communication by a user 194 indicating that a claim process is being initiated, and can further provide an initial report to an insurance provider following loss, theft, or damage of an insured asset.

In certain implementations, the computing system 100 can include a dynamic content generator 155 that can detect when a user 194 initiates an information gathering process via one or more application sessions to provide details of an incident, such as an automobile collision, injury event, or property damage event. In certain implementations, the dynamic content generator 155 can progress the information gathering process based on a ruleset (e.g., from an insurance policy provider of the user 194 and/or government regulations), and can involve extensive information gathering steps that may involve call sessions with policy provider representatives, submission of evidence (e.g., photo evidence, video evidence, medical records, contractor receipts or estimates, body shop repair receipts or estimates, etc.), statements from the user 194 and/or witnesses, and the like. Commonly, users initiate the information process but do not complete the process in a single session, or may lapse on one or more steps of the information gathering process.

As provided herein, a user 194 can comprise any individual that initiates a communication session with the computing system 100 or a call representative, or receive communications from the computing system 100 or a call representative 196. Accordingly, the user 194 can comprise a claimant that initiates a claim process based on a claim event to ultimately receive a compensatory payment for damage, loss, and/or injury resulting from the claim event. The user 194 may further comprise any witness or third-party to a particular claim event, such as a passenger in a vehicle during a collision, a witness to the event, a participant in the event, or an expert (e.g., accident reconstruction expert, medical professional giving an assessment of an injury, and the like).

In various implementations, the user 194 can operate a computing device 190, such as a desktop computer, laptop, tablet computer, or smartphone to launch an application 192 associated with an automated claims processing service implemented by the computing system 100. The application 192 can establish real-time communications between the dynamic content generator 155 of the computing system 100 and the computing device 190 of the user 194. According to examples described herein, the dynamic content generator 155 can generate a content flow comprising a series of user interface pages that provide the user with questions and instructions to provide answers, information, documentation, and/or photo or video content relevant to the incident.

In certain implementations, the dynamic content generator 155 can execute an engagement monitor 157, which can comprise a machine-learning model trained on responsiveness data from a population of users to determine the most effective manner and form of communication(s) to each individual user. As provided herein, effectiveness in terms of responsiveness can involve encouraging or otherwise inducing users on an individual basis to respond to individually tailored communications by performing one or more information gathering tasks, such as performing guided photo capture tasks or engaging with a call representative to progress through an information gathering content flow. The engagement monitor 157 can be trained to determine general behavioral traits based on a user's age, demographic information, home location or area, technological competence or skill, and the like, to determine various communication methods (e.g., text, SMS, email, phone call, etc.), communication times, cadence of communications, and/or content of communications (e.g., basic text, stylized content, email or text links to user interface pages comprising interactive content, etc.).

The individual communication strategies and method(s) for a particular user can be created by the dynamic content generator 155 using machine learning techniques based on an initial dataset comprising the user's age, gender or sex, demographics, home location or area, policy information, etc., and may be refined based on the actual responsiveness of the user 194 to the various forms and methods of communications. Accordingly at any stage in the information gathering process, the dynamic content generator 155 can update and implement content flow strategies to facilitate increased responsiveness in communications with the user's computing device 190 (e.g., via one or more service applications 192) over one or more application sessions. Such methods can result in less overall communications with policy holders of any number of policy providers across an entire population, thereby reducing required bandwidth on communication networks.

As an example, when a vehicle incident occurs, the dynamic content generator 155 can obtain a corpus of information related to the incident from the user 194, who may identify one or more passengers or witnesses. The dynamic content generator 155 can the make first contact with these individuals, who may identify other individuals, which causes the dynamic content generator 155 to cascade the information gathering based on information provided by these other individuals, as identified by an original set of individuals. The computing system can contact each of these individuals through various means, and can further leverage the engagement monitoring, reminder, and adaptive content techniques described herein for each of these individuals to maximize information gathering for the vehicle incident or other claim events. As such, the dynamic content generator 155 can facilitate a network effect in which information is gathered and corroborated from maximal sources.

In various examples, the computing system 100 can include a reminder engine 125 that can utilize the same user-specific data to generate individualized reminder strategies for each user 194. In certain examples, the user-specific information can be stored in a user profile 114 of the user 194 in a database 110 of the computing system 100. The user profile 114 can include data obtained from the engagement monitor 157 executed by the dynamic content generator 155 (e.g., a trained machine learning model) that processes various responsiveness metrics of the user 194 to determine the most effective methods of communicating with the user 194, including the timing of communications, the type of communications (e.g., SMS message, phone call, email, etc.), and the styling of the communications (e.g., font, font weight, styling features, content features, etc.). The reminder engine 125 can be initiated by the computing system 100 to implement the individualized and optimized reminder strategy to induce the user 194 to complete one or more steps of the information gathering process. In certain examples, the optimized reminder strategy can be tailored to maximize (i) an individual conversion rate of the user, and (ii) individualized satisfaction of the user in completing the claim process or a content flow of the claim process.

In further examples, the dynamic content generator 155 can link with a computing device 195 of a call center representative 196 to further engage with the user 194 in completing the information gathering process. For example, the individualized reminder strategy for the user 194 can include a phone call from a call center representative 196 to facilitate obtaining necessary information from the user 194 to, for example, complete a claim file 112 for the claim event and provide the claim file 112 to a policy provider of the user 194. In such implementations, the dynamic content generator 155 can communicate, in real time, with an assistance application 197 (e.g., native application or browser application) executing on a computing device 195 of a call center representative 196 to provide an assistance interface to assist the call center representative 196 in the call session with the user 194.

As an example, the user 194 may initiate a first notice of loss on the user's computing device 190 via one or more application sessions and begin, but not complete, an information gathering process for a claim event (e.g., a vehicle collision). The dynamic content generator 155 can automatically save a state of a claim file 112 corresponding to the information gathering process for the user 194, such that the user 194 does not need to repeat any portion of the information gathering process. In certain examples, a call center representative 196 may be informed by the computing system 100 that a claim file 112 has been started by a particular user 194. The call center representative 196 may initiate a call session with the user 194 and view the assistance interface presented via execution of the assistance application 197, which may reflect the current state of the claim file 112 to enable the information gathering process to proceed based on the information already provided by the user 194. As provided herein, the dynamic content generator 155 can cause the assistance interface to be generated on the display screen of the call center representative's computing device 195 and implement dynamic scripting that provides the call center representative 196 with a real-time script to read during the call session with the user 194.

In certain implementations, the call center representative 196 may be required to authenticate the user 194, which may be performed using any number of techniques (e.g., two-factor authentication). In one example, the call representative 196 can select a caller authentication feature on the assistance interface. Upon selecting the caller authentication feature, the communication interface 115 of the computing system 100 can transmit a link (e.g., via email or text message) to the user's computing device 190. The user 194 may then select the link, which can trigger the computing system 100 to authenticate the user 194 and provide the call representative 196 with an indication that the user 194 has been authenticated.

In variations, a code (e.g., a set of numbers, letters, and/or symbols) may be transmitted to the user's computing device 190 (e.g., via text message or email). The user 194 can read the code to the call representative 196, who may then key in the code on the assistance interface to authenticate the user 194. In further variations, speech-recognition may be employed by the computing system 100 to detect the user's speech when reading the code to automatically authenticate the user 194, or the code may be selectable to automatically transmit an authentication response to the computing system 100 (e.g., via text or email) to authenticate the user 194.

In various examples, the dynamic content generator 155 can execute a dynamic scripting engine 159 to communicate with the assistance application 197 executing on the computing device 195 of the call representative 196 to provide a dynamic script to the call representative 196. The dynamic script can be presented in concert with a set of interactive user interface features that enable the call representative 196 to provide inputs corresponding to the user's answers, comments, and responses during the call session. As provided herein, the dynamic scripting engine 159 can adapt the dynamic script presented on the assistance interface based on the progression of the call session. In some embodiments, the dynamic scripting engine 159 can be triggered to update the dynamic script based on inputs provided by the call representative 196.

Additionally or alternatively, the dynamic scripting engine 159 can utilize voice-recognition or speech-recognition technology to monitor the actual speech of the call session, and update the script accordingly. For example, when the user 194 mentions the word "injury," the dynamic scripting engine 159 can update the dynamic script for the call representative 196 to ask the user 194 about the user's injuries. Simultaneously, either based on call representative input or via speech-recognition, the dynamic content generator 155 can update the content flow presented on the assistance interface to automatically navigate to an "injury" sub-flow or grouping. Thereafter, the call center representative 196 can simply follow the dynamic script and sub-flow of the "injury" grouping, provide inputs on the assistance interface based on the user's answers and/or comments, and progress the sub-flow until the injury grouping is completed. The dynamic content generator 155 and scripting engine 159 may then return to the current state of the original content flow. Further description and illustration of the assistance interface, dynamic scripting, and content flow navigation is provided below.

As provided herein, the assistance interface presented on the computing device 195 of the call representative 196 can be dynamically updated based on inputs provided by the call representative 196 during the call session, which can correspond to information provided by the user 194. The assistance interface can further comprise an initial content flow that includes multiple sub-flows or groupings combined with the dynamic scripting that guides the call representative 196 through the information gathering process. Based on the progress of the call session, the initial content flow can be dynamically adapted, and the call representative 196 can navigate to any grouping of the content flow. Each of these groupings can include their own sub-flows, which can be completed based on information received during the call session. In various examples, each sub-flow can comprise a series of pages that correspond to a particular topic, such as the location of an incident, policy information, personal injury details, vehicle details, vehicle damage information, property damage information, caller verification, and the like.

In certain scenarios, a call session may be ended by the call representative 196 or user 194 without completing the information gathering process (e.g., the user's phone runs out of battery power), in which case the dynamic content generator 155 automatically saves the current state of the process, which can correspond to the saved claim file 112 in the database 110. Thereafter, the user 194 has the option of completing the information gathering process independently via one or more application sessions (e.g., using service application 192) or via one or more subsequent call sessions with a call representative 196. The subsequent call session(s) may be performed with the same representative or a different representative, and the assistance interface can provide the call representative 196 with the current state of the claim file 112 (e.g., indicating the sub-flows that have been completed), and can further include the dynamic script that enables the call representative 196 to seamlessly start the call session where the previous call session ended. In such an example, the call representative 196 can authenticate the user 194 again (e.g., via two-factor authentication or transmitted code), and a new call session may be initiated at the same state as the state in which the previous call session ended.

In various examples, the content flow of the assistance interface can be dynamically changed depending on subject-matter initiated by the user 194, or subject-matter initiated by the call representative 196. Certain topics can be considered "island" topics that are not initiated by the call representative 196, and therefore are not necessary to complete the information gathering process. However, when the user 194 initiates an island topic, the call representative 196 may select the topic from a command menu in the assistance interface (e.g., a "command K" feature), which can cause the content flow presented on the assistance interface to automatically navigate to a sub-flow corresponding to the island topic. The call representative 196 and user 194 may then progress the call session through the sub-flow to obtain all information related to the island topic. Thereafter, the assistance interface can automatically return to a stopping point or pause point of the initial content flow and dynamic script.

For example, an island topic can comprise information that is not necessary to complete a claim for a policy provider of the user 194. Such information can include whether the user 194 is represented by an attorney, whether the user 194 has additional related insurance, any pre-existing conditions of the user 194, previous injuries of the user 194, any criminal history of the user 194, and the like. Certain island sub-flows may be completed based on the user's initiation, and other sub-flows corresponding to island topics may remain unfilled or uncompleted based on the user 194 not mentioning these island topics.

In various examples, the assistance interface presented via executed of the assistance application 197 on the computing device 195 of the call representative 196 can provide the call representative 196 with accelerator features that enable the call representative 196 to quickly provide input and navigate to different user interface pages of a particular sub-flow or the overall content flow. These accelerator features can comprise keyboard keys that enable the call representative 196 to select individual keys to quickly select interactive features on the assistance interface as opposed to requiring mouse scrolling and click inputs. Accordingly, the dynamic content generator 155 can configure individual interactive buttons or features on the assistance interface to include dual input functions, such that the call representative may select such buttons or features using both a mouse and via a designated accelerator (e.g., keyboard key "1") that is associated with the same button or feature.

Accordingly, the call representative 196 has the option of using a standard mouse-over/click input or accelerator input for various interactive features on the assistance interface. It is contemplated that these accelerator inputs can significantly aid the call representative 196 when the call session is progressing quickly, and can therefore increase the speed and efficiency of call sessions in general. Further description of accelerator features in connection with the assistance interface is provided below.

In certain implementations, upon authenticating the user's phone number during a call session, the call representative 196 may still be required (e.g., by regulation or policy provider rules) to verify the user 194, which may require the user 194 to provide additional identifying information. For example, policy provider rules and/or government regulations may include privacy provisions that prevent discussion of policy details until certain information from the user 194 has been verified. This information may comprise a checklist, or can comprise a verification level of differing information that amounts to verification of the user 194. These rulesets can be quite complex, and the assistance application 197 can be programmed to withhold information from the user 194 until the caller verification threshold has been met.

For example, upon validating the user's phone number (e.g., via two-factor authentication), the dynamic script can instruct the call representative 196 to ask the user 194 whether the user 194 approves of text updates or emails about the claim and/or whether the computing system 100 can verify the location of the user 194. If so, the computing system 100 can link with the computing device 190 of the user 194, access location-based resources of the computing device 190, and verify the location of the user 194. When the location of the user 194 is verified, the assistance interface can be updated on the computing device 195 of the call representative 196 to indicate such. Additional information may be required for verification before discussing policy details, such as a policy number from the user 194, a VIN of the user's vehicle, the user's social security number, the year, make, model, and/or color of the user's vehicle, the user's date of birth, the name of a family member of the user 194, and the like.

Once enough information is verified to meet or exceed the verification threshold, and indication may be provided on the assistance interface, and the call representative 196 may proceed with discussing the privacy-protected information (e.g., policy information) with the user 194 and progress the information gathering process through privacy-protected sub-flows. For example, upon being verified, the user 194 may be asked to launch a mobile application or browser application associated with the computing system 100, and may further be requested to upload documents, photos, provide consent signatures (e.g., an e-signature), and/or provide inputs on a vehicle collision interface and/or injury interface.

In various examples, the assistance interface presented on the computing device 195 of the call representative 196 may further include an intelligent search box that performs automated categorization based on character-by-character inputs by the call representative 196. It is contemplated that call sessions may progress quickly due to, for example, practical time constraints of the user 194. Accordingly, every second of time saved on the part of the call representative 196 can result in significant efficiencies in completing information gathering processes for any number of claim events.

According to examples provided herein, the dynamic content generator 155 can monitor and process call representative inputs in the intelligent search box in real-time, and automatically filter a catalog of possible results based on each character inputted by the call representative 196. For example, the database 110 can include user profiles 114 of individuals that have utilized the information gathering services in connection with policy providers and insurance claims, or the computing system 100 can link with databases in the policy provider computing systems 185 in real-time to filter information based on the character-by-character inputs of the call representative 196. In certain examples, the dynamic content generator 155 can cause the assistance interface to display a dynamic menu of categorized options that is filtered based on each character inputted by the call representative 196. For example, when the call representative inputs a number, the dynamic content generator 155 or assistance application 197 can filter out all names from the dynamic menu. When the string of characters inputted by the call representative is inconsistent with category (e.g., a name, address, policy number, identified vehicle, VIN, etc.), the dynamic content generator 155 or assistance application 197 can filter out the entire category.

When a string of characters is inputted by the call representative 196 in the intelligent search box, the dynamic menu is updated, and the call representative 196 may select from any of the filter options listed in the dynamic menu. For example, the call representative 196 may key in a string of numbers that correspond to the user's phone number. After each character, the dynamic menu updates, and may initially list a set of addresses, phone numbers, and policy numbers that match the inputted characters (e.g., a set of numbers). When the call representative 196 sees the desired phone number in the dynamic menu, the call representative 196 may select the phone number from the dynamic menu, which can then be included as static filtered item in the search box. Thereafter, anything else inputted in the intelligent search box must be consistent with the filtered item (e.g., the user's phone number).

For example, when the user's phone number is selected as a filtered item in the intelligent search box, the dynamic content generator 155 or assistance application 197 can only update the dynamic menu with items that match the user's phone number, such as the user's policy numbers, address(es), vehicle(s), other users on the user's policy, and the like. Accordingly, instead of the call representative 196 going over each information item with the user 194, the intelligent search box provides the call representative 196 with automated categorizations and links between different information items associated with the user 194, and can result in significant time savings in the call session.

As described herein, the user 194 can also perform the information gathering process in one or more application sessions on the user's computing device 190 via an executing service application 192. Whether performed in application sessions or via call sessions with a call representative 196, the corpus of information corresponding to the user's claim can be processed by the computing system 100 to provide the user 194 and/or a policy provider of the user 194 with a set of recommendations and services. In one examples, while the information gathering process progresses, an intelligent service assignment engine 160 of the computing system 160 can generate a ranked list of service providers to, for example, repair the user's vehicle, tow the user's vehicle, provide the user 194 with a rental vehicle, repair the user's home, provide medical assistance or care to the user 194, provide physical therapy for the user 194, and the like.

The intelligent service assignment engine 160 can receive the corpus of information corresponding to the user's claim, and filter a set of service providers based on the service(s) needed by the user 194, proximity to the user's location (e.g., the user's home location or a break-down area where the user's vehicle is stranded), specializations of the service providers (e.g., providers specializing in smoke damage, water damage, construction, specific types of vehicle damage), effectiveness of work by the service providers, quality of work, communication responsiveness, general speed of work, cost of the work, and the like. In certain examples, the intelligent service assignment engine 160 can utilize these metrics and further generate rankings of servicers based on the user-specific information of the user 194, such as predictive information regarding whether the user 194 is likely to be satisfied with the service provider's work.

For example, based on profile information of the user 194—which can include the user's age, demographic information, sex or gender, location, any affiliations of the user 194, income information, wealth information (e.g., net worth), home value, vehicle type, etc.—the intelligent service assignment engine 160 match the user 194 with service providers using a matching algorithm. The matching algorithm can obtain all user-specific information and the various metrics of the service providers (e.g., quality of work, estimated times of completion of the work required, cost or rates of the service providers, location or proximity to the user's home location, etc.) to determine the optimal service provider(s) for the user 194.

As an example, the user 194 may be involved in a vehicle collision in which repairable damage has resulted. The matching algorithm may determine that the user 194 may not have enough income for the highest quality repair shops, and yet can afford two or three lower quality, but still effective repair shops. Based on the user's vehicle, the matching algorithm can filter these more affordable service providers that specialize in the user's specific type of vehicle, and then rank the remaining service providers based on, for example, historical ratings, proximity to the user's home location, public transport accessibility (e.g., if the user 194 or user's family does not have another vehicle), and the like. The intelligent service assignment engine 160 may then provide the user 194 with the recommended service provider, or a ranked list of service providers. In certain examples, when the user 194 makes a selection, the intelligent service assignment engine 160 can automatically schedule a service appointment for the user 194.

For incidents involving the user's vehicle, the computing system 100 can receive an identifier of the user's vehicle, such as a vehicle identification number (VIN) or license plate identifier. For example, the computing system 100 can receive this identifier based on an input by the call representative 196 during a call session, via a lookup of an insurance policy of the user 194, via input by the user 194 during an application session, or during a guided photo capture process with the user 194. Once the identifying information is received, the computing system 100 can obtain other vehicle information of the user's vehicle, such as the year, make, model, color, accident history, and the like. As provided herein, this additional information may be used by one or more modules of the computing system 100 to, for example, determine a value of the vehicle, repair costs, repair parts, etc.

In certain implementations, the computing system 140 can include a guided content capture engine 140 that communicates with the user's computing device 190 (e.g., via a native application or browser application) to guide the user 194 in capturing photo content and/or video content of the user's vehicle or property. The guided content capture engine 140 can provide the user 194 with a tutorial explaining the process of content capture and guide the user 194 in capturing photographs and/or video content of the user's vehicle or property. It is contemplated that a browser application may provide advantages over native applications since, for example, the browser application does not require any application downloads and provides convenience for the user 194. For browser application implementations, the guided content capture engine 140 can communicate with the browser application on the user's computing device 190 to provide a set of guided content capture interfaces that provide the user 194 with a tutorial of the content capture process and then requests that the user 194 capture specified images or video of the user's vehicle.

For vehicle implementations, based on the year, make, and model of the user's vehicle, the guided content capture engine 140 can access a camera on the user's computing device 190 and generate selected outlines corresponding to the user's vehicle on the camera image presented on the display of the user device 190. In one example, an initial step of the guided content capture process can instruct the user 194 to capture the vehicle's license plate or VIN, at which point the guided content capture engine 140 can perform image-processing (e.g., optical character recognition) on the captured photo to determine the characters of the VIN or license plate. The guided content capture engine 140 can then perform a lookup of the vehicle's details (e.g., year, make, model vehicle type, etc.) in a vehicle database. Vehicle outline content can be generated based on vehicle data stored in the database 110 or accessed from third-party resources 180 over the network(s) 175, and can be used by the guided content capture engine 140 to dynamically update the user's display screen based on instructions provided to the user 194 to generate a relevant vehicle outline.

In this process, the guided content capture engine 140 can generate a series of vehicle outlines for display on a camera interface presented to the user via a browser application. The browser application can access the image sensor(s) of the user's computing device 190 and embed or overlay the vehicle outlines of the user's vehicle on image data presented on the display screen of the user's computing device 190. As an example, the guided content capture engine 140 can determine the specific make, model, and/or year of the user's vehicle, and can generate the various vehicle outlines based on this information. For example, the guided content capture engine 140 can determine whether the vehicle is a van, semi-truck, cargo truck, pickup truck, full size sedan, station wagon, mid-size sedan, compact sedan, hatchback, motorcycle, etc., and configure the vehicle outlines based on the determined classification. In variations, the guide content capture engine 140 can generate the vehicle outlines based on the specific year, make, and model of the user's vehicle.

In various examples, the browser application can generate instructions to the user 194 to capture images or video of specified portions or angles of the vehicle in real-time. These portions and/or angles may be generalized for all information gathering processes of all users, or may be individualized based on initial claim information provided by the user or call representative (e.g., FNOL information indicating that the damage to the user's vehicle is located on a left rear quarter panel), or can comprise a predetermined sequence generalized for all users. As an example, the guided content capture engine 140 can instruct the user 194 to align the right side of the user's vehicle with an embedded or overlaid outline of the right side of the user's vehicle displayed on the user's computing device 190. In certain implementations, the guided content capture engine 140 can execute real-time image processing of the content captured by the camera of the user device 190 to, for example, determine when the user's vehicle is aligned with the generated outline. When an alignment is detected, the guided content capture engine 140 can cause the user device 190 to provide an indication and or prompt for the user 194 to take a photo or record a video. In one example, the displayed content can provide a green tint in response to detecting the alignment. In variations, the detected alignment can cause the user device 190 to automatically capture a photo.

As such, the guided content capture engine 140 can provide the user 194 with a walk-through process of the user's vehicle, generate embedded or overlaid outlines of the user's vehicle on the image data presented on the display screen for each portion of the vehicle, and capture content when the user 194 aligns the various portions of the vehicle with the generated outlines. In certain cases, the guided content capture engine 140 can process information provided by the user 194 through one or more application sessions and/or call session (e.g., indicating damage on a damage interface that includes a three-dimensional representation of the user's vehicle), and can configure the content capturing process based on this information. For example, when the user 194 indicates a vehicle accident in which the vehicle was rear-ended, the guided content capture engine 140 can focus on the areas of damage (e.g., capturing damage to the rear of the vehicle).

As provided herein, the guided content capture engine 140 can perform a similar walk-through process for property damage, such as fire damage, smoke damage, or water damage. In such cases, the guided content capture engine 140 can instruct the user 194 to capture images of any damage throughout the user's 194 dwelling, and/or record video content providing a walk-through of any portion of the user's dwelling that has damage.

In one scenario, the user 194 may be in a call session with a call representative 196, and the content flow on the call representative's assistance interface can request images or video of damage to the user's vehicle. The call representative 196 may send the user 194 a text message or email providing a link, which when selected by the user 194, can automatically cause the browser application (or a native application) to execute on the computing device 190 of the user 194. As provided herein, the browser application (or native application) can provide the user 194 with a brief tutorial, and then generate the content capturing interface with a request to capture specific angles or portions of the user's vehicle. In doing so, the browser application (or native application) accesses the image sensors of the user's computing device 190, and communicates with the guided content capture engine 140 to execute real-time computer vision and analysis techniques to identify when the specified portion of the user's vehicle is aligned with the matching vehicle outline. When the application and/or backend computing system determines, via real-time image analysis, that the specified portion of the user's vehicle is aligned with the vehicle outline, the browser application and/or backend computing system can trigger the content capture interface displayed on the user's computing device to indicate the alignment to the user 194. In one example, the guided content capture engine 140 or browser application can perform edge detection and/or identify contoured portions in the image data to identify the vehicle being aligned with the outline.

For example, the content capture interface can provide a notification to "take a picture," which can induce the user 194 to capture the image, and/or the content capture interface can provide color indication of alignment (e.g., change from a neutral color or tint to a green color or tint). In variations, the browser application (or native application) can detect the alignment and automatically capture the image or video of the specified portion. It is contemplated that because this process is performed in real-time with the user 194, as opposed to the user submitting captured images, the probability of fraud or deception is zero or near zero. Furthermore, while the guided content capture features are described herein as being performed by or in connection with a browser application, any of the techniques described here may also be performed by or in connection with a native application.

In certain examples, the content capture interface can present a request to capture the VIN or license plate of the vehicle (e.g., located on a lower portion of the vehicle's windshield or inside door panel). For example, when the vehicle's make, model, and or model year are not known, the content capture interface can present the VIN or license plate capture request. When the camera captures the VIN or license plate (e.g., via camera input by the user or automatically via image analysis by the application and/or backend computing system), the guided content capture engine 140 can perform a lookup of the vehicle details using the VIN or license plate to generate the outlines for capturing exterior damage to the vehicle. In further examples, when damage is present in the interior of the vehicle, the guided content capture engine 140 can perform the same or similar process to generate interior outlines specific to the user's vehicle or type of vehicle or the content capturing process.

When each requested portion of the user's vehicle has been captured (e.g., based on indicated damage from the user during a call session or independent application session), the guided content capture engine 140 can provide the images and/or video to a third-party content analysis entity. In variations, the guided content capture engine 140 can perform machine-learning content analysis on the images and/or video to determine a set of parameters for the vehicle damages, such as whether damaged parts need replacing or whether certain damaged parts can be repaired, the nature and extent of damage (e.g., nature of impact, impact velocity, type of collision, etc.), a cost estimate for replacing and/or repairing the damaged parts of the vehicle, and/or a total cost estimate for repairing the user's vehicle. These parameters and cost estimates can be fine-tuned based on learned information of the specific vehicle of the user 194, which can include availability of vehicle parts, cost of parts, devaluation of the vehicle make and model, and the like.

Upon completing the content capturing process, the guided content capture engine 140 can submit the images and/or videos to a third-party resource 180 to perform image processing to, for example, estimate repair costs or determine a reserve amount for a policy provider of the user 194. In variations, the guided content capture engine 140 can submit the captured content to the intelligent service assignment engine 160, which can automatically determine one or more service providers to facilitate repairs or replacements (as discussed above). In further variations, the guided content capture engine 140 can submit the captured content to a total loss prediction module 130 of the computing system 100.

In various examples, the computing system 100 can include a total loss prediction module 130 that can receive the captured content and/or the corpus of information corresponding to a vehicle incident, and execute a learning-based model to process the information or content to determine whether the vehicle is repairable or totaled. In certain implementations, the total loss prediction module 130 can process images and/or video data to identify damage, determine damaged parts (e.g., specific to the particular vehicle), determine a cost for repairing or replacing each damaged part, and/or determine whether the vehicle is repairable or should be considered totaled (e.g., scrapped, salvaged, or sold for parts).

For example, the total loss prediction module 130 can receive vehicle information (e.g., based on the VIN or license plate of the vehicle), determine a current value of the vehicle, and then determine whether the cost of repair exceeds the value of the vehicle. In certain examples, the total loss prediction module 130 may utilize this information to automatically perform a lookup of the vehicle's details in a vehicle database, such as the make, model, model year, and/or color of the vehicle from a database (e.g., a department of motor vehicle database, policy provider database, or other vehicle database). If the cost of repair exceeds the value of the vehicle, the total loss prediction module 130 can make a determination that the vehicle is totaled.

It is contemplated that the early determination of whether a vehicle is repairable or totaled can provide time and cost efficiencies for the user 194, the policy provider of the user 194, and various service providers that would otherwise handle the vehicle (e.g., tow companies, repair shops, scrapyards, etc.). In an example, a user 194 involved in a collision can provide a notification to the computing system 100 (e.g., via the service application 192), which can trigger one or more modules or engines of the computing system 100 to initiate communications with the user device 190. The dynamic content generator 155 can initially ask the user 194 whether the user 194, a passenger, or other individuals involved in the collision are injured. If the user affirms, the dynamic content generator 155 can ask whether anyone requires emergency services, such as an ambulance. If the user affirms, the dynamic content generator 155 can trigger a call to a proximate hospital or fire department within a certain distance from the user (e.g., using location data from the user device 190).

If the user 194 is not seriously injured, the guided content capture engine 140 can be triggered to initiate a brief content capturing process to capture any damage to the user's vehicle and/or other vehicles involved in the collision. The captured content can be processed by the total loss prediction module 130, to determine whether the user's vehicle and/or other vehicles are repairable or totaled. If the vehicle is totaled, then the total loss prediction module 130 can instruct the user 194 to notify a towing company to tow the vehicle to a scrapyard, thereby preventing multiple tows. It is contemplated that typical collision scenarios involve costly processes in which a vehicle is initially towed to a repair shop or vehicle dealership, and then servicers determine whether the vehicle is totaled. If so, then the vehicle receives a second tow to a scrapyard or auto salvage yard. The total loss prediction module 130 can remove these extra steps when it determines, through machine-learning techniques using historical training data of vehicle collisions, that the vehicle is totaled prior to being towed from the accident scene.

Alternatively, the total loss prediction module 130 can determine that the vehicle is repairable, and can therefore provide the user 194 with a notification to instruct a towing service provider to tow the vehicle to a repair facility. In this scenario, the total loss prediction module 130 can link with the intelligent service assignment engine 160 to identify an optimal towing service provider (e.g., based on distance, availability, cost, and/or service rating) and an optimal repair shop to repair the vehicle (e.g., based on similar criteria). Based on these determinations, the intelligent service assignment engine 160 can communicate with the user 194 to contact the optimal service providers to tow and repair the vehicle accordingly. In variations, the total loss prediction module 130 and the intelligent service assignment engine 160 can instigate the communications to the optimal service providers (e.g., optimal towing service and repair shop) automatically. For example, upon determining the optimal service providers, the dynamic content generator 155 can provide an interactive feature that enables the user 194 to authorize the computing system 100 to make all arrangements. If selected, the intelligent service assignment engine 160 can perform automated communications to the optimal service providers to, for example, arrange the tow to the optimal repair shop. In still further examples, the intelligent service assignment engine 160 can further arrange on-demand transport for the user 194 from the accident scene. As such, when a collision occurs and the user 194 is uninjured, the dynamic content generator 155, guided content capture engine 140, total loss prediction module 130, and intelligence service assignment engine 160 can operate in concert to contact emergency services, remove the vehicle(s) from the accident scene, transport the vehicle(s) to one or more optimal locations (e.g., repair shop, salvage yard, or scrapyard), and arrange transport for the user 194 (e.g., to a home location).

In various examples, the total loss prediction module 130 can further process image data and/or claim information to determine damage costs or repair costs for real property, such as damage from catastrophic events (e.g., weather events, earthquakes, etc.). In such examples, the content captured by the user 194 and/or information provided by the user 194 during the information gathering process can be processed by the total loss prediction module 130 to generate repair and/or replacement estimates to make the property whole. In these examples, the total loss prediction module 130 can further link with the intelligent service assignment engine 160 to perform service optimizations and identify the most optimal service providers (e.g., construction companies, plumbers, electricians, installers, maintenance workers, repairers, repair technicians, etc.) to fix the user's property using a set of metrics. As described herein, these metrics can include the distance to the user's property, cost of service, quality or rating of the service provider, and various metrics related to the user 194 (e.g., user's income or other demographic information, user's policy coverage and/or limits in coverage, and the like).

In various implementations, the computing system 100 can include a collision reconstruction engine 145 that can communicate with the computing device of the user 194 to receive contextual information related to a vehicle incident. In certain implementations, the collision reconstruction engine 145 can communicate with other engines and modules of the computing system 100 to receive contextual information related to the vehicle incident (e.g., captured content, user inputs on a damage interface, answers or contextual questions from the user 194 and/or other parties to the incident, etc.). The contextual information can include the location or intersection of the incident, the number of vehicles involved, the types of vehicles involved, the damage of the vehicle(s), any injuries or fatalities resulting from the vehicle incident, relative speeds of each vehicle in the incident, the number of passengers in each vehicle, and/or any bystanders, victims, or witnesses during the incident.

The collision reconstruction engine 145 can process the contextual information and generate an incident simulation of the vehicle incident (e.g., a three-dimensional simulation). The incident simulation can comprise a virtual or augmented reality simulation generated by, for example, a tuned physics engine 147 that utilizes the vehicle masses, velocities, headings, terrain, road surface, etc., to generate the incident simulation. For example, the collision reconstruction engine 145 can utilize satellite imagery of the incident location, and superimpose simulated representations of each vehicle at the incident location, their velocities, and the simulated collision(s). In certain examples, the incident simulation can be provided to one or more policy providers of the individuals involved in the vehicle incident.

Additionally or alternatively, the collision reconstruction engine 145 can present a series of logic-based questions to the user 194 via one or more application sessions to receive contextual information corresponding to the vehicle incident. In certain examples, the collision reconstruction engine 145 can request that the user 194 provide input (e.g., drawing inputs) to show the trajectories of the user's vehicle and any other vehicles involved. The collision reconstruction engine 145 can generate an initial simulation based on the user's inputs, and can refine the simulation as more information is received about the vehicle incident. The simulation can be included in a claim summary, which can include a large language model (LLM) summary of the vehicle incident, as discussed in detail below.

According to certain implementations, the computing system 100 can include a reserve estimation module 170 that ingests all information corresponding to a particular claim event, and generates a precise reserve estimate for the claim event. The reserve estimate comprises a total amount of cost arising from the claim event for a particular policy provider, and can include medical costs, repair costs, item or part replacement costs, service provider costs, and the like. The reserve estimation module 170 can execute a machine learning model trained using historical claim data and real time cost information to significantly increase the accuracy of reserve estimates. For example, the machine learning model can process data from any number of historical insurance claims, identifying the reserve estimates for those claims which were determined using previous methods (e.g., manual estimation by humans), and determining true exposure costs and/or payouts by the policy provider(s).

It is contemplated that precision reserve estimates can unfreeze significant amounts of a policy provider's float amount, which can facilitate increased insurance coverage for more policy holders, and can enable the policy provider to utilize the additional for a variety of purposes (e.g., the purchase of bonds or other investable securities). The machine learning model can be trained to identify discrepancies between historical reserve estimates and actual exposure or payout, and fine tune its predictive parameters to generate more accurate predictions for exposure risk (e.g., final payout). For example, the computing system 100 can stored any number of claim files 112 in a database 110, or access the claim files of any number of policy providers, where each claim file 112 includes a corpus of facts and/or claim data indicating an initial reserve estimate, all details of the claim (e.g., contextual information of the claim event, number of people affected, the property or vehicle(s) affected, specifics regarding damage or loss, specifics regarding any injuries arising from the event, detected fraud in the claim process, and the final payout(s) for the claim). The machine-learning model can be trained by processing the details of each individual claim, determining the various parameters that contribute to the varying discrepancies between individual reserve estimates and final payouts, and fine tune its predictive capabilities to generate highly accurate reserve estimates using initial claim data (e.g., FNOL information for a particular claim).

The machine-learning model executed by the reserve estimation module 170 may then process the claim data of any new claim to generate a reserve estimate, and in certain examples, fine tune the reserve estimate based on additional information pertaining to the claim as it is ingested by the computing system 100 (e.g., via call sessions, application sessions, police reports, insurance claims, fraud detection, vehicle collision simulations, guided content capture, injury reports, medical reports, and the like). In certain implementations, the reserve estimation module 170 can also provider a particular policy provider with a real-time reserve estimate that adjusts as the corpus of information corresponding to a particular claim is being built through the various information gathering processes described herein.

For incidents involving injuries, the computing system 100 can initiate and automated injury assistance module 165 that can process the various information provided by a user 194 corresponding to a claim event. When the user 194 indicates an injury, the automated injury assistance module 165 can initiate an in-depth question and answer session with the user 194, requesting that the user 194 provide detailed information about the user's current injury resulting from the claim event, any past injuries, current and previous treatments for injuries, any current and previous medications prescribed to the user 194, specific quantities, dosages, physical restrictions, whether the user 194 is wearing a cast, any surgeries resulting from the current injury, past surgeries, doctor information (e.g., name, medical facility, area of practice), hospital information, and the like.

In certain examples, the automated injury assistance module 165 can perform this injury information gathering process over one or more application sessions via a service application 192 executing on the computing device 194 of the user 194. The automated injury assistance module 165 can further utilize the reminder engine 125 and dynamic content generator 155 to provide the user 194 with an individualized reminder strategy to continue and complete the injury information gathering process using customized content for the user 194. These customized content flows and reminder strategies are discussed herein with respect to the engagement monitoring techniques that utilize reminder methods (e.g., text, email, phone call), content styling, timing or cadence of reminders, and learned information about the responsiveness of the user 194.

In various examples, based on an initial set of information from the user 194 (e.g., FNOL information), the automated injury assistance module 165 can perform a lookup of a national provider identifier (NPI) of the user's doctor(s) to match information provided by the user 194 to information included in one or more medical databases. Covered health care providers and all health plans and health care clearinghouses are mandated to use NPIs in administrative and financial transactions adopted under the Health Insurance Portability and Accountability Act (HIPAA). The NPI is a 10-position, intelligence-free numeric identifier (10-digit number), which means that the numbers do not carry other information about healthcare providers, such as the state in which they live or their medical specialty.

As the user 194 gets medical care for the injury or injuries in a recovery phase, the automated injury assistance module 165 can perform point-in-time check-ins with the user 194. These point-in-time check-ins can utilize an injury reminder strategy that can be based on the user's actual appointments with, for example, medical care providers (e.g., doctors and nurses), physical therapists, and/or any specialists assigned to the user 194. Additionally or alternatively, the injury reminder strategy can be based on machine learning data for similar injuries to the user 194 and the treatment plans for those injuries. For example, the automated injury assistance module 165 can provide the user 194 with conversational questions at specified times, such as "have you gotten your cast removed?" or "did you go to your physical therapy appointment yesterday?"

Accordingly, the automated injury assistance module 165 can act as an automated personal assistant (e.g., executable as a service application 192 on the user's computing device 190) specifically for aiding the user 194 in recovering from the user's injuries. In doing so, the automated injury assistance module 165 can be programmed with artificial intelligence software, or can leverage third-party artificial intelligence (e.g., via an operating system of the user's computing device 190), to provide a personalized user experience for the user 194 specifically for the purpose of recovering from injuries or generally receiving medical care. As such, the automated injury assistance module 165 can provide reminders to the user 194 to schedule medical appointments, physical therapy appointments, pharmaceutical deliveries, etc., provide reminders for the appointments, confirm that the user 194 attended appointments, and periodically checking in with the user 194. For implementations in which the user 194 has authorized access to location resources, the automated injury assistance module 165 can further automatically confirm that the user 194 attended appointments based on matching location data of the user's computing device 190 to physical locations corresponding to the appointments (e.g., using a mapping resource).

In some aspects, the periodic check-ins can be continued by the automated injury assistance module 165 until the user 194 achieves a stable state with respect to each of the user's injuries (e.g., either the user 194 heals completely or heals to the point of a permanent disability). In certain implementations, the automated injury assistance module 165 can also perform verification techniques to determine whether the user 194 is being truthful about receiving health care or prescription medications (e.g., cross-checking the user's provided information with information matched to NPI numbers, or performing location matching techniques).

In various examples, the automated injury assistance module 165 can utilize the injury information of the user 194 to verify truthfulness (e.g., detect fraud) and/or predict an eventual settlement offer for the user 194. The prediction of the eventual settlement can comprise an optimization (e.g., a machine learning optimization) based on the full corpus of injury information and historical settlement data for similar injuries, treatment plans, medical care and coverage, healing time, and the like. The automated injury assistance module 165 can further generate the predicted settlement amount based on the personal information of the user 194, such as the user's demographic information (e.g., location, income, age, etc.), home location, etc.

According to one or more embodiments, the automated injury assistance module 165 can further identify any inconsistencies or deltas in the information provided by the user 194. For example, if the user 194 indicates that a minor arm sprain resulting from a car accident is nearly healed at a first time, and then indicates that the arm injury is extremely serious at a second time significantly after the first time, the automated injury assistance module 165 can flag the claim for potential fraud. In such a scenario, the automated injury assistance module 165 can be triggered, based on an initial flag, to process all claim information for the claim event and determine a set of information items that could potentially indicate that the user 194 is potentially going to file a fraudulent claim.

For example, the automated injury assistance module 165 can identify in the claim file 112 of the user 194 that, prior to making the assertion that the minor arm injury is extremely serious, the user 194 indicated that a lawsuit was filed against a defendant in the claim event, or that the user 194 has hired an attorney. In various examples, the automated injury assistance module 165 can establish one or multiple criteria or thresholds for flagging fraud, triggering a fraud detection component to perform further analysis of the user's 194 claim file 112, and/or provide an indication, probability, or fraud score on a claim view interface viewable by a policy provider or investigator of the user 194.

In various implementations, the computing system 100 can include an AI prompt generator 120 that can receive the corpus of information for any given claim file 112 and generate an AI prompt for a third-party resource 180 executing a LLM to automatically generate a LLM summary of the claim file 112 or the claim event. The AI prompt generator 120 can comprise a machine-learning model trained to optimize the configuration, format, and/or language of AI prompts to enable or otherwise cause the LLM 177 executed on the computing system of a third-party resource 180 to generate an optimally concise and valuable claim file summary and/or claim event summary (e.g., four word to four sentence summary of the claim) for the purpose of expediting one or more processes in the overall claim process. The processes can include initial claim sorting or classification of the claim file 112 (e.g., automated or manual) or claim flagging (e.g., for fraud, expedited payout, or further investigation).

For example, a particular claim file 112 for a vehicle incident can comprise a corpus of information amounting to hundreds or thousands of information items that may include millions of words, including individual descriptions of the vehicle incident by each passenger, driver, and witness (e.g., headings, approximate speeds, vehicle types, location, etc.), descriptions of damage to each vehicle in the incident, descriptions of injuries, descriptions of medical assistance, care, treatments, and recovery details for each injured individual, policy coverages for each individual, police reports, liability or fault of each driver, any sensor data from the vehicles or cameras surrounding accident location (e.g., IMU or image data), damage information to other objects, items, buildings, and the like. The AI prompt generator 120 can be trained to parse the entire corpus of information to generate an optimized AI prompt specifically for an LLM 177 to create a LLM summary for the entire corpus.

It is contemplated that certain LLMs 117 provide LLM summarizations that may focus on certain details that may not be interesting or relevant for a particular purpose. For example, for claim file summaries, certain AI prompts can cause LLMs 177 to provide summaries that include information that is unhelpful for the purposes of processing a claim (e.g., unnecessary facts about a vehicle). The AI prompt generator 120 can be trained based on the outputs of the LLM 177 for the specific purpose of providing optimized claim summaries for policy providers and/or claim investigators. In various examples, the LLM summaries can be provided on a claim view interface that includes interactive features enabling a user 194, policy provider representative, or claim investigator to view a simulation of the vehicle incident, any reports or statements, any fraud flags trigger by any engine or module of the computing system 100, etc.

As such, the AI prompt generator 120 performs language cleaning or pre-processing to make the LLM engines 177 of the third-party resources 180 (e.g., CHATGPT® or GOOGLE GEMINI®) more efficient and effective for claim purposes. This cleaning or pre-processing can include automated removal or rephrasing of AI prompt language that an LLM engine is known to fixate on, or suppression of irrelevant language, to provide the LLM engine 177 with an effective AI prompt. Additionally, upon transmitted the AI prompt to the LLM engine 177, the computing system 100 can receive the LLM summary and perform automated post-processing, which can comprise automated tools for editing and word suppression to generate the finalized LLM summary.

In certain examples, the AI prompt generator 120 can further generate synthetic facts in the AI prompt to provide for a more effective LLM summary, based on the known output parameters of the LLM engine 177. These synthetic facts can be purposefully included in the AI prompt based on LLM outputs to facilitate the LLM engine 177 in generating a more relevant and useful LLM summary. For example, the AI prompt generator 120 can include specific information about the curb weight of a vehicle involved in a collision to provide the LLM engine 177 with contextual information about the severity of the collision, thereby facilitating a more optimal summary (e.g., a summary that focused on the severity of the user's injuries). As another example, a synthetic fact included in the AI prompt can include specific information about an intersection (e.g., to indicate fault by a particular driver). This specific information can include traffic control information for the intersection, right-of-way rules, number of lanes, protected lanes, etc. Such synthetic facts can enable the LLM engine 177 to generate a LLM summary that can include contextual specifics, such as "Driver 2 ran a red light and collided with Driver 1, who had right-of-way in the intersection." In further examples, the AI prompt generator 120 can specify any confirmed facts and any disputed facts in the AI prompt such that the LLM engine 177 provides a summary that includes these important details.

In the post-processing phase, the computing system 100 can include an editing tool that automatically suppresses irrelevant information or edits the LLM summary for relevance and brevity. As such, the LLM summary provided to the user 194, policy provider, claim investigator, attorney, or medical care provider can comprise only the most relevant information corresponding to the claim file 112 or the claim event specific for the purposes of those individuals.

In various examples, the computing system 100 can further include a negotiation engine 150 that can also comprise a machine-learning model trained to close or finalize a particular claim process corresponding to a claim file 112. The negotiate engine 150 can provide an individualized negotiation experience to the user 194 to settle a particular claim (e.g., similar to the customized reminder strategy and dynamic content flows provided to the user 194 described herein). For examples, the negotiation engine 150 can initiate a negotiation process based on the corpus of information gathered during the various information gathering processes to create the claim file 112 for a particular claim event (e.g., a vehicle incident).

In certain embodiments, the negotiation engine 150 can leverage artificial intelligence techniques to perform sentiment analysis on the user's responses to content or messages that provide a settlement offer for a particular claim. In such an example, the negotiation engine 150 can access a camera or other sensors on the computing device 190 of the user 194 (e.g., via an executing service application 192 or operating system), and/or can be supplemented with machine-learning techniques to provide the user 194 with customized content flows providing a settlement offer and negotiation content (e.g., based on the user's inferred content preferences). The sentiment analysis performed by the negotiation engine 150 can be used to determine whether the user 194 is willing to accept the settlement offer or is likely to reject the settlement offer (e.g., generating probabilities of acceptance or rejections).

In various examples, the negotiation engine 150 can comprise a trained machine learning model and/or can leverage artificial intelligence techniques to continue the negotiation using a maximum threshold as a reference (e.g., based on a reserve estimate calculation for the claim event). Furthermore, the negotiation engine 150 can obtain user-specific information of the user 194, such as demographic information, home location, the details of the user's vehicle or property, and the like, to generate an individualized negotiation strategy specifically for the user 194. The negotiation strategy can further utilize engagement monitoring and reminder techniques described herein to further provoke the user 194 in engaging with the negotiation engine 150. In certain examples, the negotiation engine 150 can automatically provide an initial settlement offer to the user 194 using one or more communication means (e.g., email, text, phone call), which the user 194 can accept or decline.

In certain examples, if the user 194 declines, the negotiation engine 150 can analyze and make automated inferences about certain aspects of the rejection by the user 194, such as the user's sentiment based on whether the user 194 ignores the settlement offer, image or video data of the user 194 (e.g., when the user 194 receives a settlement offer), whether the user 194 has representation by an agent or attorney, and the like. Based on this information, the automated negotiation engine 150 can adapt the individualized negotiation strategy for the user 194 to generate a second offer (or next sequential offer), escalate the negotiation to a human representative or negotiator, or conclude the negotiation.

If the user 194 accepts a particular settlement offer, the negotiation engine 150 can transmit an electronic document detailing the agreed upon settlement offer to the user 194 (e.g., via a preferred communication method or the service application 192) to provide an e-signature for the settlement offer. Thereafter, the claim file 112 for the user 194 can be archived or closed or may be used as training data for the machine-learning models described herein.

Examples described herein can implement engagement monitoring techniques corresponding to a user's engagement with the various user interfaces described herein. In such examples, the system can monitor various combinations of the user's inputs, view-time or display-time on any particular page or screen, the content presented on the display of the user's computing device 190 at any given time, image data of the user's face (e.g., showing a lack of interest), and the like. Based on the engagement information of a particular user 194 (e.g., a claimant or a corroborating party), the dynamic content generator 155 can dynamically adjust the content flows presented to the user 194 to maximize engagement and/or information gathering. In one example, the dynamic content generator 155 may determine, based on the engagement data received from monitoring the user 194, that the user 194 is losing interest in engaging with a particular user interface or content item, and adjust the content presented on the service application 192 or browser application in order to increase the user's engagement. The determination of engagement level of a user 194 by the dynamic content generator 155 may be based on a confidence threshold or probability of the user 194 exiting the application within a given time frame (e.g., the next five seconds).

As provided herein, the engagement monitoring and dynamic content flow adjustments may be performed for users, claimants, and corroborating parties at any phase of the claim process. As an example, during an information gathering phase for a particular claim, a witness may be presented with a series of queries relating to the claim event. The dynamic content generator 155 may implement engagement monitoring and dynamic content adaptation techniques to compel or influence the witness to complete the information gathering flow generated by the computing system 100.

Example Interfaces

FIG. 2A through 2K illustrate an example graphical user interface 200 providing dynamic scripting and content flows for call center representatives 196, according to various examples described herein. In the below discussion of FIGS. 2A through 2K, the user interface 200 can be presented on a representative computing device 195 (e.g., via an assistance application 197) to facilitate information gathering processes for claim events. The user interface 200 can be generated via execution of a dynamic scripting engine 159 by the dynamic content generator 155 of the computing system 100 in FIG. 1. Based on an initial set of information for a particular claim event (e.g., FNOL data), a claim file 112 can be generated, and a user 194 can engage with a call representative 196 over the phone to continue the claim process. In such communications, the call representative 196 can open or create a claim file 112 of the user 194, and the dynamic content generator 155 can create an initial content flow for the user interface 200 that allows the call representative 196 to conversationally obtain the necessary information for the user's claim.

Figure 2A:
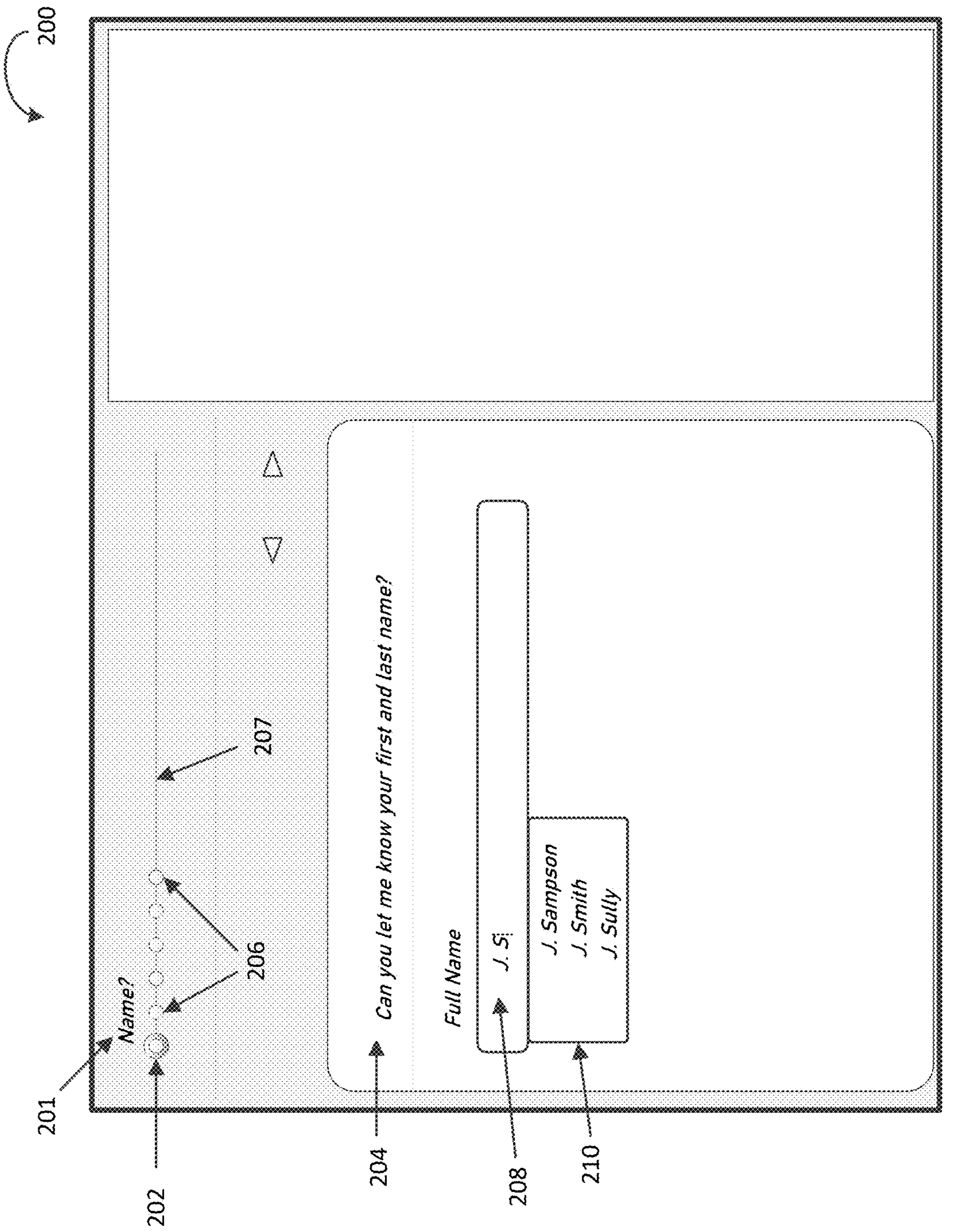
FIG. 2A through 2K illustrate an example graphical user interface providing dynamic scripting and content flows for call center representatives, according to various examples described herein.

Referring to FIG. 2A, the user interface 200 presented to the call representative 196 can include a dynamic script 204 that the call representative can read to a caller on the phone during a call session. The call representative 196 can view and interact with the user interface 200 during the call session to progress through the content flow. As shown in FIG. 2A, the user interface 200 can include a text box 208 that the call representative 196 can use to type in the caller's name. The user interface 200 can include a predictive menu 210 showing real-time results through character-by-character analysis. The predictive menu 210 can correspond to results based on a real-time database search (e.g., of users 194 having an account or insurance policy with a policy provider) or can be generalized based on a ranking of most common names.

In various examples, the user interface 200 can further include a navigation bar 207 that allows the call representative 196 to navigate through the content flow. The navigation bar 207 can include selectable indicators 206 that each correspond to a particular page of the content flow. A highlighted indicator 202 on the navigation bar 207 can indicate the current page presented on the user interface 200. To provide the call representative 196 with further context for the current page, a reminder message 201 can be presented above the navigation bar 207 that aligns with the dynamic script 204.

Figure 2B:
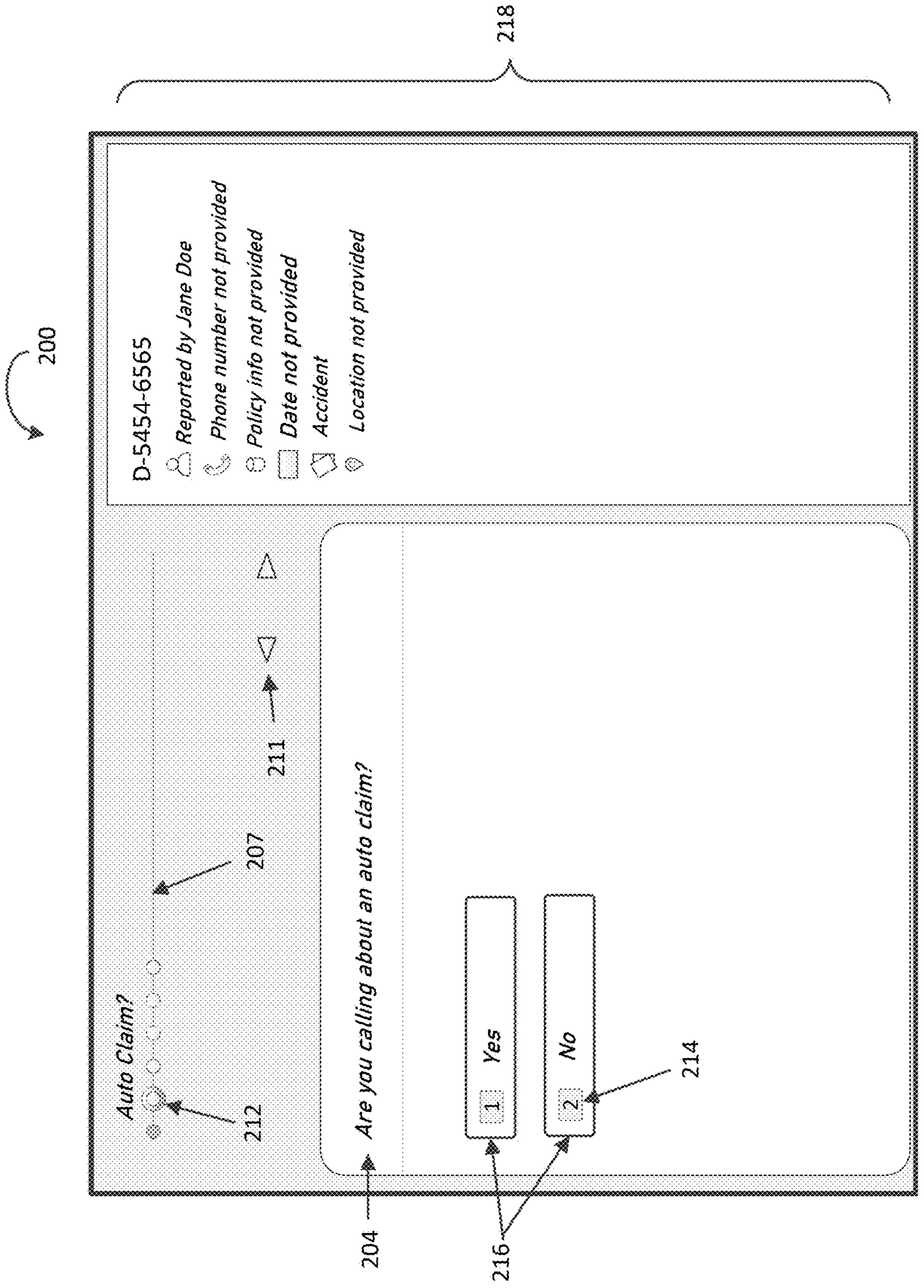

Referring to FIG. 2B, the highlighted indicator 212 shows that the content flow has progressed to a second page, and the dynamic script 204 has been updated accordingly. In certain examples, the call representative 196 can select navigation buttons 211 to navigate sequentially through the content flow, or can select the selectable indicators of the navigation bar 207 to navigate to a particular portion of the content flow. In various examples, the user interface 200 can include an information panel 218 that updates based on information received from the caller during the call session.

In the second page of the content flow, the dynamic script 204 includes a question, and provides selectable options 216 for the call representative 196 to select based on the caller's response to the question. In certain examples, the selectable options 216 can each include an accelerator 214, which enables the call representative 196 to input a key to select the appropriate answer as opposed to providing a selection input (e.g., a mouse-click or touch input).

Figure 2C:
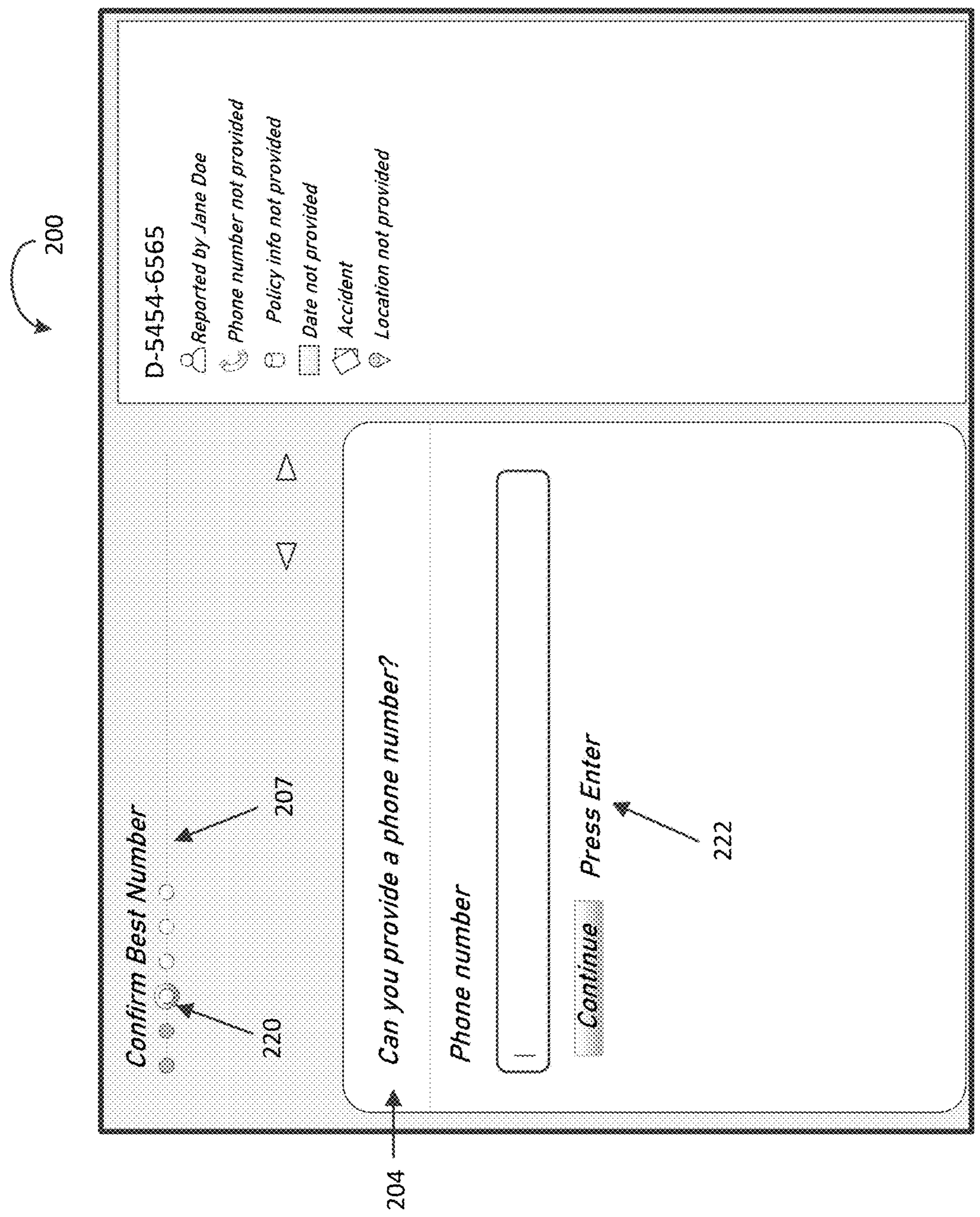

Referring to FIG. 2C, the user interface 200 has progressed to a third page of the content flow, as indicated by the highlighted indicator 220 on the navigation bar. The dynamic script 204 has also updated to a phone number confirmation question and the user interface 200 enables the call representative to key in the user's phone number. In certain implementations, the call representative 196 may also include additional information provided by the caller, but not requested through the dynamic script 204. As shown in FIG. 2C, when the information has been entered by the call representative 196, the call representative 196 can select a "continue" button or strike the accelerator key 222 to progress to the next page of the content flow.

Figure 2D:
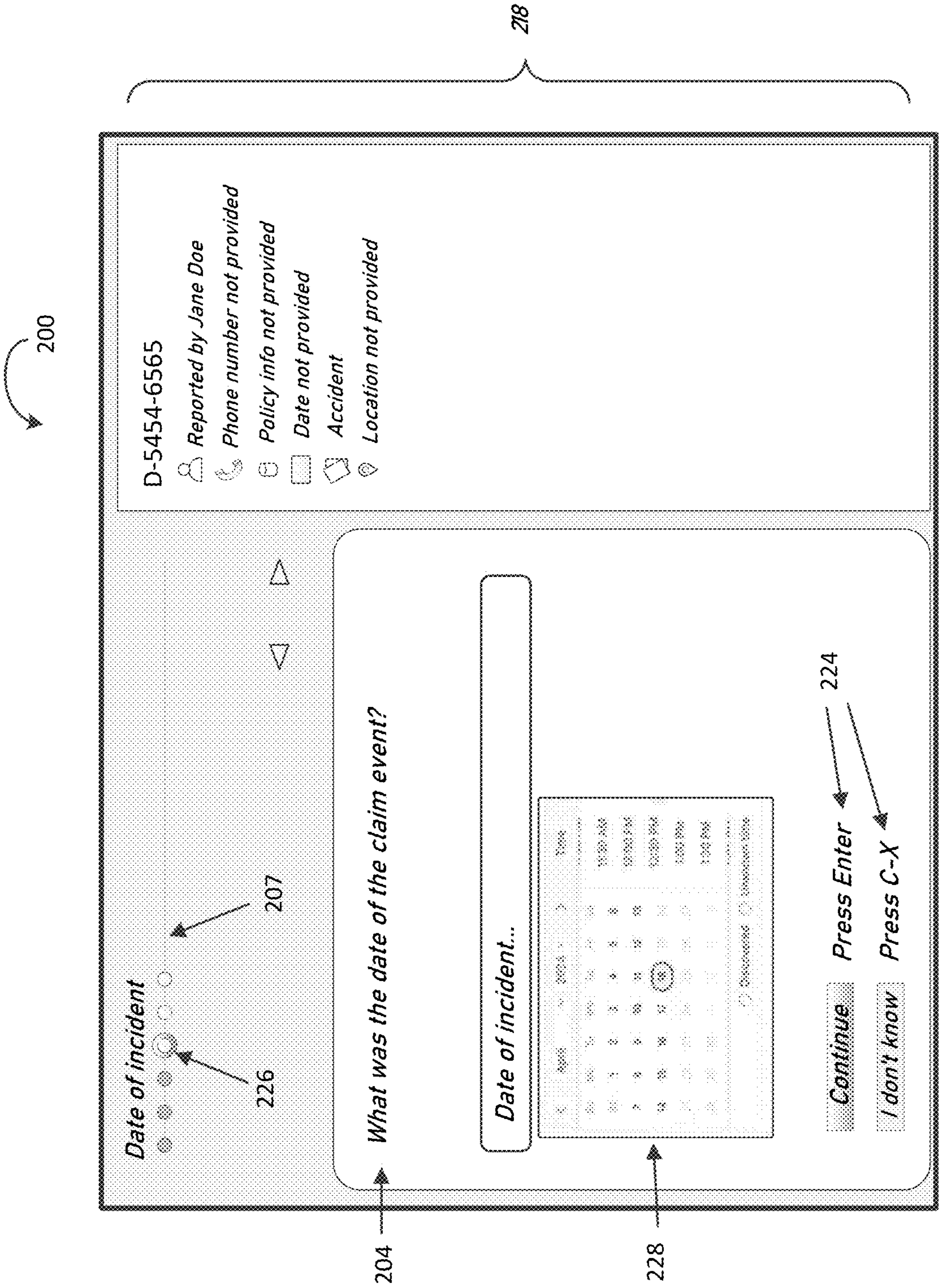

Referring to FIG. 2D, the user interface 200 has progressed to a fourth page of the content flow, which advances to request contextual information about the claim event, and which is reflected in the highlighted indicator 226 on the navigation bar 207. The dynamic script 204 is updated to provide the call representative 196 with updated questioning to query the user 194 for a date of the incident. The information panel 218 indicates that the caller's name is "Jane Doe," but that a phone number, policy information, a date of the incident, and a location of the user 194 have not yet been provided. The user interface 200 enables the call representative 196 to readily select a date for the incident in a drop-down calendar 228, and can progress to a next sequential page of the content flow by selecting "continue" or "I don't know"-based on the user's responses—or by striking the relevant accelerator key 224 for these answers.

Figure 2E:
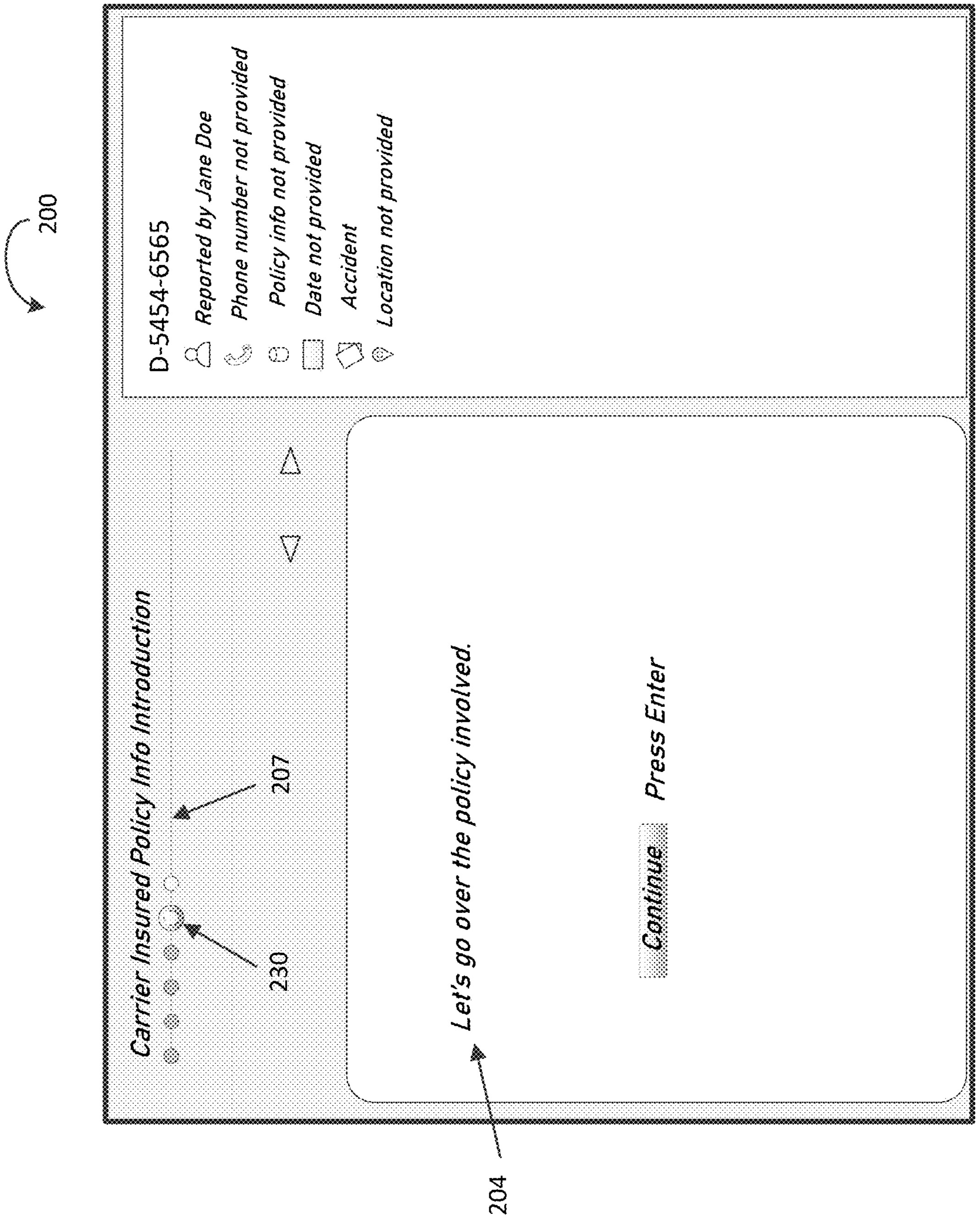
Figure 2F:
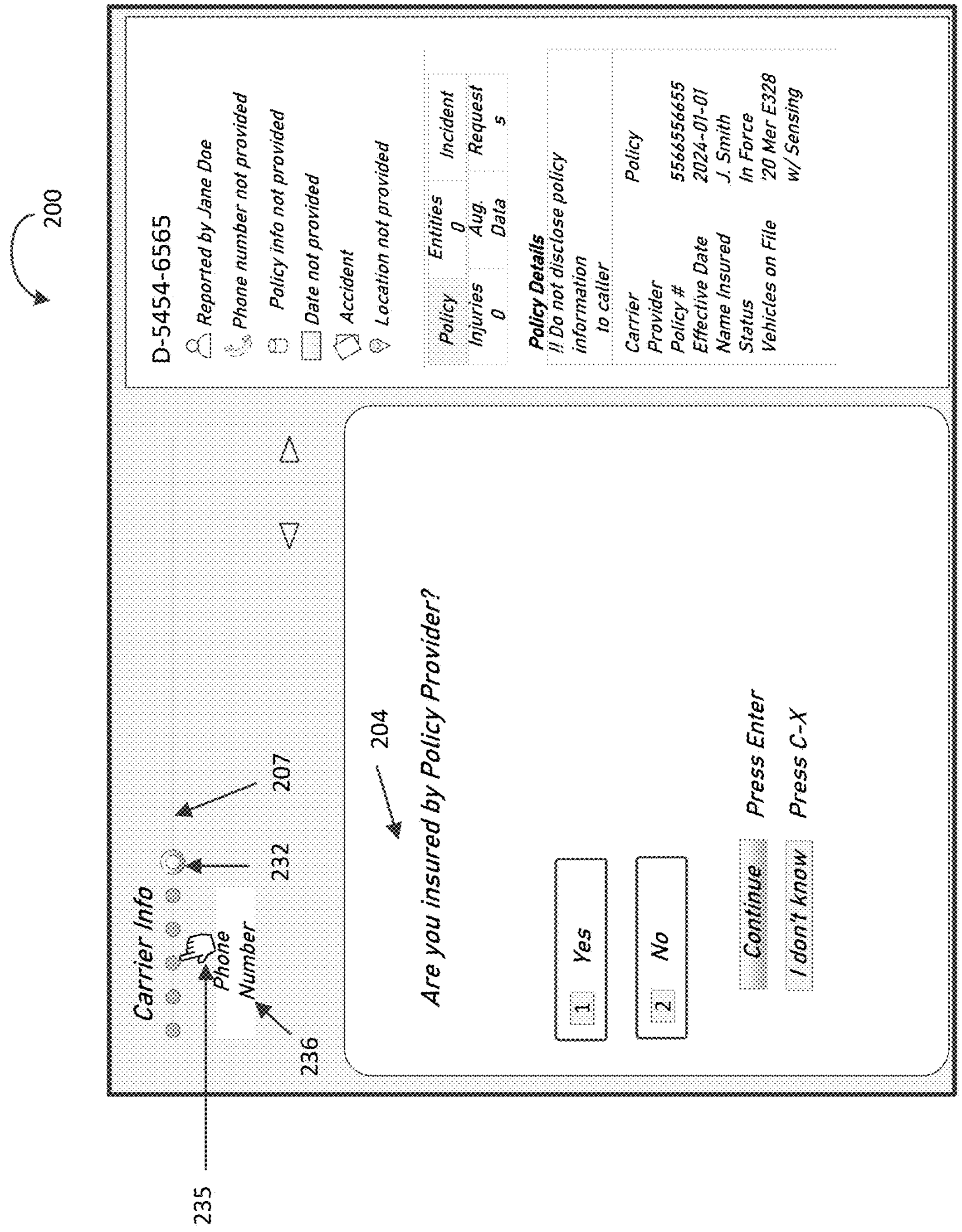

Referring to FIG. 2E, the user interface 200 has progressed to a fifth page of the content flow, as indicated by the highlighted indicator 230 in the navigation bar 207. The dynamic script 204 has been updated to instruct the call representative 196 to discuss the policy involved in the incident. Referring to FIG. 2F, the content flow has advanced to a sixth page, as indicated by the highlighted indicator 232 in the navigation bar 207, and relevant selections and accelerator keys are provided to enable the call representative 196 to quickly progress the call session. As shown in FIG. 2F, the call representative 196 may utilize a cursor 235 to navigate through the content flow by selecting indicators in the navigation bar 207. As further shown in FIG. 2F, the call representative 196 can move the cursor 235 to hover-over individual indicators and the dynamic content generator 155 can be triggered to generate a brief descriptor 236 for the page corresponding to the hovered-over indicator. In the example shown in FIG. 2F, the call representative 196 uses the cursor to hover-over a "phone number" content page (as shown in FIG. 2C), and can select the indicator to navigate back to the specified page of the content flow.

Figure 2G:
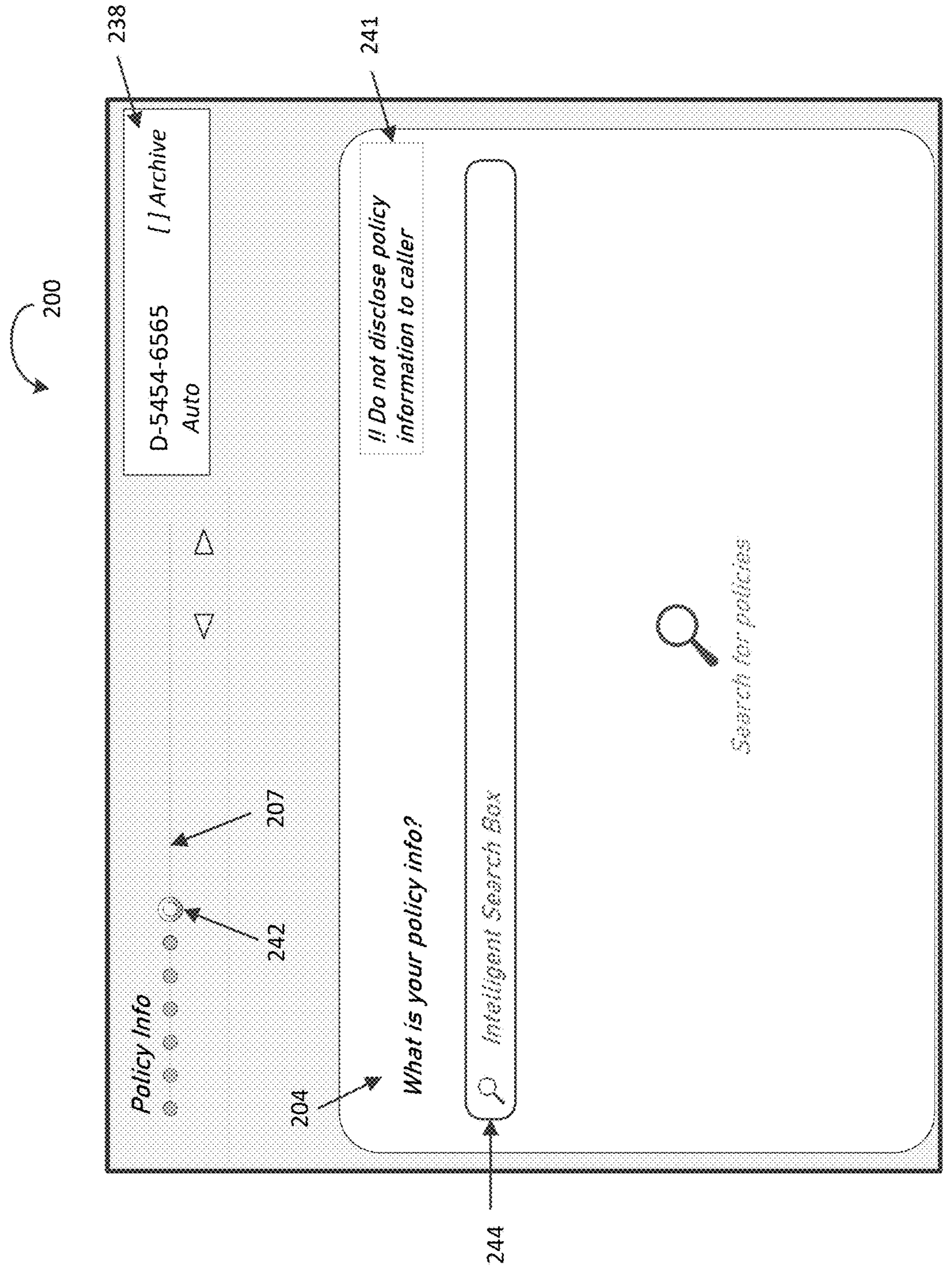

Referring to FIG. 2G, the content flow has advanced to a seventh page, as indicated by the highlighted indicator 242 on the navigation bar 207. Based on a ruleset for a particular policy provider of the user 194, or based on government regulations, the call representative 196 is not permitted to discuss private policy information until certain information has been authenticated. A warning 241 to not discuss this information is provided prominently on the user interface 200 for the call representative 196. In certain scenarios, the user 194 or caller may end the call session and information gathering process with the call representative 196, in which case the call representative 196 may select an archive selector 238 to save a current state of the information gathering process. Thereafter, the user 194 or caller may open the claim file 112 corresponding to the incident to continue the process in a subsequent call session or independently via an application session.

Figure 2H:
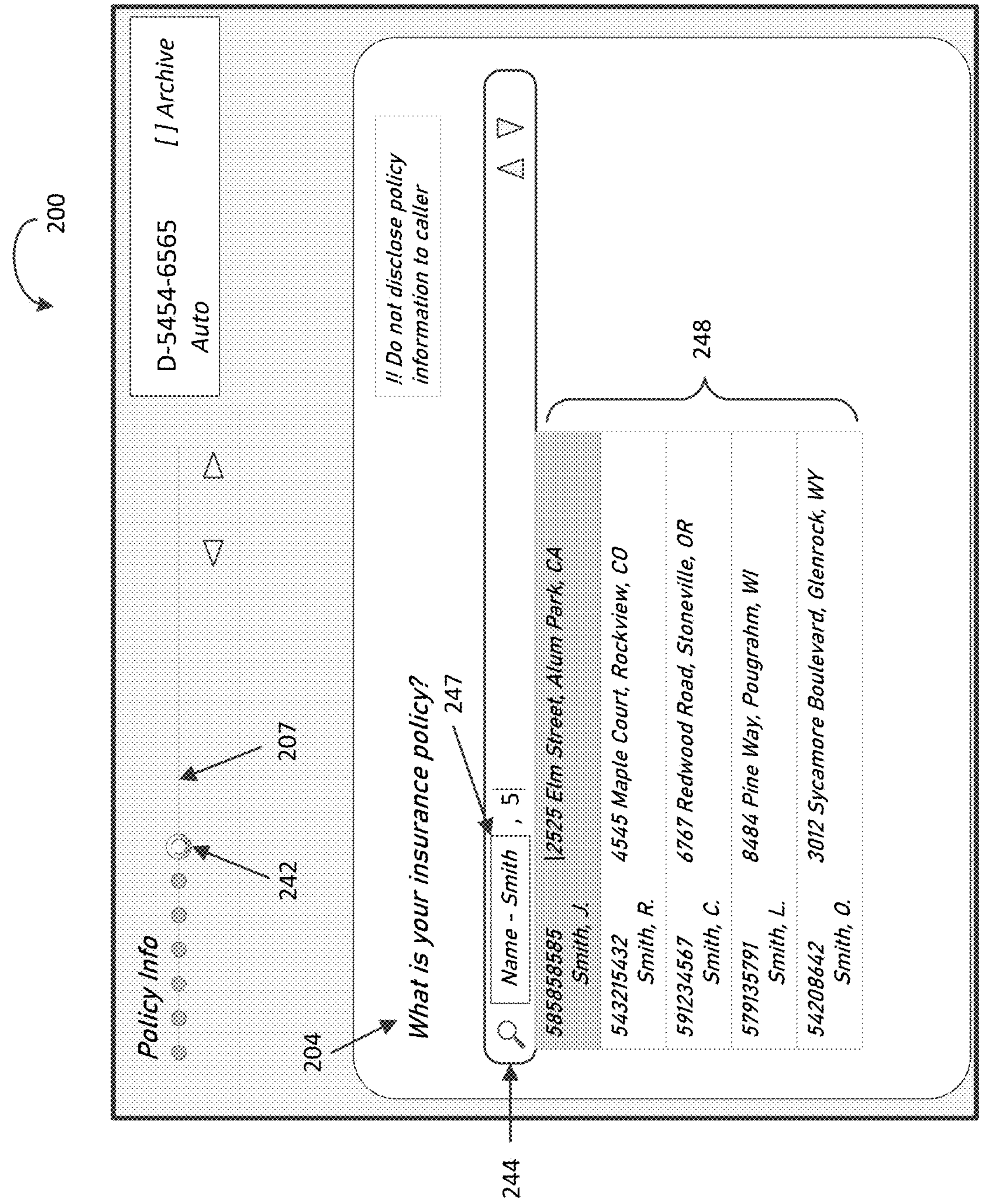

As shown in FIG. 2G, the dynamic script 204 is updated to ask the user 194 for insurance policy information, and an intelligent search box 244 is provided on the user interface 200 to enable the call representative 196 to search through a database (e.g., insurance policy records database, policy provider database, or a database of the computing system 100). Referring to FIG. 2H, the content flow remains on the seventh page, as indicated by the highlighted indicator 242 in the navigation bar 207, and the updated dynamic script 204 queries for the user's insurance policy. The intelligent search box 244 provides the call representative 196 with filter elements 247 that may be selected from respective drop down menus 248 that provide character-by-character results based on the inputs in the intelligent search box 244 by the call representative 196.

For example, the user 194 may tell the call representative 196 a first name and last name, and as the call representative 196 types individual characters, a top-ranked list of results in a drop-down menu 248 can provide matching results to the call representative's inputs. These matching results can be updated based on each character inputted by the call representative, and can encompass any matching category in the database, such as a name category, address category, policy number category, driver's license category, and the like. Accordingly, when the call representative 196 types the letter "s," the dynamic content generator 155 can exclude category results comprising address, policy number, and driver's license number, and can provide matching results corresponding to names with a first or last name starting with an "s."

Each subsequent character entered by the call representative 196 can trigger the content generator 155 to update the search results in the drop-down menu 248. When a particular policy holder's name appears in the drop-down menu 248 (e.g., as identified by the caller), the call representative 196 may select the name, which may then be generated as a filter element 247, and thereafter, any results from additional characters typed into the intelligent search box 244 must also match the filter element 247. Thus, only subsequent policy numbers, addresses, license numbers, and the like, that match the name "Smith" would be presented in the drop-down menu 248.

Figure 2I:
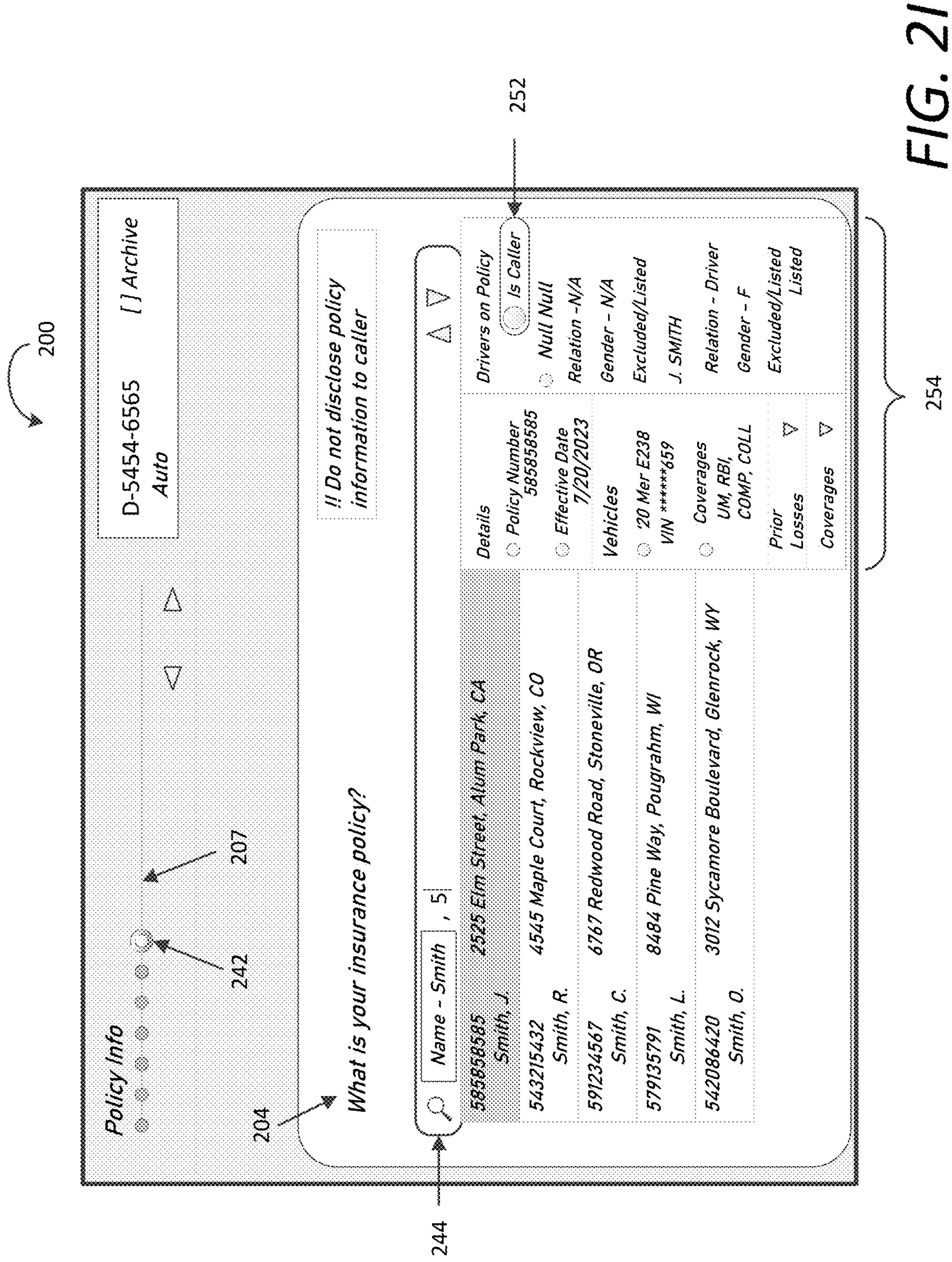
Figure 2J:
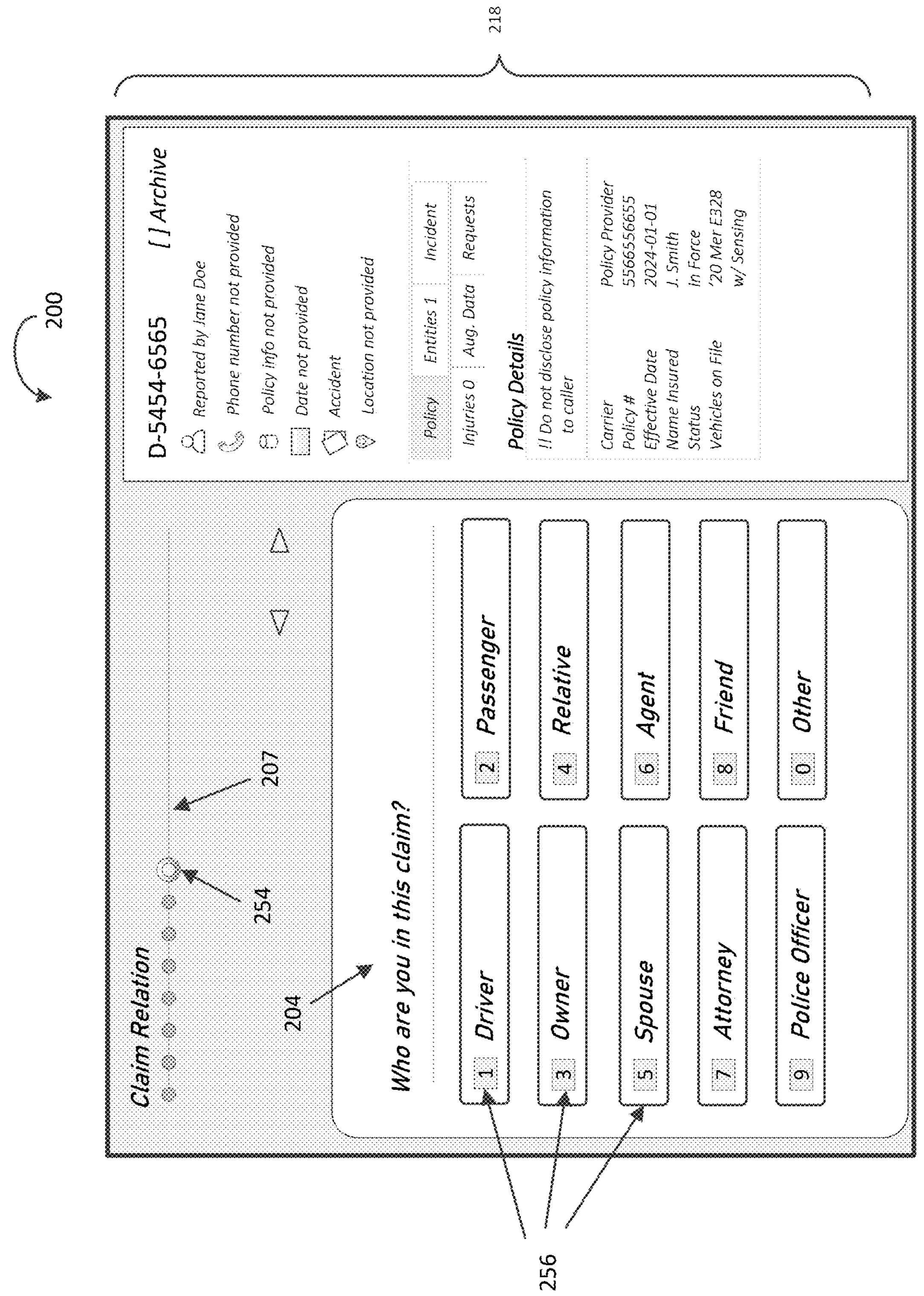

Referring to FIG. 2I, the call representative 196 may input a selection of a particular result in the drop-down menu, which can comprise a click input, single touch input, and the like. This selection can trigger an information panel 254 to be presented in the user interface 200, which can include all matching data of the result in the drop-down menu 248. In certain aspects, the information panel 254 can include an authenticator feature 252 to enable the call representative to indicate that the caller has been identified as the person on the policy. As described below, selection of this authenticator feature 252 can trigger the dynamic content generator 155 to update a set of controls (e.g., governed by a ruleset of the policy provider or regulation) that allows the call representative 196 to advance to a next set of content flows in the information gathering process.

Referring to FIG. 2I, the content flow has progressed to an eighth page as indicated by the highlighted indicator 254 in the navigation panel 207. The information panel 218 has been updated to include the selected policy in the previous page. Also, the dynamic script 204 has been updated to query the next stage of the information gathering process and instructs the call representative 196 ask the caller how the caller is related to the claim incident. A list of options is provided to the call representative 196, each of which can include a key accelerator 256 that enables the call representative 196 to quickly strike a corresponding key based on the caller's response. Each of the options are also selectable via a click or touch input to progress the content flow to a next sequential page. In the information panel 218, the call representative 196 is still provided with a warning to not disclose policy information to the caller, since the caller has not yet been verified.

Figure 2K:
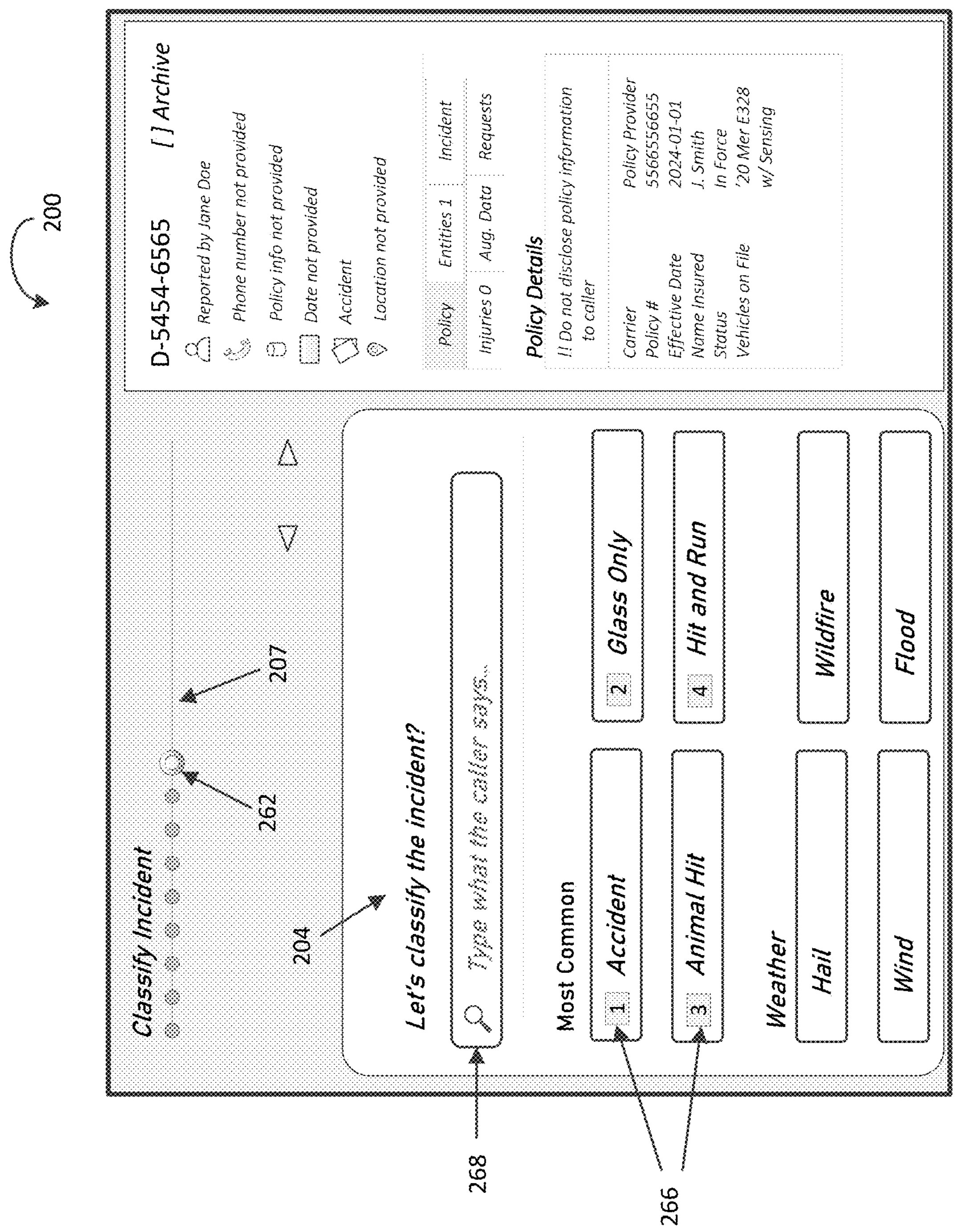

Referring to FIG. 2K, the content flow has advanced to a ninth page as indicated by the highlighted indicator 262 in the navigation bar 207. The dynamic script 204 has been updated to ask the caller initial details about the incident, and a text box 268 is provided to enable the call representative 196 to input the caller's answer. Additionally, a set of most common results, each including a key accelerator 266, is provided to enable the call representative 196 to quickly advance the call session through the content flow. Accordingly, the call representative 196 can input an initial set of information to provide various modules of the computing system 100 with contextual information to advance through the information gathering process.

Figure 3A:
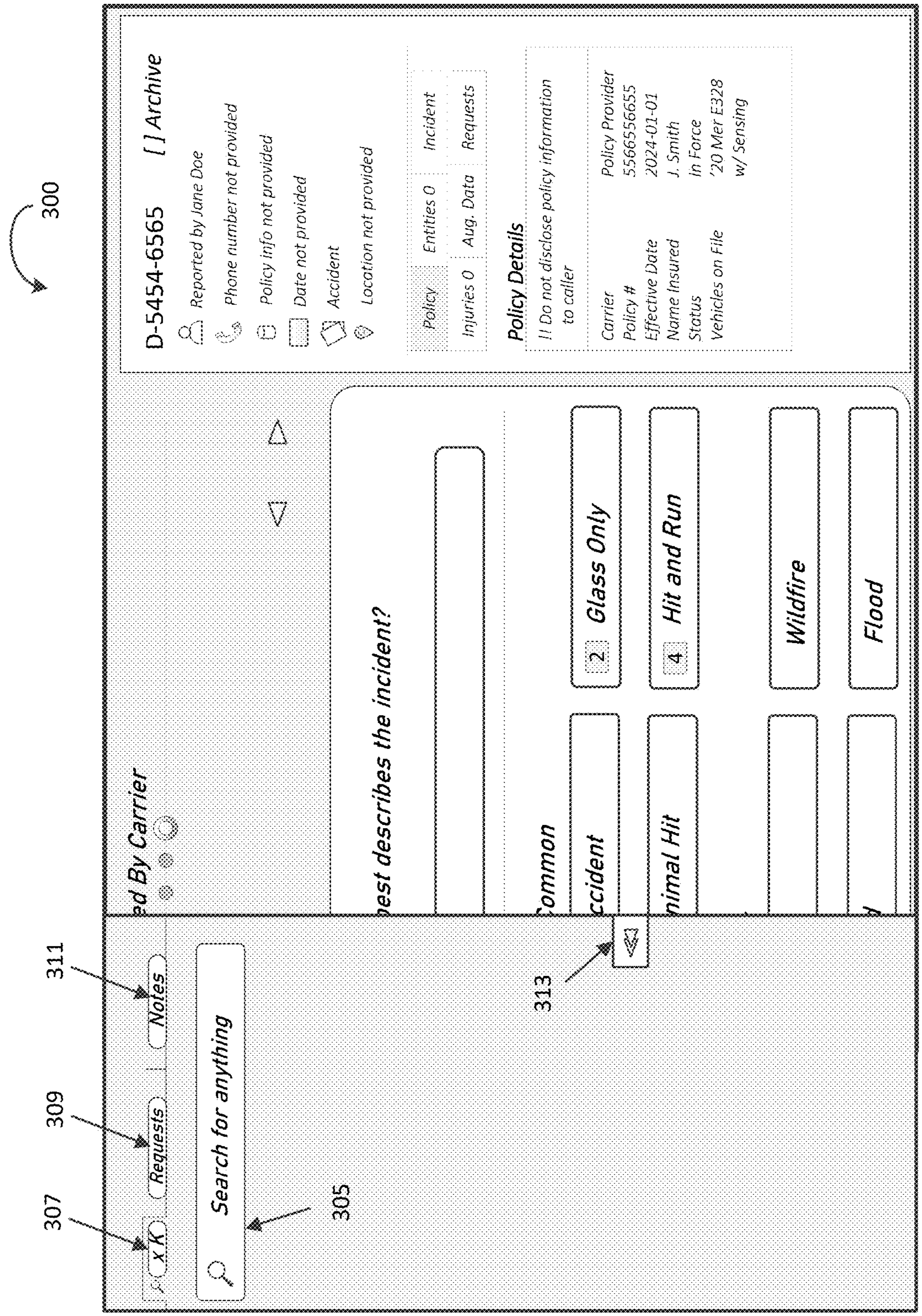
FIGS. 3A through 3J illustrate an example graphical user interface providing in-depth interactivity for a call center representative, according to various examples.

FIGS. 3A through 3J illustrate an example graphical user interface providing in-depth interactivity for a call center representative 196 during a call session, according to various examples. Referring to FIG. 3A, a panel is provided in the user interface 300 presented to the call representative 196 that enables the call representative 196 to provide additional context for the claim incident (e.g., using command K tab 307), make digital requests to the caller (e.g., using digital requests tab 309), and provide personal notes for the call session (e.g., using notes tab 311). The panel can be extended by selecting one of the tabs 307, 309, 311, and can be retracted by selecting a retractor feature 313. In FIG. 3A, the call representative 196 has selected the command K tab 307, which causes the panel to provide a search box 305. This search box 305 can be used to provide additional information for the claim incident.

Figure 3B:
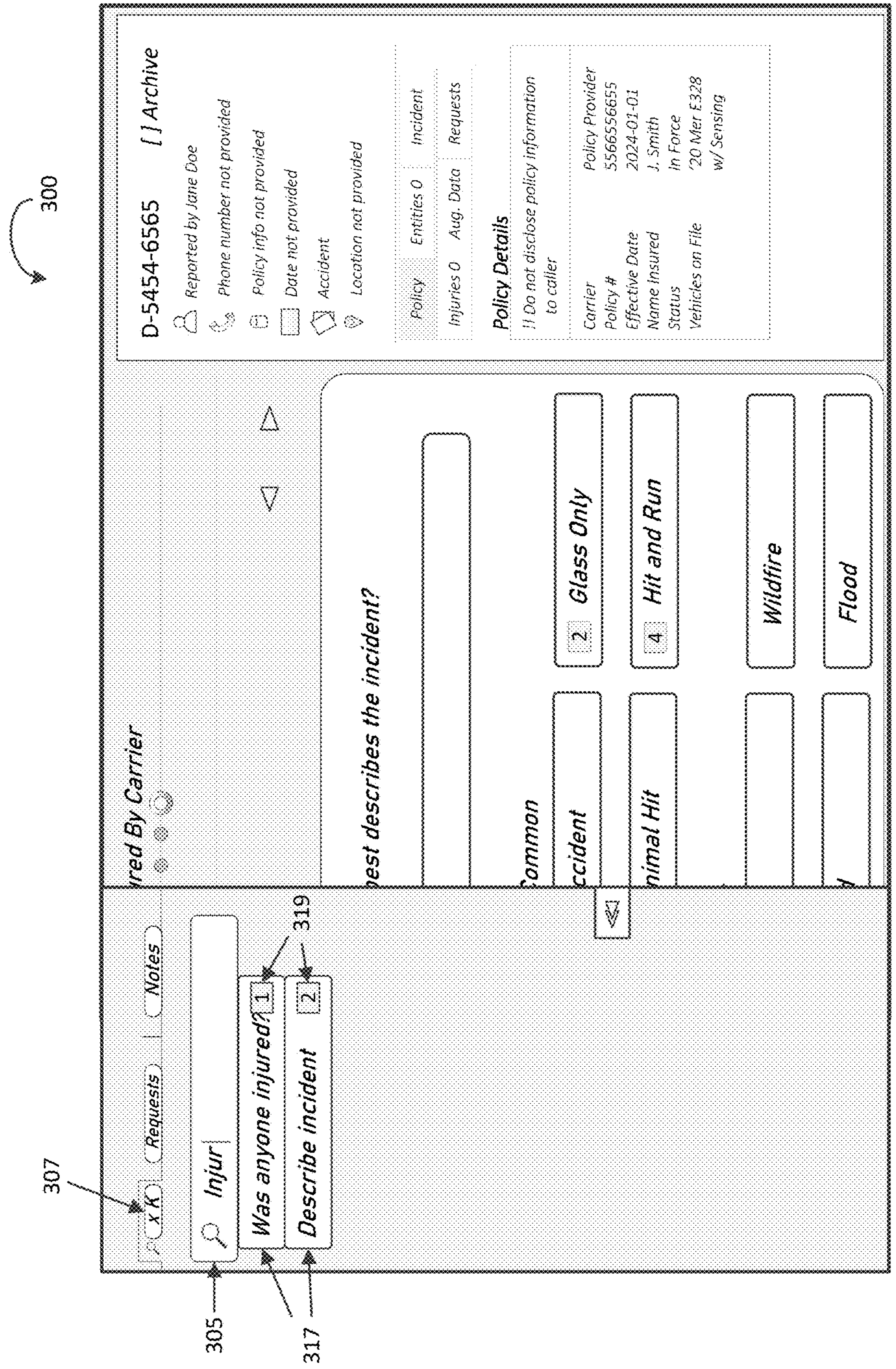

Referring to FIG. 3B, the call representative 196 has selected the command K tab 307, which triggers the panel to provide the search box 305. The call representative 196 can type information into the search box 305, which can yield a set of selectable search results 317, each including its own key accelerator 319. In the example shown in FIG. 3B, the caller has mentioned an injury, which did not correspond to the dynamic script 204 provided in the user interface 300. Based on this trigger, the call representative 196 can interact with the command K tab 307 to type "injury" into the search box 305 and select the relevant result 317 (e.g., via selection input or key accelerator 319).

Figure 3C:
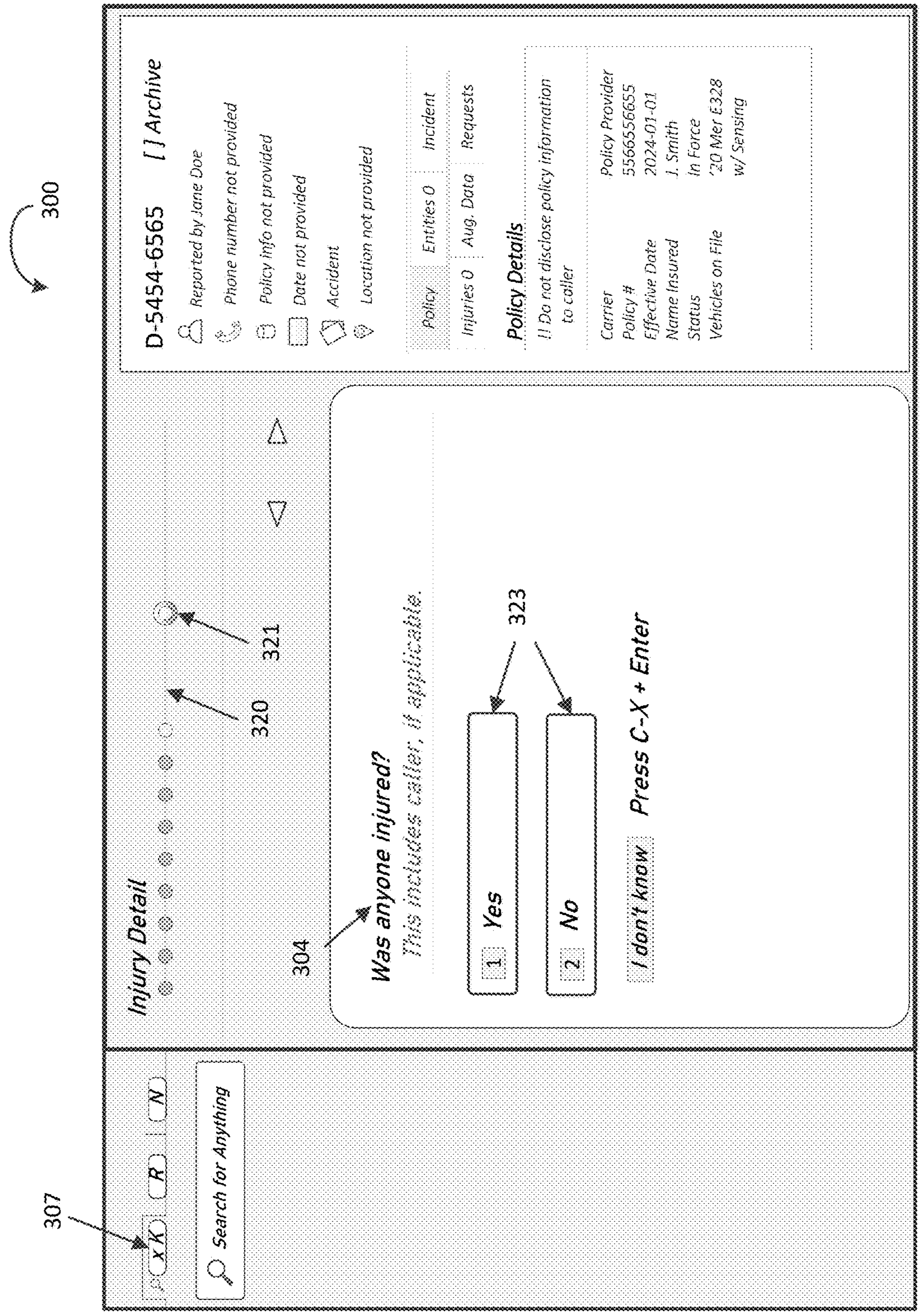

Referring to FIG. 3C, the user interface 300 has been updated based on the call representative 196 selecting the injury category using the command K feature 307. This selection triggers the content generator 155 to automatically navigate to an injury sub-flow or injury grouping of the content flow, as indicated by the highlighted indicator 321 in the navigation bar 320. As provided herein, the use of the command K feature 307 allows the call representative 196 to hop to any sub-flow or grouping of the overall content flow, and the dynamic content generator 155 updates the dynamic script 304 and user interface 300 to proceed to the selected sub-flow or grouping. As shown in FIG. 3C, the dynamic script 304 asks the caller whether anyone was injured, and a set of options 323 are provided with corresponding key accelerators.

Figure 3D:
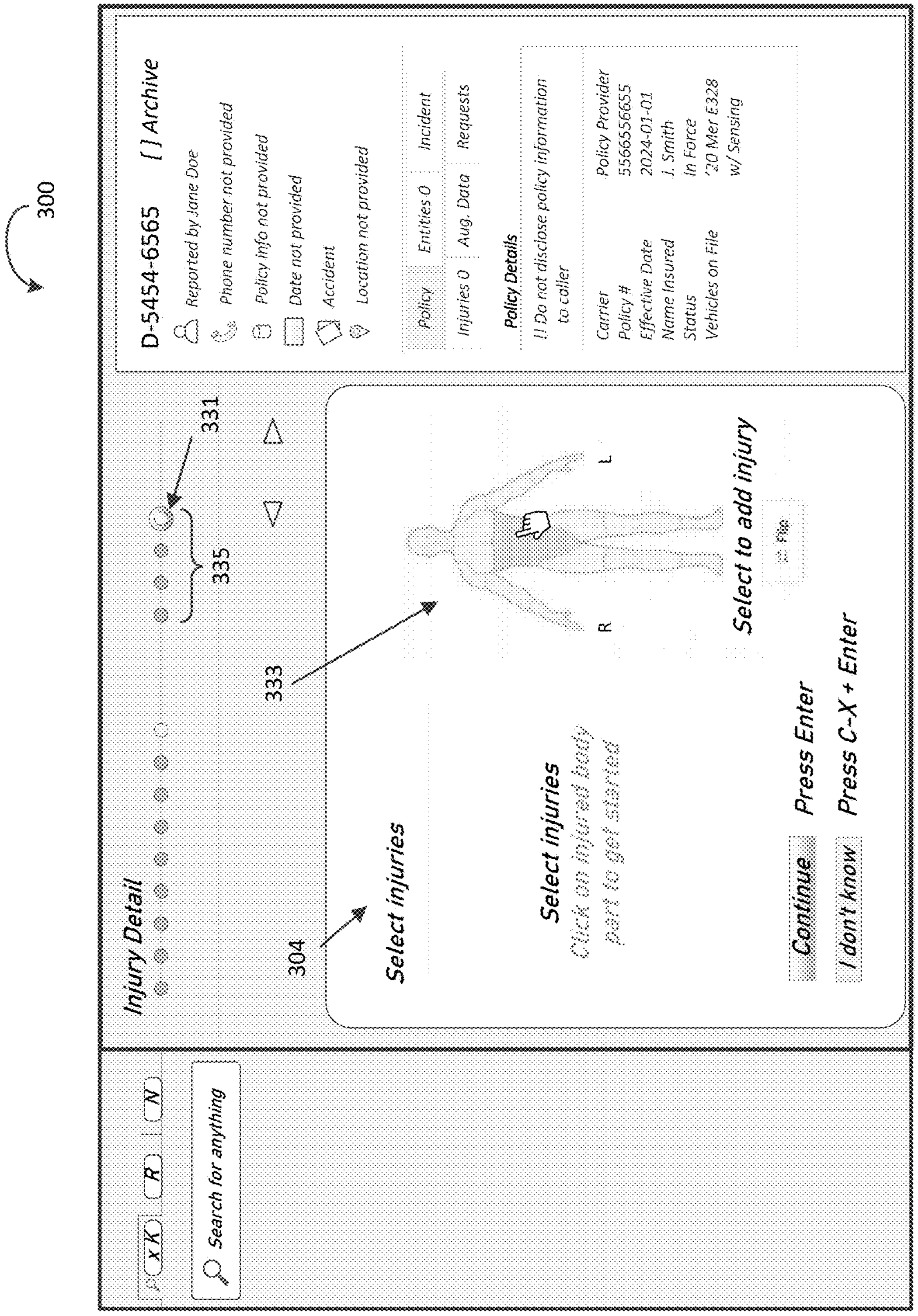

Referring to FIG. 3D, the user interface 300 has been updated to a fourth page of the injury sub-flow 335, as indicated by the highlighted indicator 331. The caller has indicated that Jane Doe was injured in the incident, and the call representative 196 is instructed by the dynamic script 304 to ask the caller about Jane Doe's injuries. Furthermore, an interactive human representation 333 is provided on the user interface 300 to enable the call representative 196 to indicate the injuries by selecting one or more portions of the human representation 333. The human representation 333 can comprise a representation of a human body that allows the call representative to indicate injury on the front, sides, or backside of the body and different portions of the human body. As shown in FIG. 3D, the injury feature 333 enables the call representative 196 to select the mid and lower torso, hands and wrists, mid-arms, shoulders, upper torso, upper and lower back, upper legs, lower legs, ankles and feet, and head to indicate the injuries to Jane Doe.

Figure 3E:
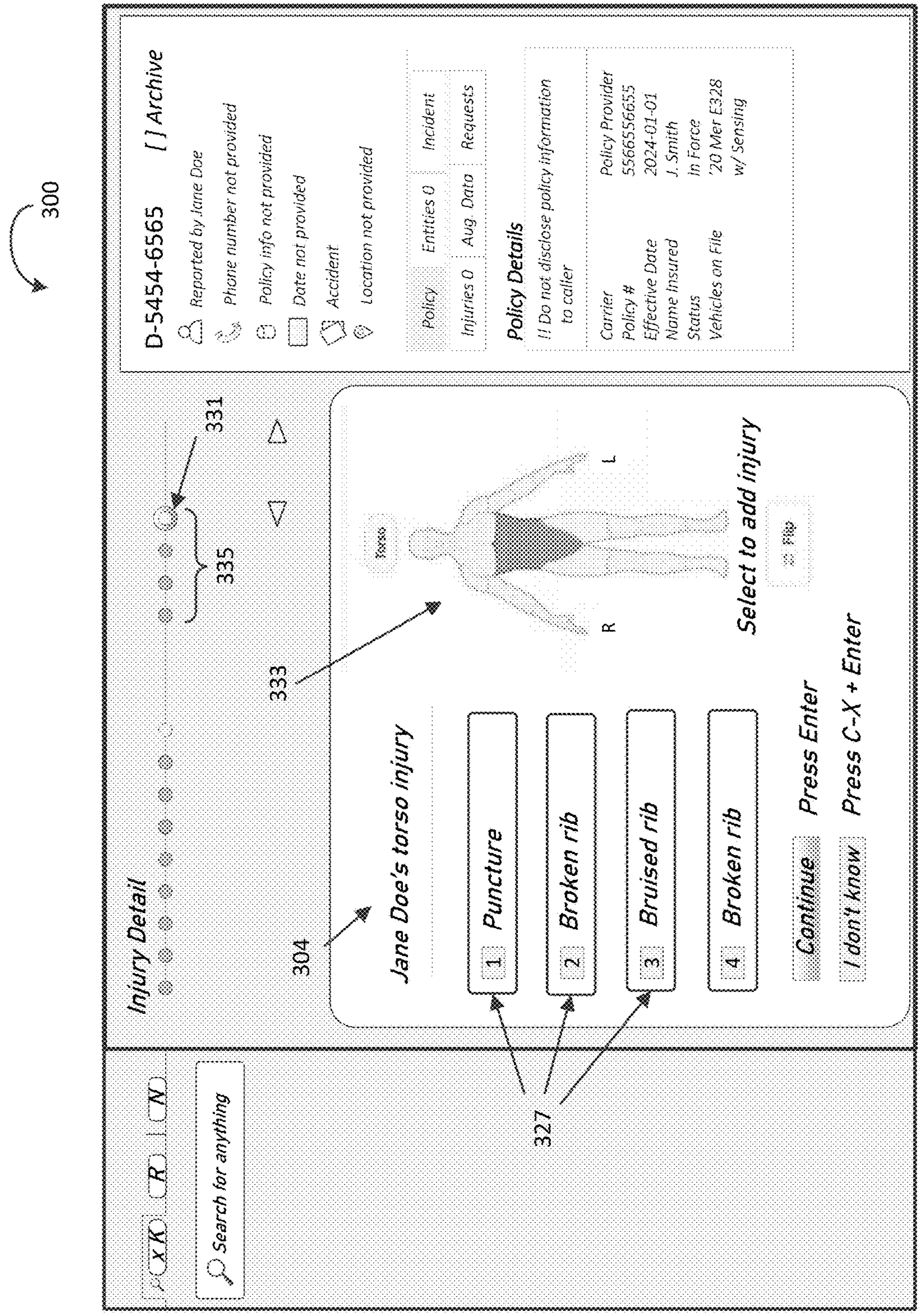

Referring to FIG. 3E, when the call representative 196 selects a portion of the human representation 333 (e.g., the torso), a set of options 327 with key accelerators are presented, which allow the call representative 196 to provide input detailing the injury to the torso. This process can be repeated for each injury voiced by the caller for each injured person.

Figure 3F:
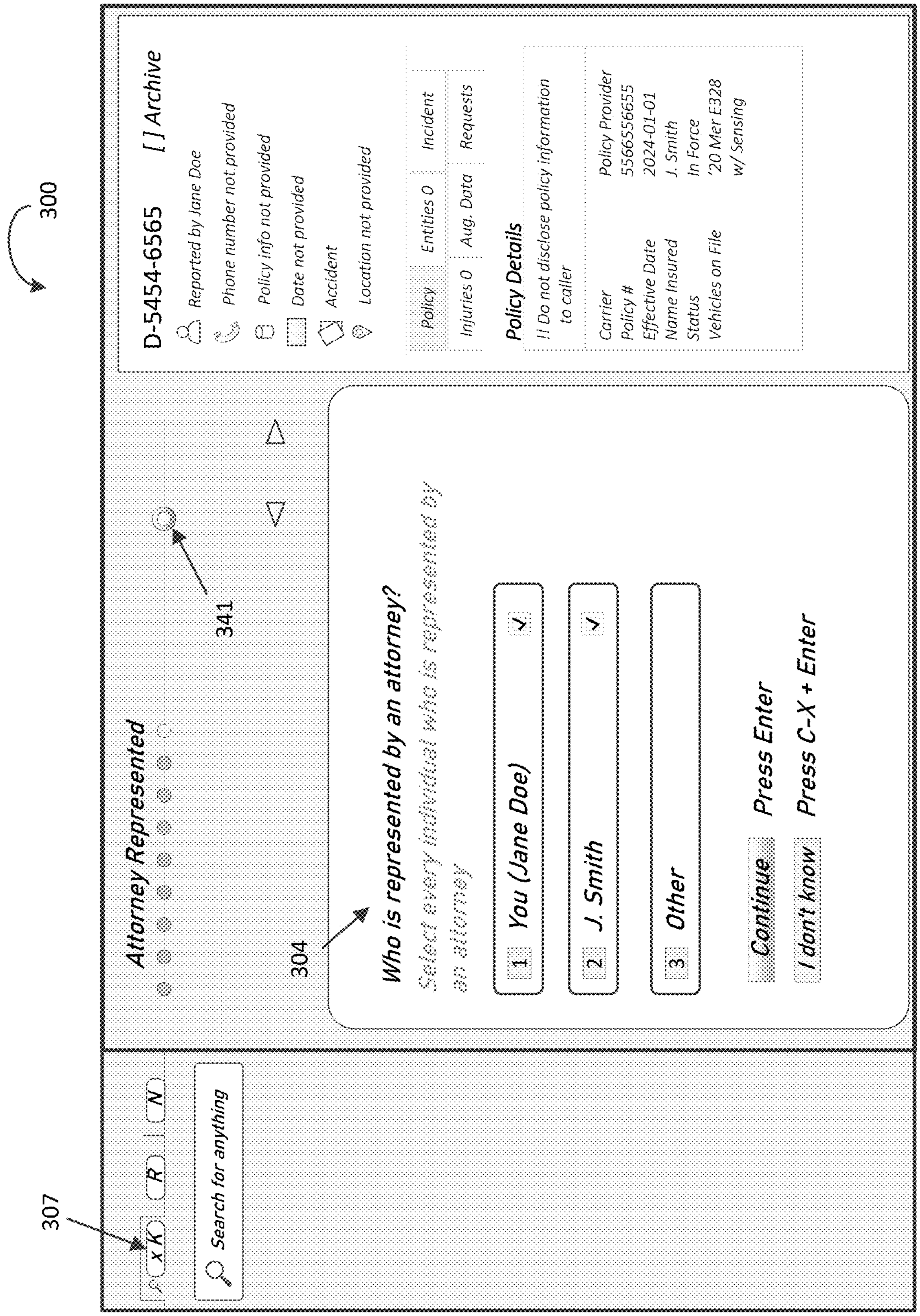

Referring to FIG. 3F, the user interface 300 is updated based on additional information provided by the caller, namely, the caller has indicated that an attorney is representing the caller (the user 194 says a keyword "lawyer" or "attorney," which can be detected by the computing system 100 via voice recognition). Based on this offered information, the call representative 196 can interact with the command K feature 307 to navigate to a sub-grouping corresponding to attorney representation, as indicated by the highlighted indicator 341. The dynamic script 304 is updated to instruct the call representative 196 to query the caller about the attorney representation, and a list of options are included allowing the call representative 196 to indicate each person that the caller knows is represented by an attorney.

Figure 3G:
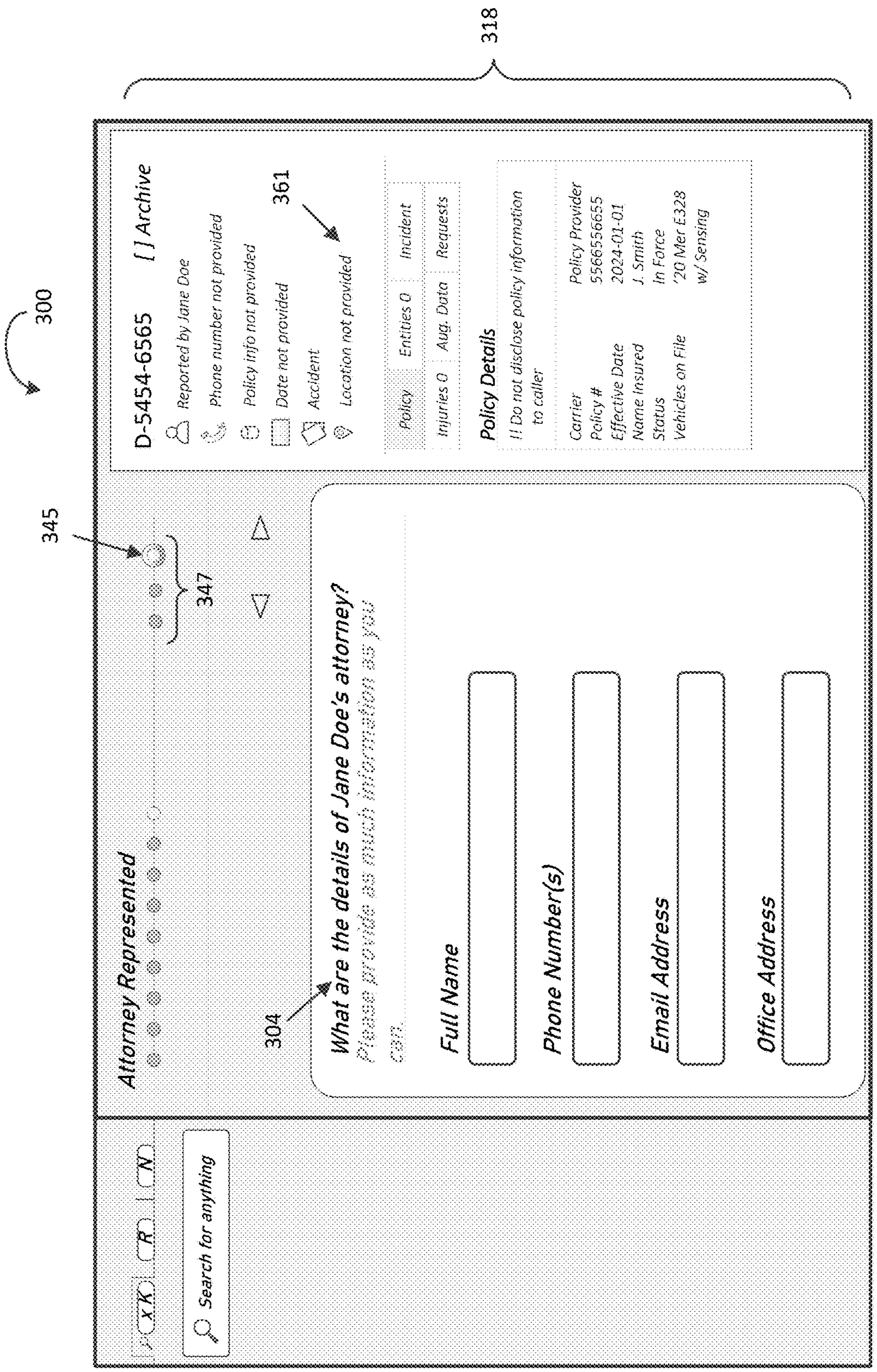

Referring to FIG. 3G, the attorney sub-flow 347 is indicated in the navigation bar, and the current page of the attorney sub-flow 347 is indicated by the highlighted indicator 345. As further shown in FIG. 3G, the information panel 318 provides a location indicator 361 that indicates that location information for the caller has not yet been provided. The dynamic script 304 has been updated to ask for additional details of the attorney sub-flow 347.

Figure 3H:
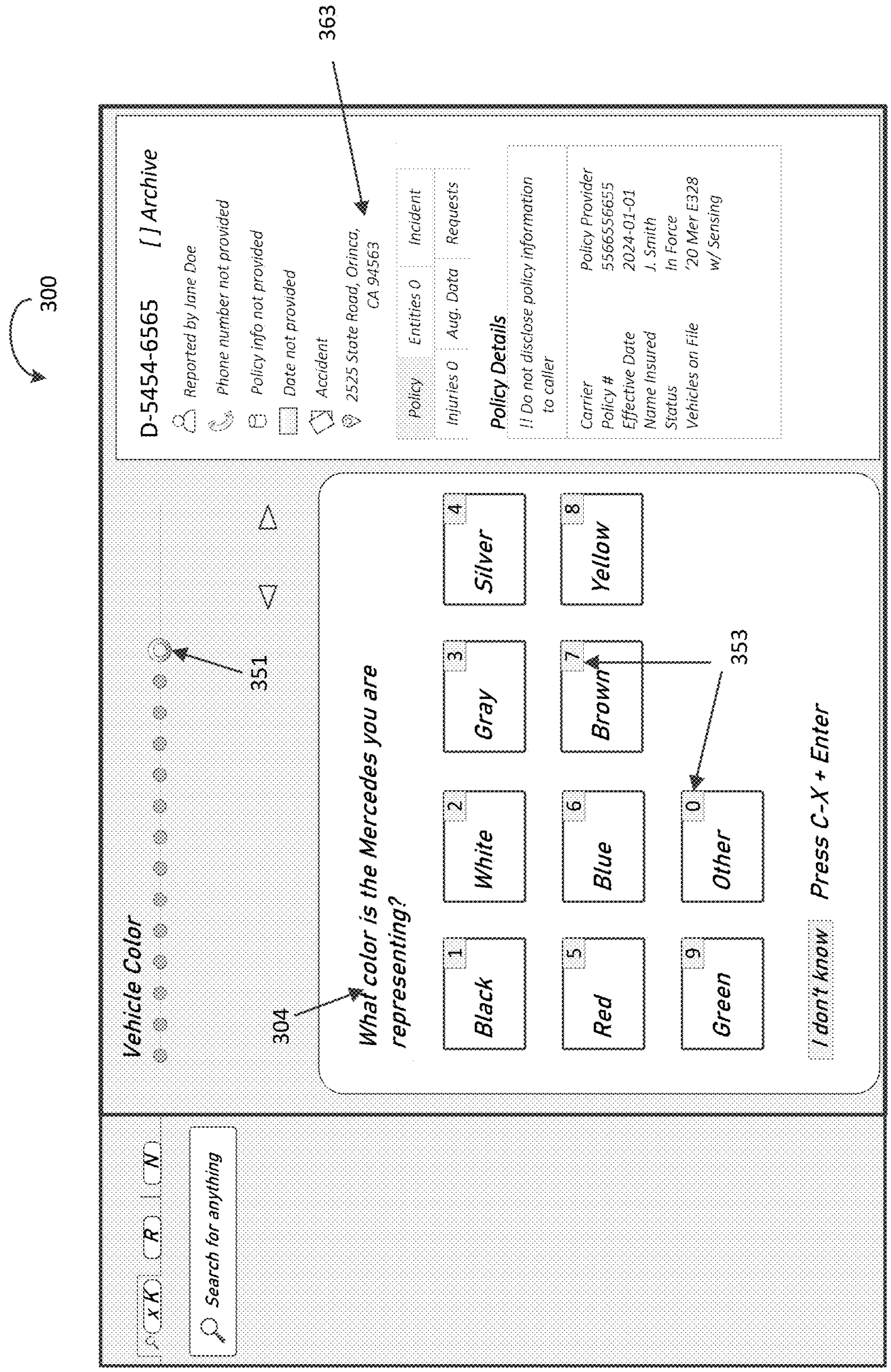

Referring to FIG. 3H, the user interface 300 been updated after the sub-flows for injury and attorney representation have been completed, and the content flow is recalculated to a fourteenth page of the original content flow, as indicated by the highlighted indicator 351 in the navigation bar. The dynamic script 304 has also been updated to query the caller about a vehicle that was involved in the incident. As shown in FIG. 3H, the caller's location has been verified as shown by the location indicator 363 and a set of options with corresponding key accelerators 353 are provided to the call representative 196 to reflect the caller's answers to the call representative's answers.

Figure 3I:
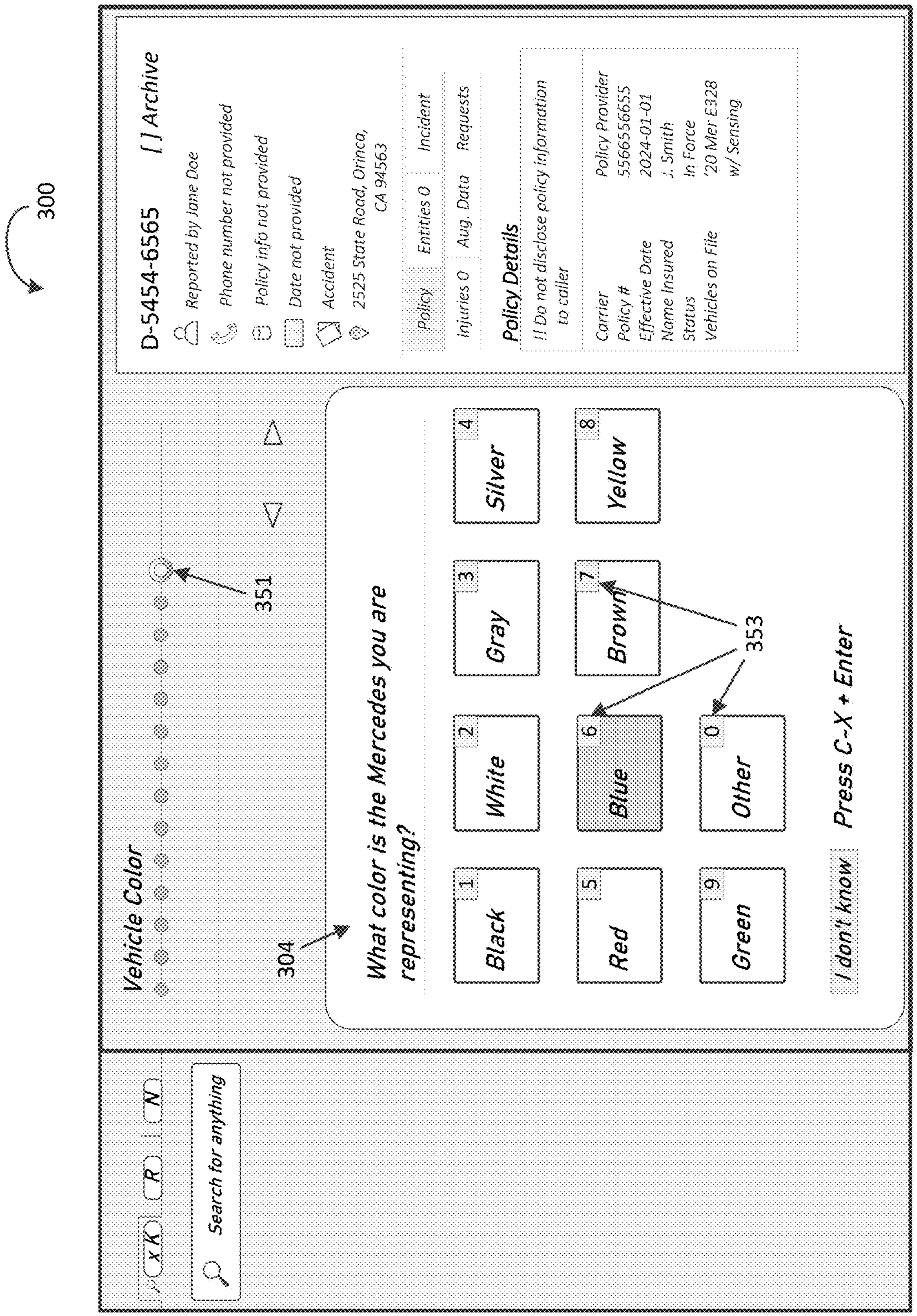
Figure 3J:
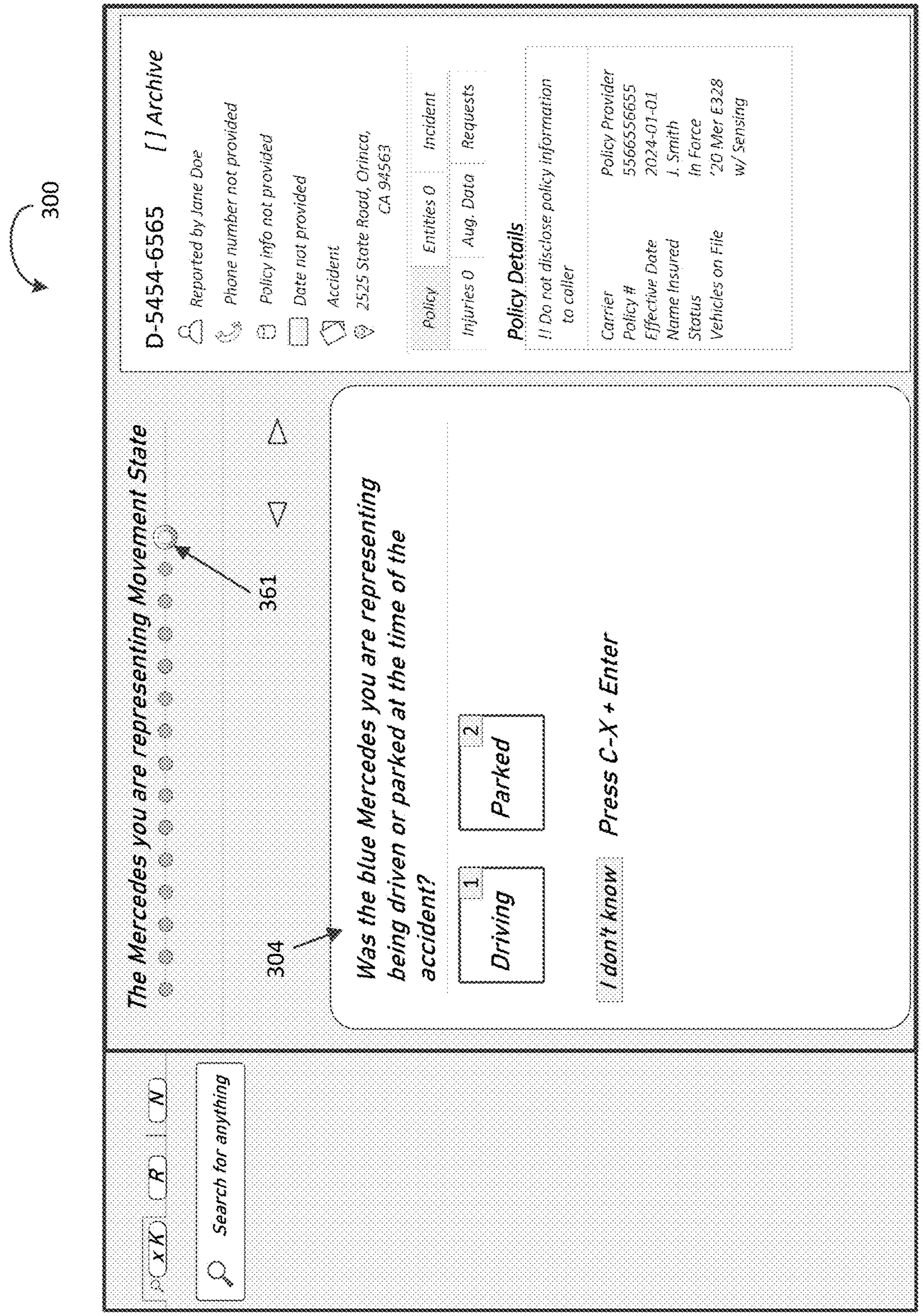

Referring to FIG. 3I, the call representative 196 has selected the "Blue" option for the vehicle's color, which can comprise a key strike of the number "6" from the key accelerators 353, or a mouse-click or touch input on the "Blue" selectable feature. Referring to FIG. 3J, the user interface 300 has been updated to a fifteenth page of the content flow as indicated by the highlighted indicator 361, and the dynamic script 304 has been updated to query the caller about details of the vehicle.

Figure 4A:
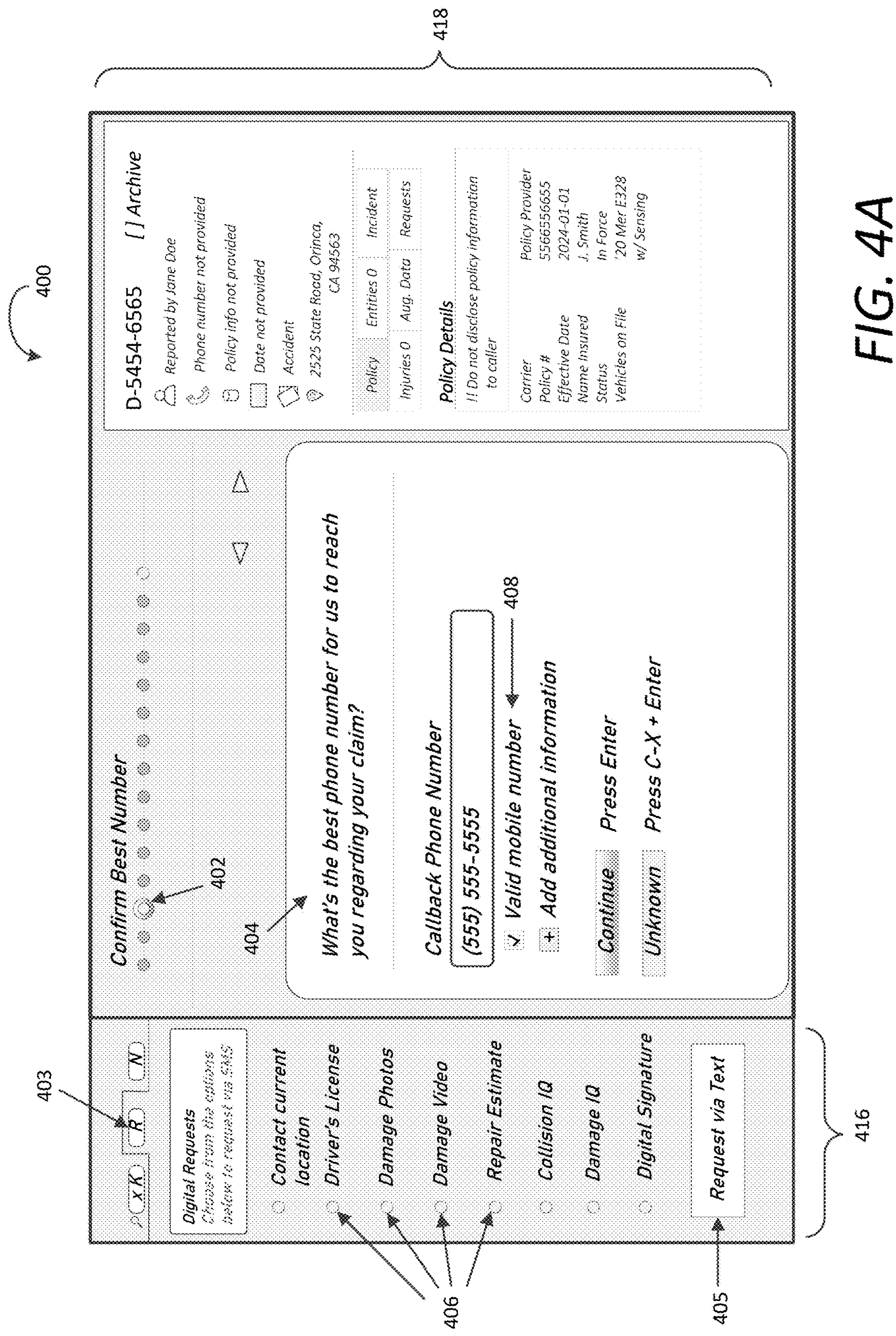
FIGS. 4A through 4E illustrate an example graphical user interface enabling a call representative to make digital requests, according to various examples.

FIGS. 4A through 4E illustrate an example graphical user interface enabling a call representative to make digital requests, according to various examples. As shown in FIG. 4A, the user interface 400 presented to the call representative 196 enables the call representative 196 to navigate to a previous page of the content flow. In the examples shown in FIG. 4A, the call representative 196 has navigated to a phone number confirmation page, as indicated by the highlighted indicator 402, and the dynamic script 404 is updated to query the caller about the caller's phone number. As provided herein, a ruleset of the policy provider (e.g., of the selected policy shown in the information panel 418) or a set of regulations can provide restrictions on both the call representative 196 and the content flow presented on the user interface 400. As such, certain information that is verified, such as the caller's location, the caller's phone number, etc., can unlock additional pages or sub-flows of the content flow as well as restricted information.

One such restriction can correspond to the verification of the caller's phone number. When the caller provides a phone number, the call representative can input the phone number in a relevant text box. In various examples, the computing system 100 can automatically verify whether the phone number inputted by the call representative 196 matches the phone records of the caller (e.g., as a background operation by accessing a phone records database to match the phone number inputted by the call representative 196 with a phone record of the caller). If the phone number is verified, then a validation feature 408 can automatically update to indicate that the number has been verified.

In various examples, the user interface 400 can include an expandable panel 416 that includes the command K tab and a digital requests tab. When the call representative selects the digital requests tab 403, a set of digital request options 406 is presented that enables the call representative 196 to connect with the caller's phone or computing device for a variety of purposes. When the call representative 196 selects a digital request option 406, the call representative 196 can then select a request button 405 to facilitate the connection with the caller's phone or computing device.

Figure 4B:
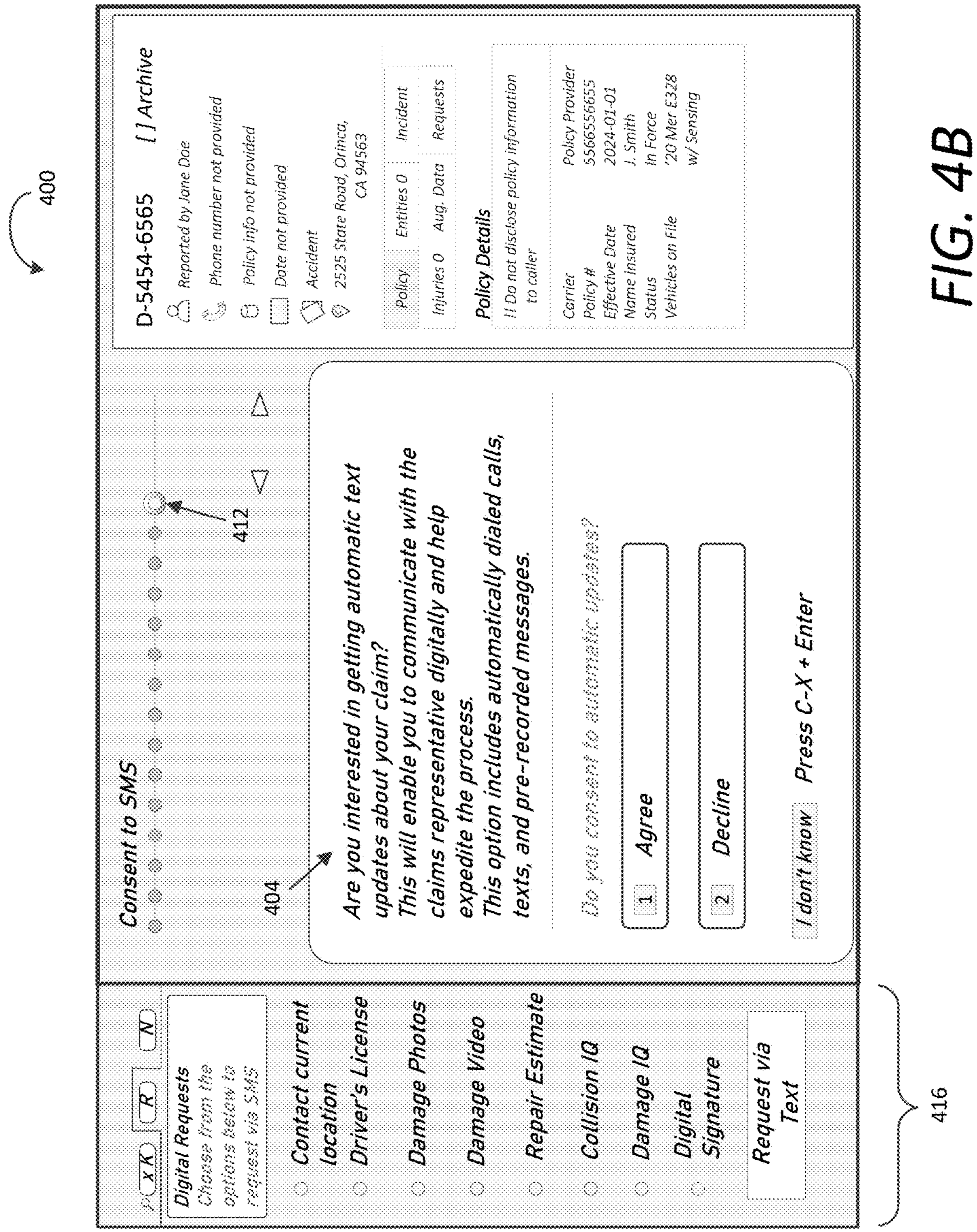
Figure 4C:
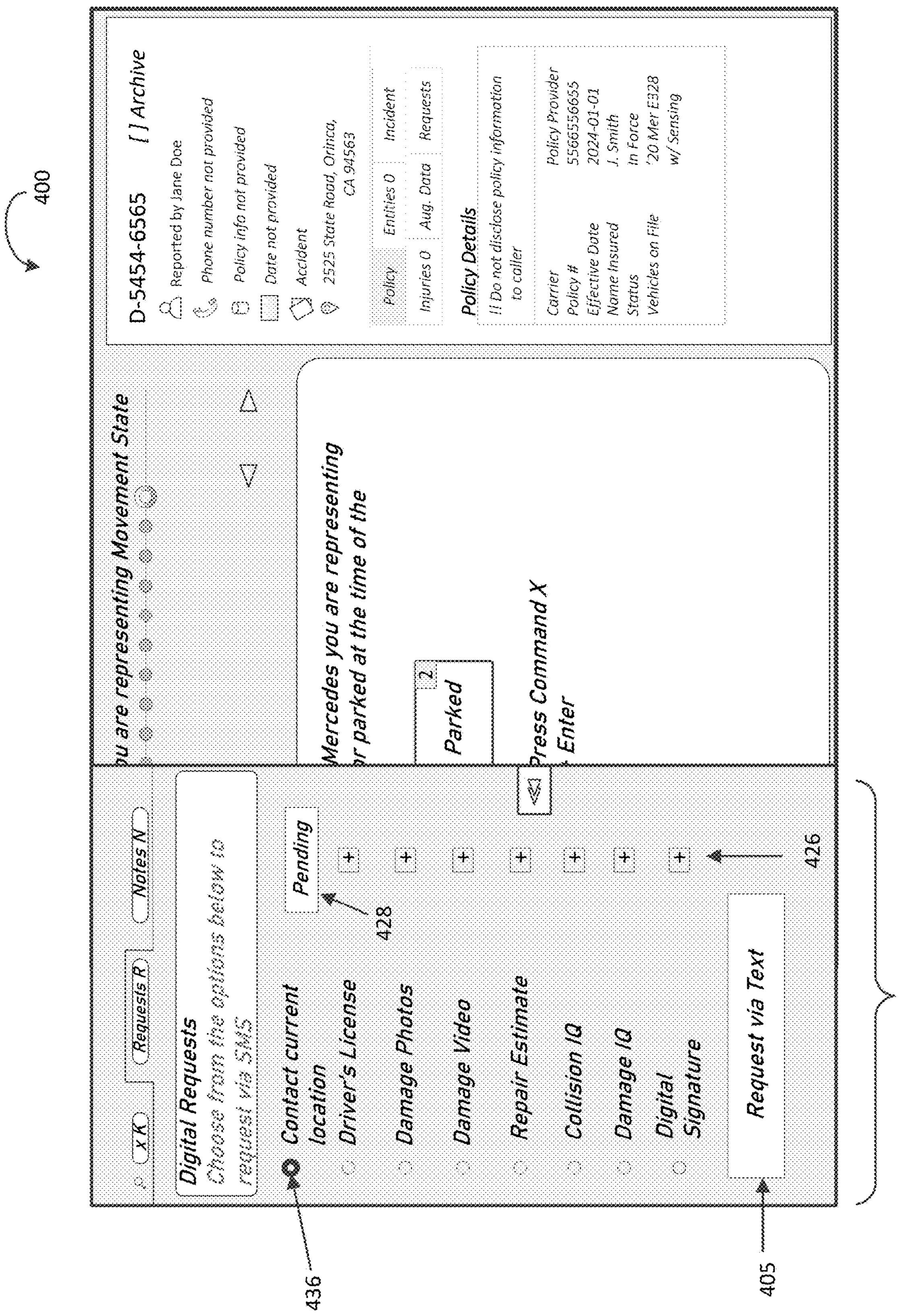

Referring to FIG. 4B, the user interface 400 has been updated to a current page as indicated by the highlighted indicator 412, and the dynamic script 404 has been updated to ask the caller if the caller is interested in getting automated communications. If the caller agrees, the call representative 196 can select "agree" and utilize the expandable panel 416 to make digital requests to the caller. Referring to FIG. 4C, the call representative 196 can select a "content current location" feature 436 of the digital requests panel 438, and while the computing system 100 communicates with the caller's phone, a "pending" notification 428 is provided on the user interface 400. In various examples, the call representative 196 can select any one of the set of options for digital requests by providing a selection input on an add feature 426 corresponding to a particular option and then selecting the request button 405.

Figure 4D:
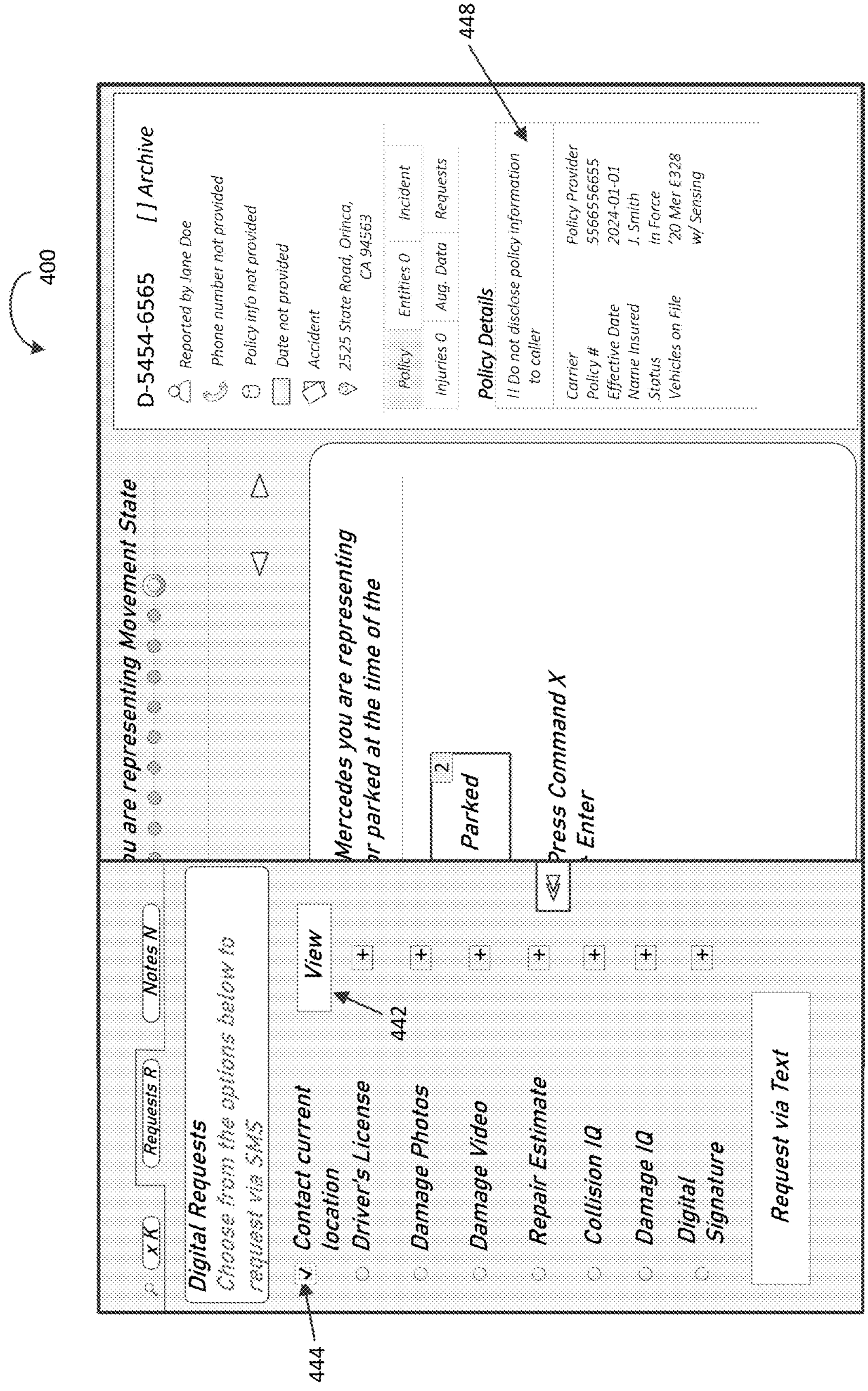

Referring to FIG. 4D, the computing system 100 has contacted the caller's phone and accessed the location-based resource to verify a location of the caller, as indicated by the location verification indicator 444. A view button 442 enables the call representative 196 to view the caller's current location to provide additional verification of the caller. As shown in the user interface 400 of FIG. 4D, a disclosure warning 448 persists based on the caller still not meeting a set of verification criteria (e.g., based on policy provider rules or regulations).

Figure 4E:
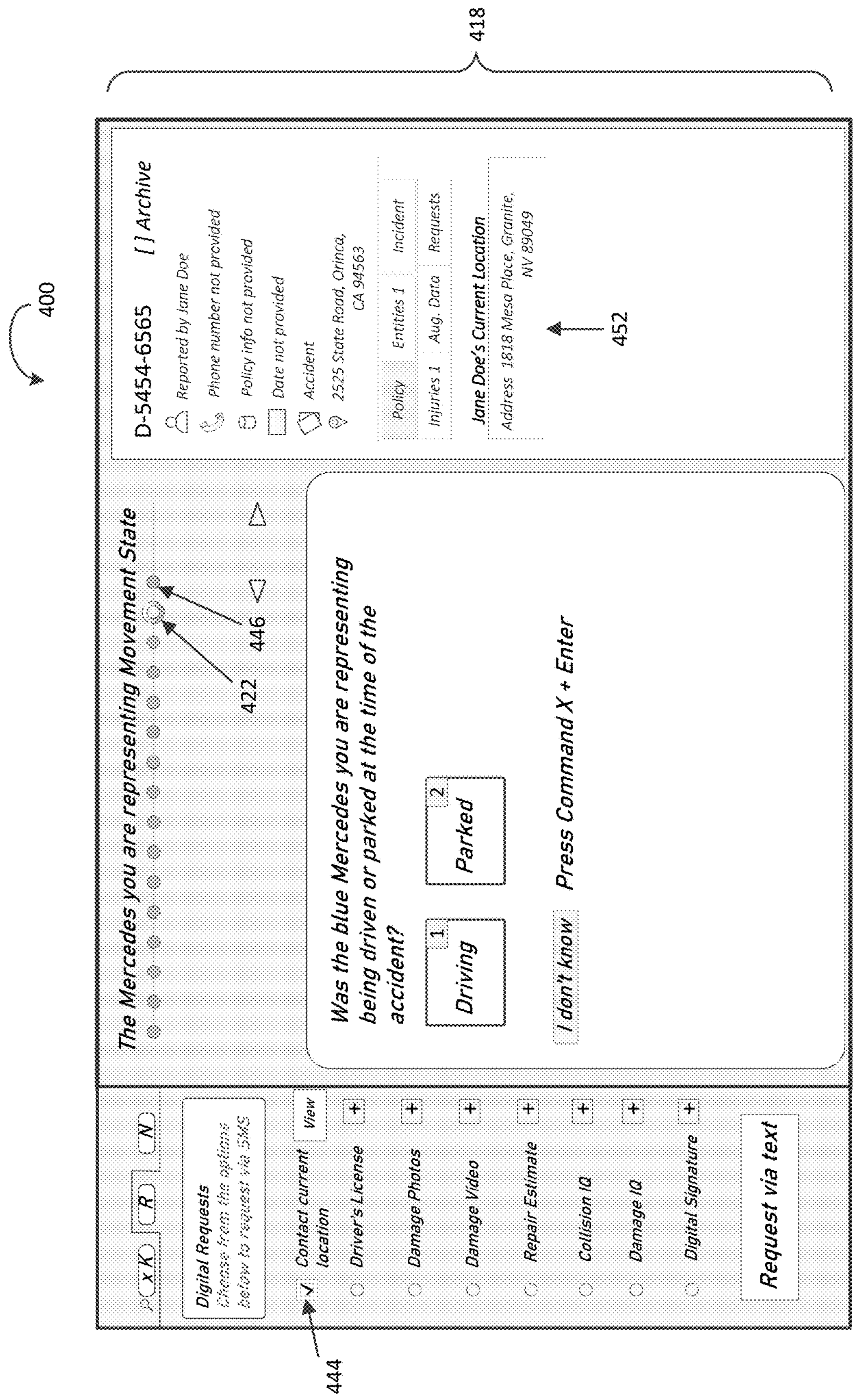

Referring to FIG. 4E, the user interface 400 has been updated to a current page, as indicated by the highlighted indicator 422, and information on a next page may have already been provided based on the indicator 446 corresponding to the next page being filled. The caller's current location has been verified as indicated by the location verification indicator 444, and the current location of the caller is provided in a location identifier 452 in the information panel 418. Based on this verification, the content flow can unlock one or more sub-flows and enable the call representative 196 to discuss further details in the information gathering process.

As shown in FIG. 4E, various digital requests can be selected to communicate with the caller's phone for specified purposes. Certain digital requests can cause an email or text message to be transmitted to the caller's phone, which can include a link that opens or launches a software application or browser application that can facilitate additional information gathering. These features can enable access to the camera of the caller's device (e.g., to take a photo of the caller's driver's license, take a photo of vehicle damage or property mage, provide a repair estimate, identify collision damage on a virtualized vehicle, provide collision information, or provide a digital signature for a particular document). It is contemplated that performing these live verifications using real-time image data can prevent or act as a deterrence to any fraudulent filings or activity.

Figure 5A:
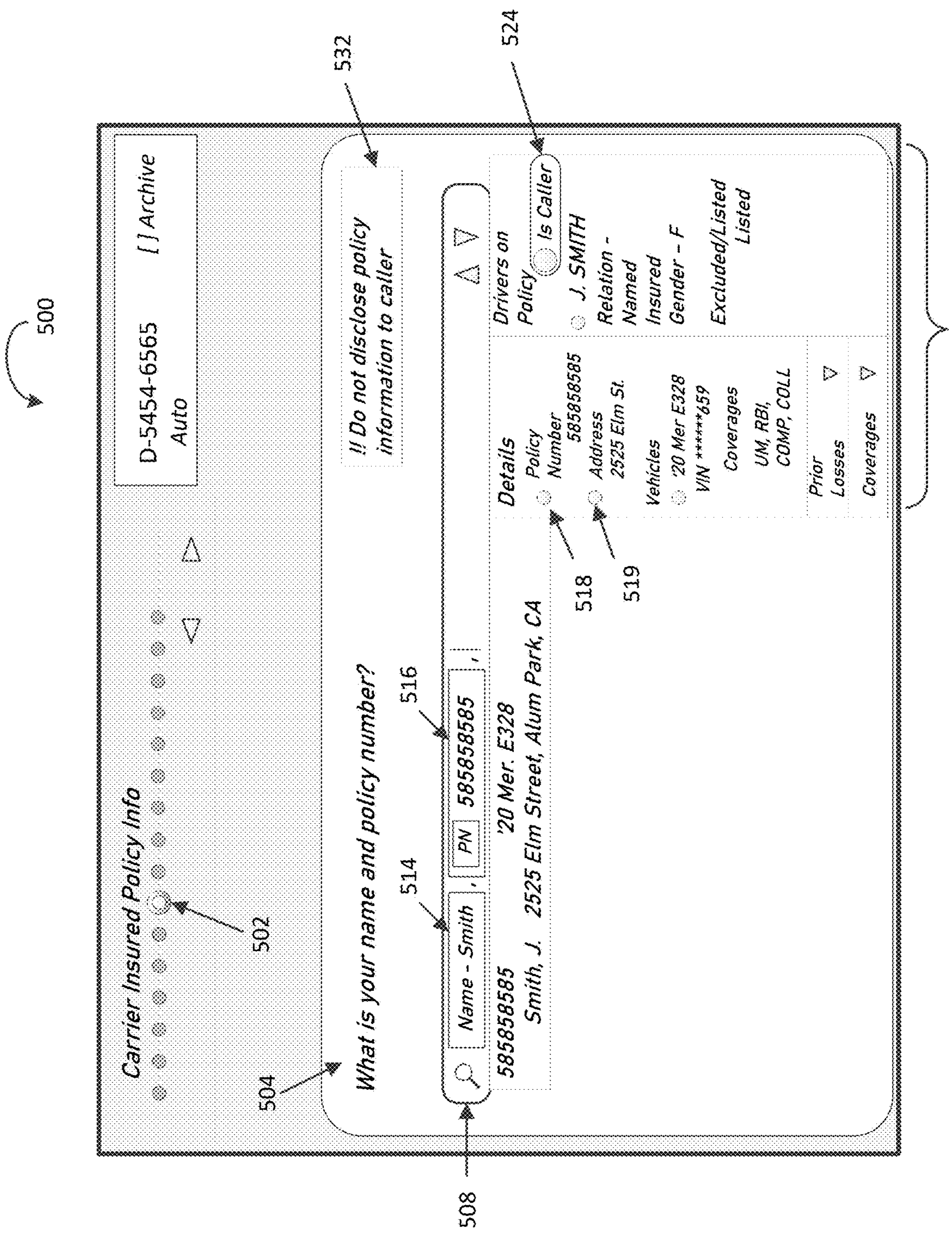
FIG. 5A through 5D illustrate an example graphical user interface providing intelligent search categorization and user verification techniques to assist a call center representative, according to various examples.

FIG. 5A through 5D illustrate an example graphical user interface providing intelligent search categorization and user verification techniques to assist a call representative 196, according to various examples. Referring to FIG. 5A, the user interface 500 presented on the call representative's computing device 195 can be updated to show a current page (represented by the highlighted indicator 502) and the dynamic script 504 can query the caller for a name and policy number. As provided herein, an intelligent search box 508 is provided that includes filter elements 514, 516 based on verified information provided by the caller (e.g., name filter element 514 and policy number filter element 516). When a matching result is displayed in a drop-down menu, and interactive panel 512 is presented that enables the call representative 196 to verify additional information of the caller, such as the policy number 518, address 519, and the identity of the caller 524. As shown in FIG. 5A, the warning 532 to not disclose policy information persists based on the verification ruleset not being satisfied.

Figure 5B:
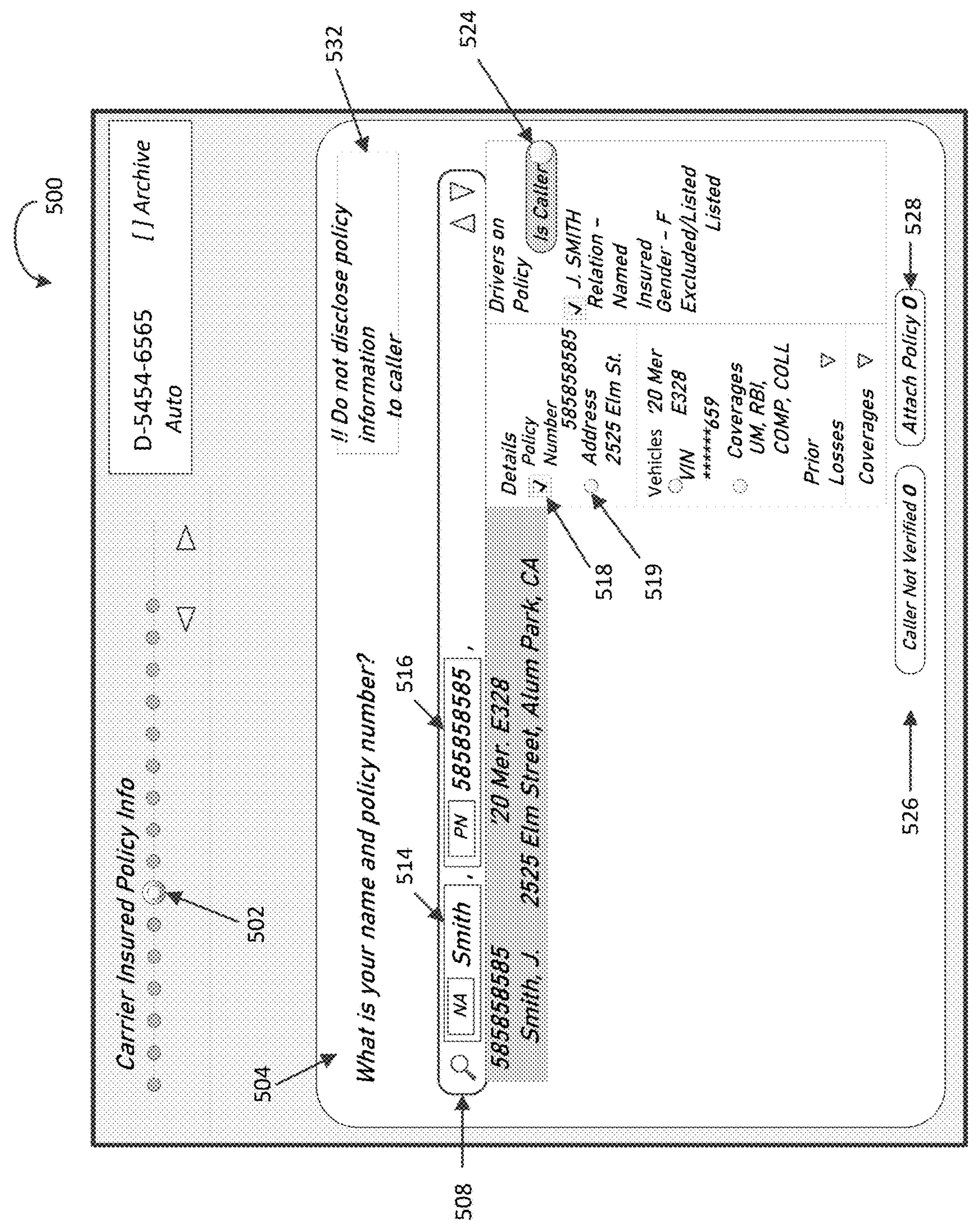

Referring to FIG. 5B, a verification indicator 526 indicates that the caller has yet to be verified and a policy attachment indicator 528 shows that the caller's policy or a policy that the caller is inquiring about has not been attached. The warning 532 to not disclose policy information persists, even though the caller has been indicated as the user 194 whose policy is being discussed, as shown by the caller identification selector 524. Furthermore, the policy number 518 has been verified, but not the address 519. It is contemplated that various jurisdictions or policy provider rules can restrict communication of private information over the phone, such as policy details, unless the caller has been verified. The restrictions on the user interface 500 is governed by these rulesets, which can be dynamically applied based on the relevant jurisdiction (e.g., location of the claim incident) or the policy provider ruleset that corresponds to the policy being discussed. As such, the restrictions on the user interface 500 can be dynamically adjusted based on a specified ruleset that corresponds to either the policy provider of the policy being discussed or a regulation set by a governing entity (e.g., state or federal laws).

Figure 5C:
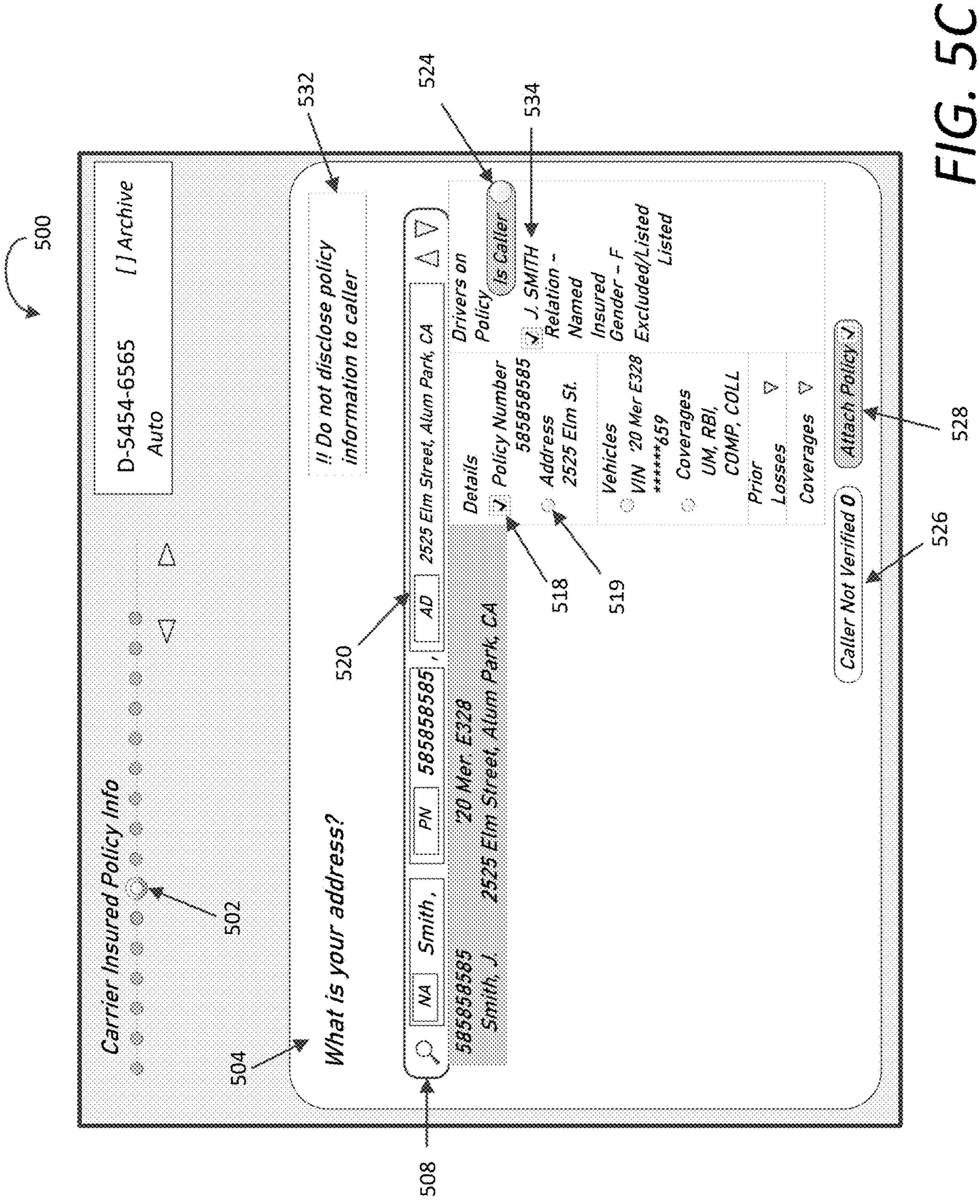
Figure 5D:
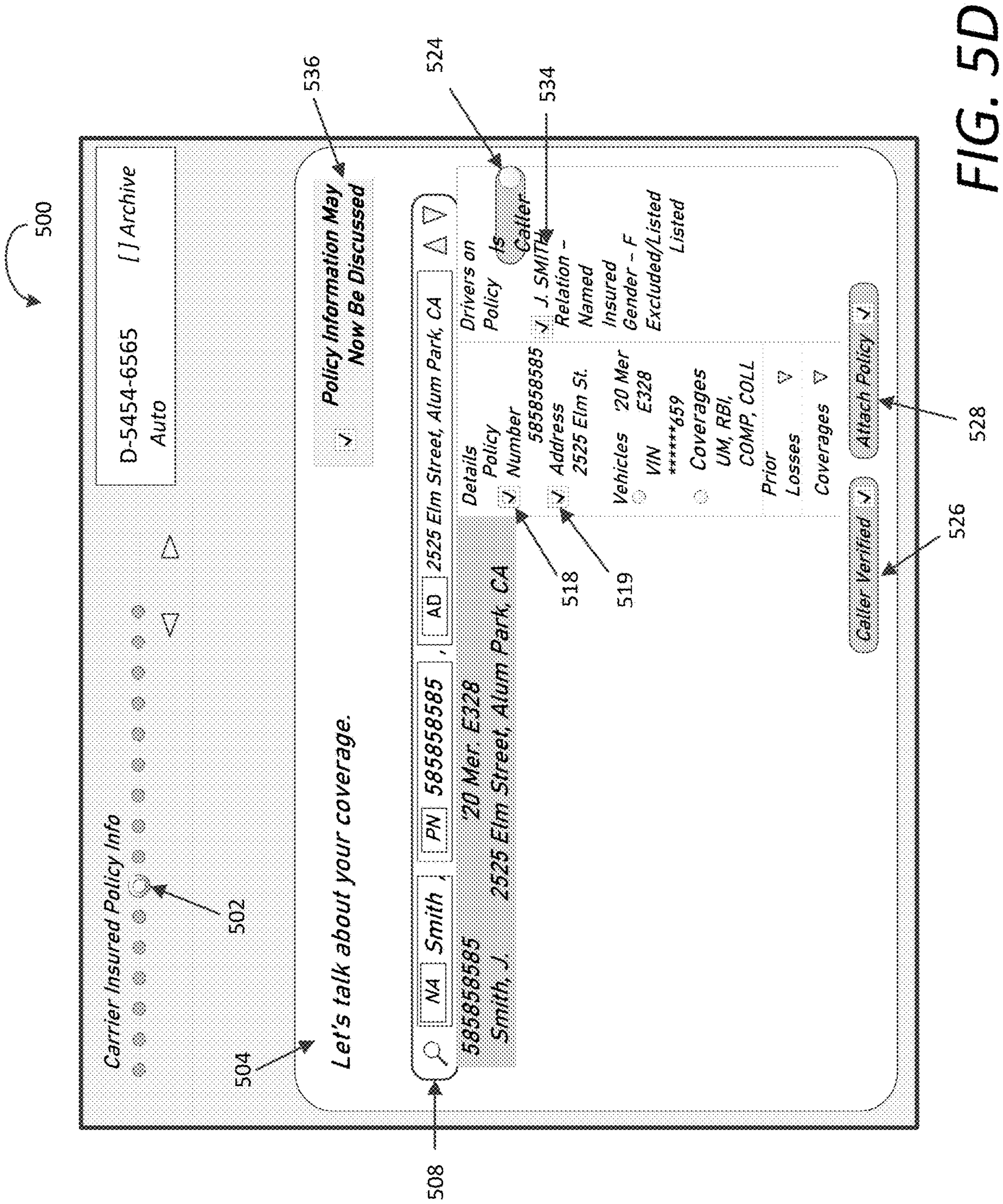

Referring to FIG. 5C, filter elements in the intelligent search box 508 can include an address filter element 520 based on an address typed into the search box 508 or selected in the drop-down menu. Based on certain conditions in a relevant ruleset being satisfied, the call representative 196 can attach the caller's policy, as shown by the policy attachment indicator 528. As shown in FIG. 5C, the verification indicator 526 still does not indicate that the caller has been verified, and therefore the warning 532 to not disclose policy information still persists. Referring to FIG. 5D, the address 519 has been verified and the verification indicator 526 shows that the caller has now been verified. As such, the warning 532 has been updated to an authorization notification 536 indicating that the policy information of the caller may be discussed (e.g., based on a verification ruleset being satisfied).

FIG. 6A through 6E illustrates an example graphical user interface providing guided photo capture for a user, in accordance with examples provided herein. In various examples, the guided content capture process can be triggered via a call session with a call representative 196 or can be performed independently by the user 194 in an application session via real-time communication and verification with the computing system 100. The guided content capture process can be performed at any time, such as immediately after a vehicle incident, prior to the vehicle being towed to a tow yard or repair facility, after the vehicle has been towed, or any time prior to the vehicle being repaired.

In one example, the computing system 100 can transmit a text message or email to the computing device 600 of the user 194, which can cause a browser on the computing device 600 to launch a browser application that accesses the camera of the computing device 600. The browser application can initiate real-time communications with the computing system 100 that enables the computing system 100 to perform guided content capture techniques described herein. In variations, the user 194 can launch a service application on the user's computing device 600 to perform the guided content capture techniques described herein.

Figures 6A, 6B:
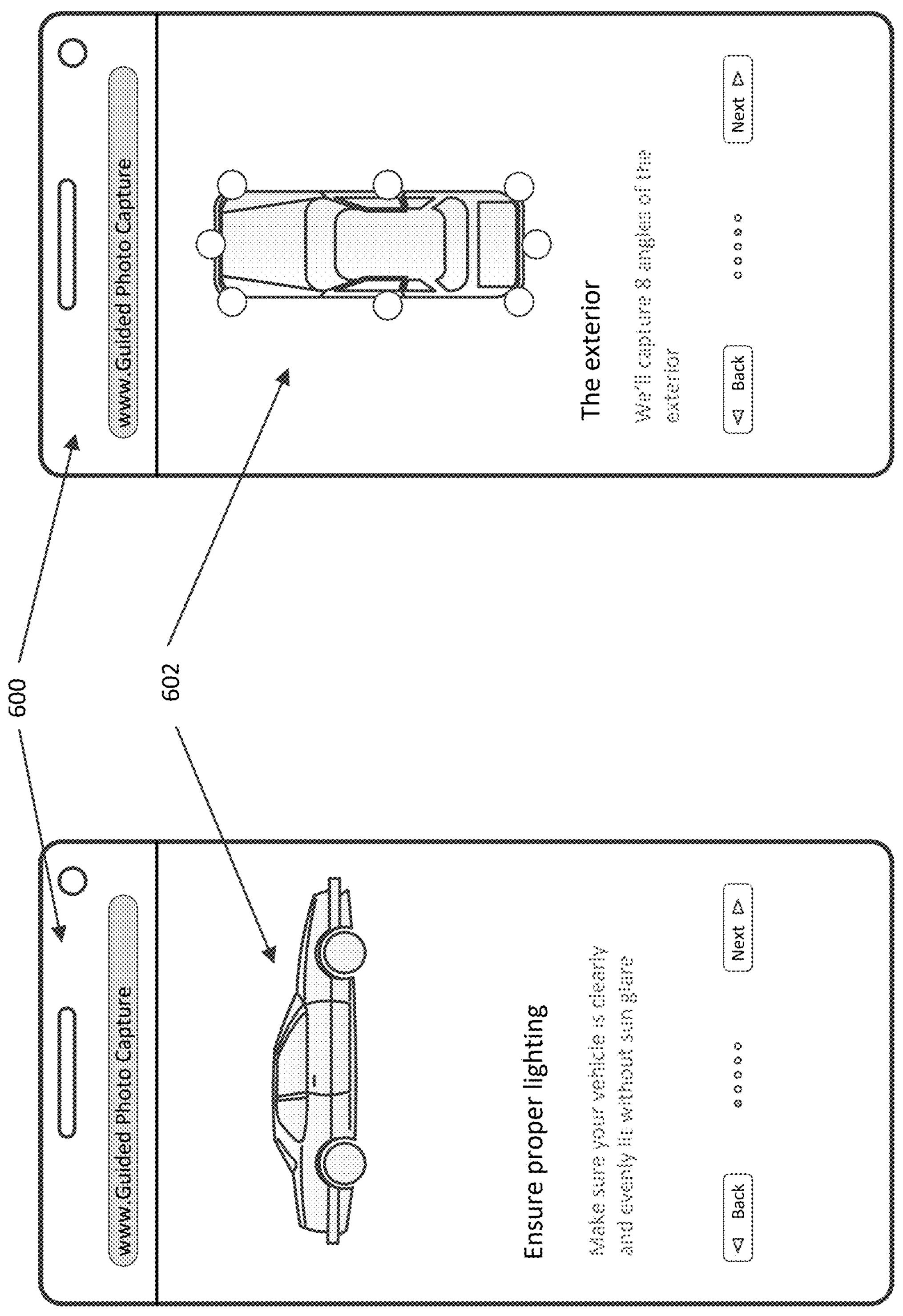
FIG. 6A through 6E illustrates an example graphical user interface providing guided photo capture for a user, in accordance with examples provided herein.

Referring to FIGS. 6A and 6B, when the computing device 600 of the user initiates guided content capture, a guided capture interface 602 is generated on the user's computing device 600. An initial set of screens or pages of the guided capture interface 600 can correspond to a tutorial that guides the user 194 to perform a set of steps to capture content corresponding to damage of the user's vehicle or property. As shown in FIGS. 6A and 6B, the guided capture interface 600 instructs the user 194 to ensure proper lighting and that the user 194 to capture certain angles of the exterior of the user's vehicle.

Figure 6C:
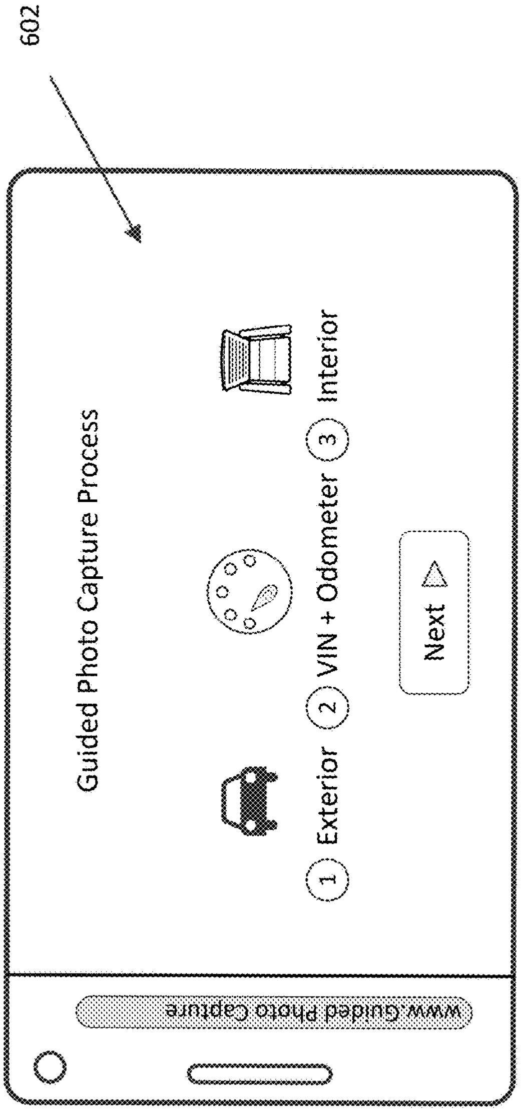
Figure 6D:
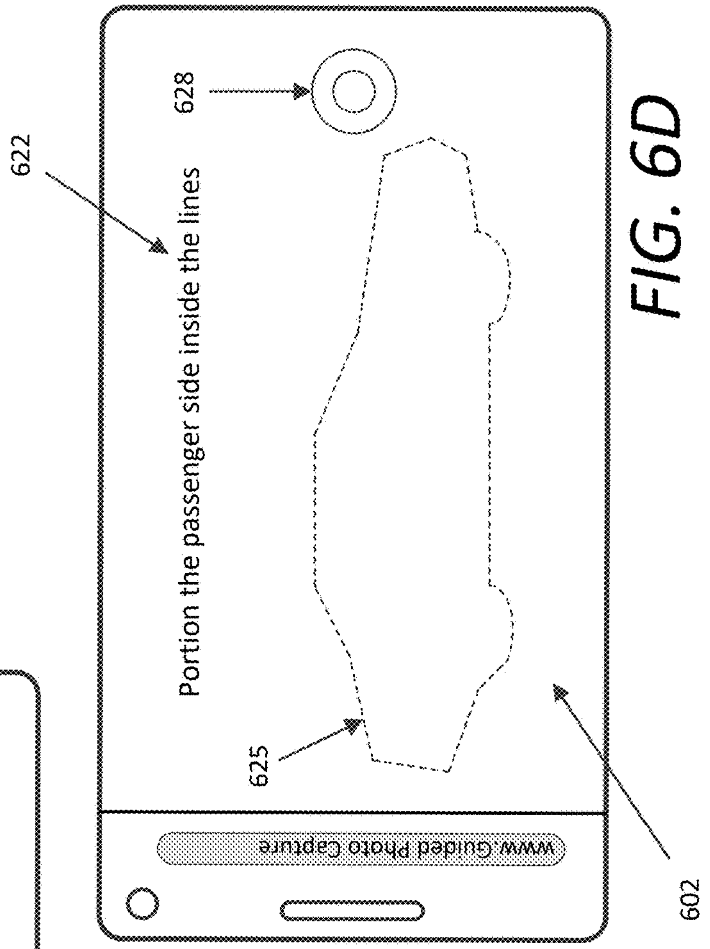

Referring to FIGS. 6C and 6D, the guided capture interface 602 can progress the tutorial to provided guidance to the user 194 in capturing the exterior of the vehicle, the vehicle identification number (VIN) and odometer, and the interior of the vehicle (if needed). As shown in FIG. 6D, the guided capture interface 602 generates a vehicle outline 625 and an optional content capture selector 628 that enables the user 194 to capture a photograph or video content of a specified angle of the vehicle. As described herein, the computing system 100 can perform a lookup of the user's vehicle, including the year, make, and model and generate the vehicle outline 625 based on this information.

In one example, an initial request by the guided capture interface 602 can comprise a request to capture the license plate number or VIN of the vehicle, after which the computing system 100 can perform optical character recognition (OCR) or computer vision techniques to detect the individual characters of the license plate or VIN, and perform a lookup in a vehicle database of the user's specific vehicle. Thereafter, the computing system 100 can generate the vehicle outline 625 for presentation on the guided capture interface 602. The guided capture interface 602 can also include guided text 622 that instructs the user 194 to capture a particular photograph or video content within the bounds of the vehicle outline 625.

Figure 6E:
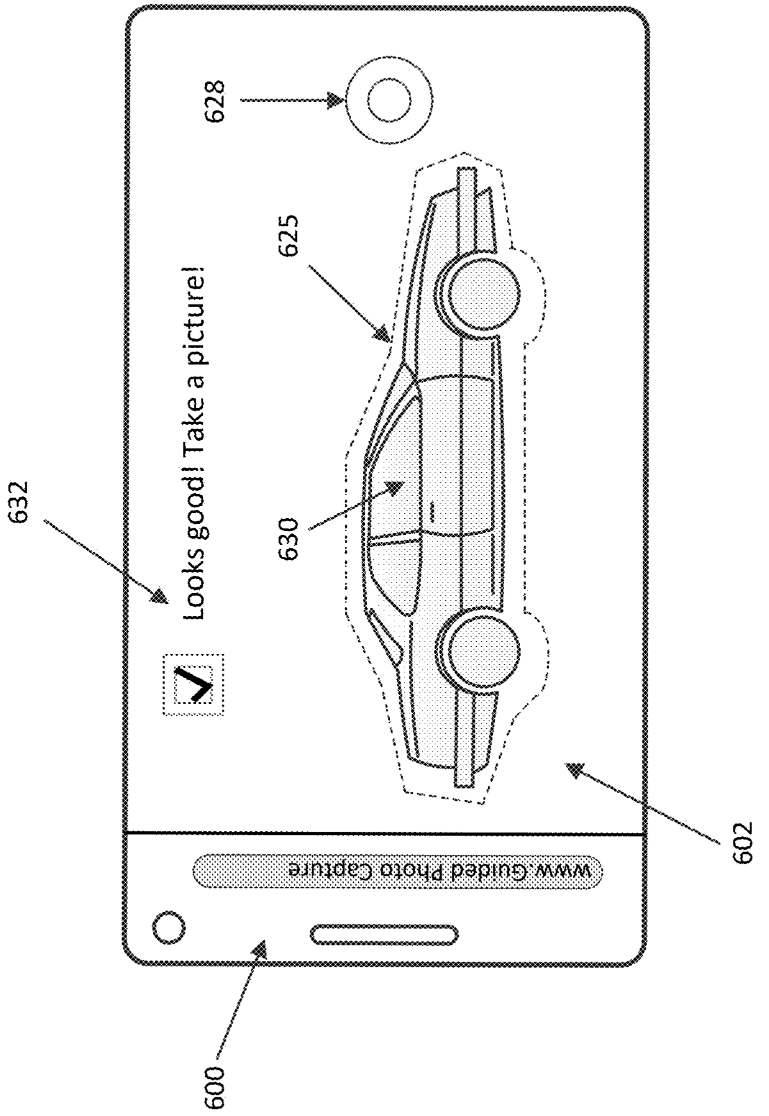

Referring to FIG. 6E, as the user 194 aligns the vehicle 630 within the vehicle outline 625, the backend computing system 100 can perform a computer vision, image analysis process to determine when the vehicle 630 is within the vehicle outline 625, and trigger an authorization or approval notification 632 (e.g., tint the interface 602 green and provide an approval message). In certain implementations, this trigger can also activate the content capture selector 628 to enable the user 194 to capture the vehicle 630. In variations, the trigger can automatically cause the user's computing device 600 to capture the photo or video content of the vehicle 630. As provided herein, the computing system 100 can generate vehicle outlines for each angle of the exterior of the vehicle 630 to be captured, and the computer vision techniques can trigger the authorization or approval notification 632 for each angle, or the computing system 100 can cause the camera of the user's computing device 600 to automatically capture the respective content for each particular angle. When all instructed content is captured and received by the computing system 100, the content can be included in the user's claim file 112, which comprises the entire corpus of information corresponding to the user's claim.

Figures 7A, 7B:
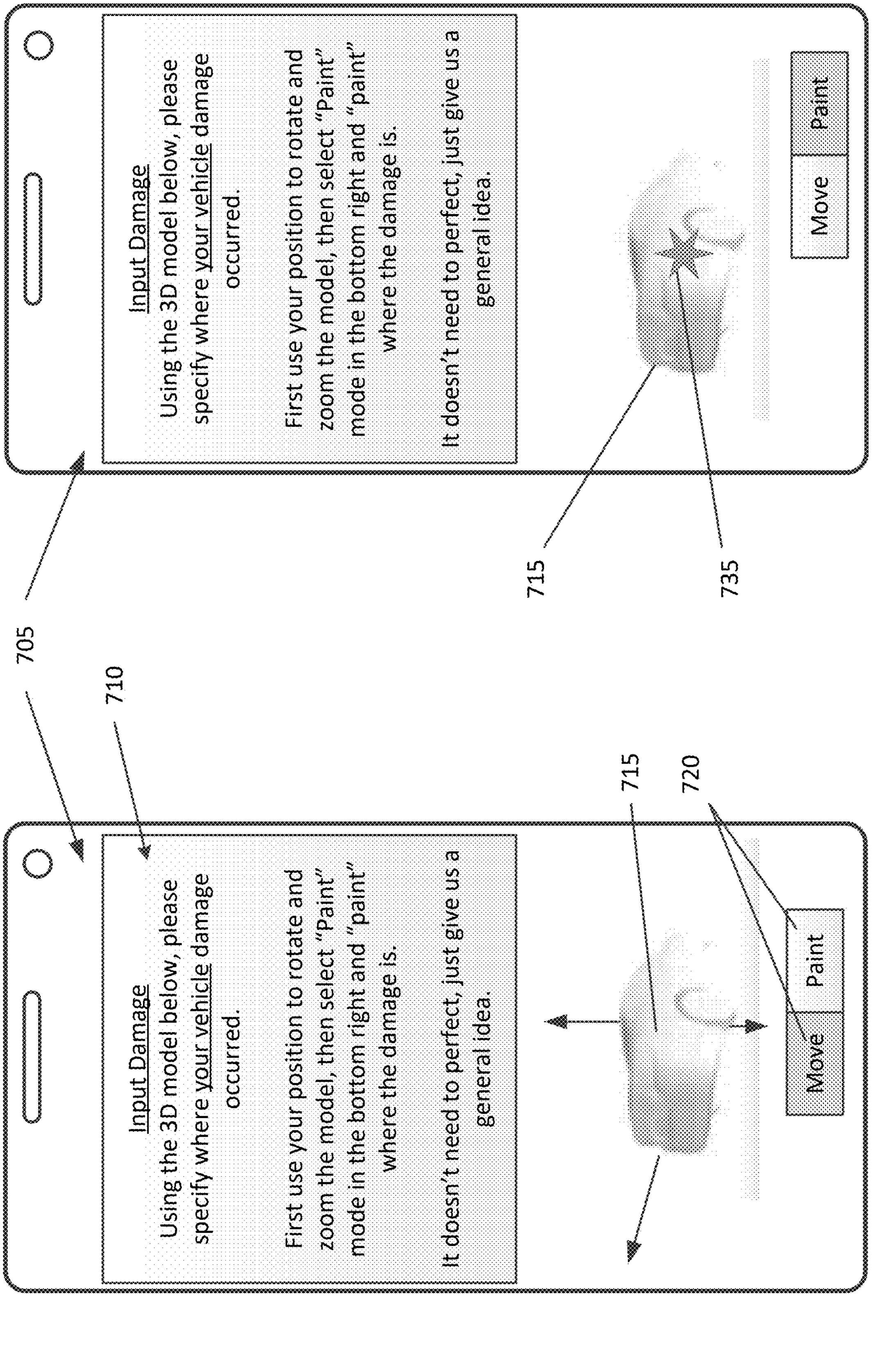
FIGS. 7A and 7B illustrate an example graphic user interface enabling a user to indicate collision damage on a virtualized vehicle, according to example described herein.

FIGS. 7A and 7B illustrate an example collision interface 705 enabling a user to indicate collision damage on a virtualized vehicle, according to example described herein. In various examples, following a vehicle incident, the user 194 may be instructed to indicate damage to the vehicle using a three-dimension representation 715 of the user's vehicle. As described herein, the three-dimensional representation 715 can be generated based on the year, make, and model of the user's vehicle (e.g., as looked up in a vehicle database). The collision interface 705 can include instructions 710 to indicate vehicle damage, and the three-dimensional representation 715 can be rotated about a set of axes to enable the user 194 to indicate damage at any part of the vehicle's exterior.

In certain implementations, the user 194 can toggle between a "move" button, which enables the user 194 to rotate the three-dimensional representation 715, and a "paint" button, which enable the user 194 to indicate the location(s) of damage on the vehicle. When the user 194 has finished indicating damage on the three-dimensional representation 715, the damage information indicated by the user 194 can be compiled with other damage information, such as captured content, witness and driver statements, police reports, medical information, injury information, and the like, within the claim file 112 of the user 194. As provided herein, the corpus of information compiled in the claim file 112 may be used as training data to train the various machine-learning models described throughout the present disclosure, and/or can be used to determine reserve estimates, total payout amounts or predicted settlement amounts, and the like.

Figure 8A:
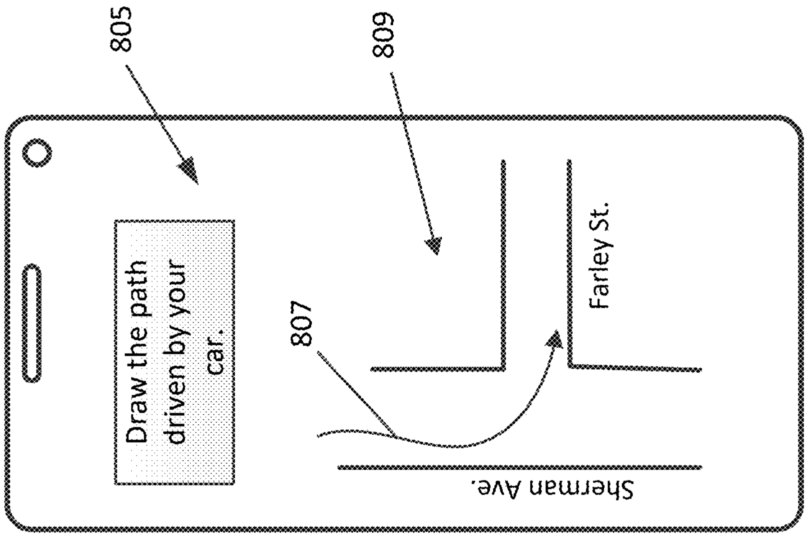
FIGS. 8A through 8E illustrate an example graphical user interface enabling a user to provide collision input, according to various examples.
Figure 8B:
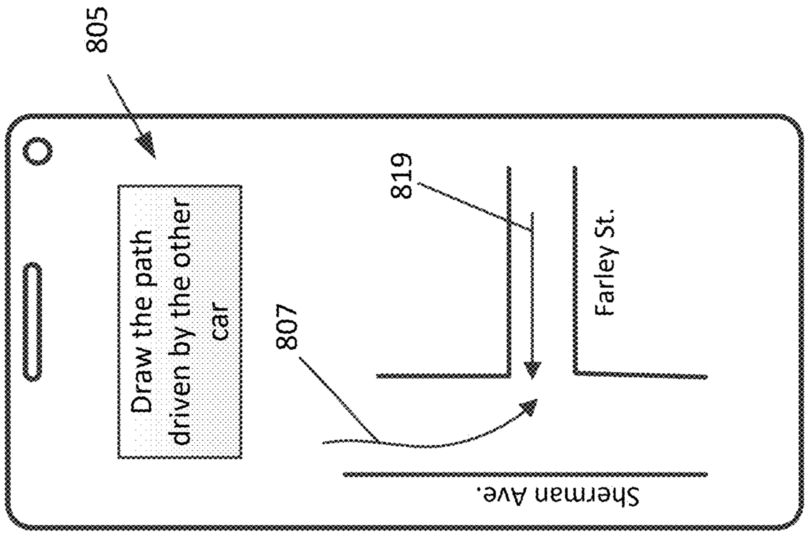
Figure 8C:
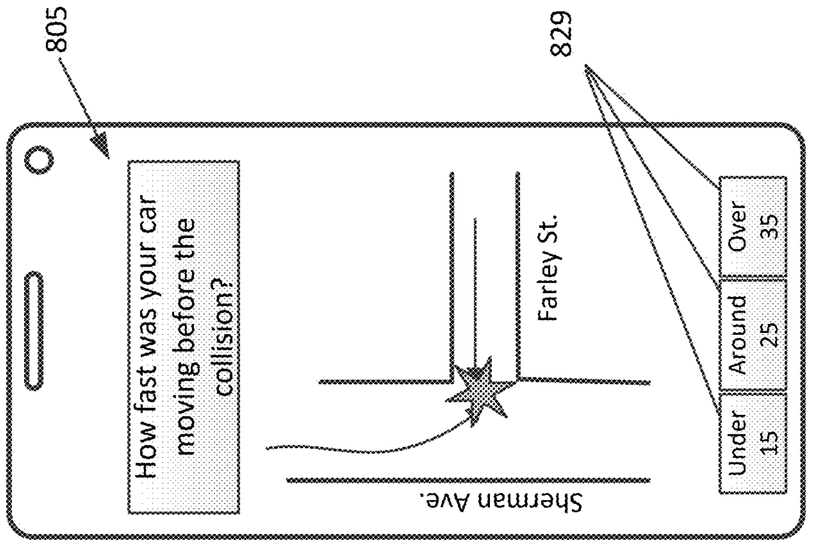
Figure 8E:
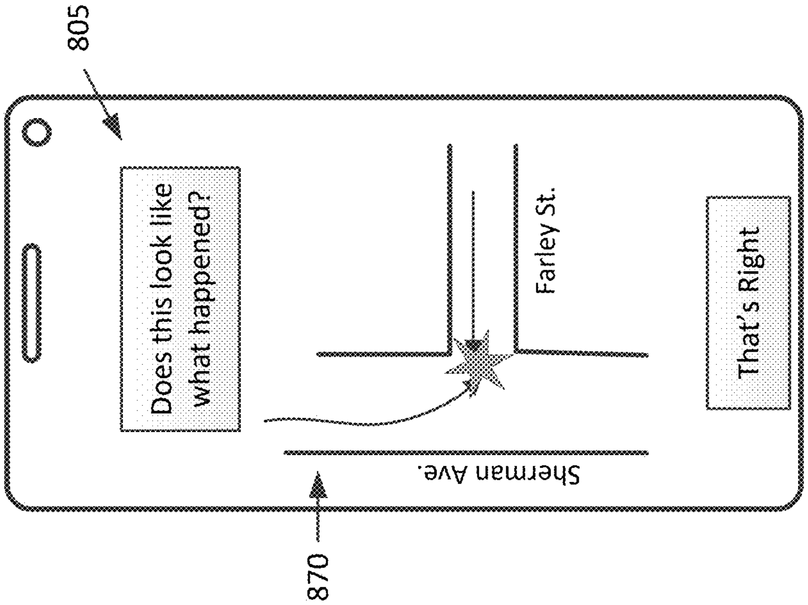

FIGS. 8A and 8E illustrate an example collision interface 805 enabling a user 194 to provide collision input, according to various examples. The collision interface 805 can be presented on the computing device 800 of a user 194 subsequent to a vehicle collision, and can enable the user 194 to provide input to indicate certain details of the collision, such as the trajectory of the vehicle(s) over satellite data or map data of as particular location of the vehicle incident, estimated speeds of each vehicle, and the like. Referring to FIG. 8A, the collision interface 805 can request that the user 194 provide input to draw the path of the user's vehicle 807 on a map interface 809.

Figure 8D:
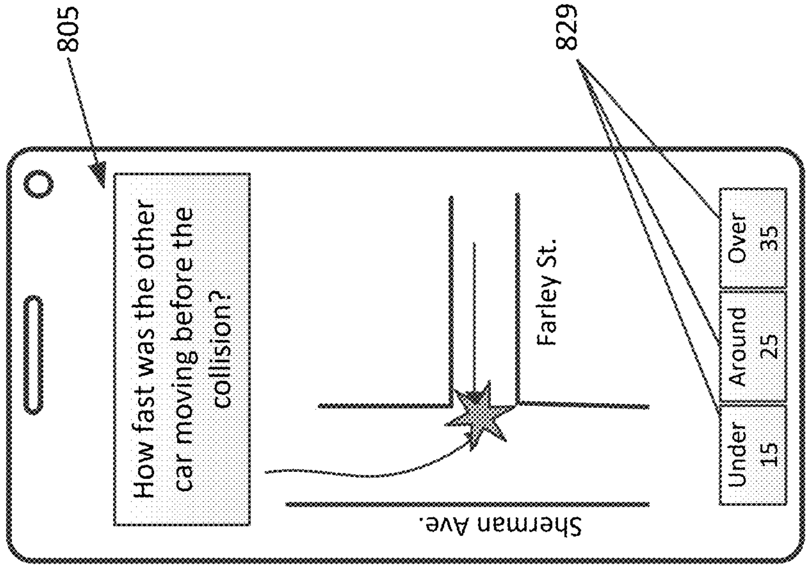

Referring to FIG. 8B, the collision interface 805 requests that the user 194 draw the path of the other vehicle 819 involved in the collision. Referring to FIGS. 8C and 8D, the user 194 is requested to indicate the estimated speeds of the user's vehicle and the other vehicle involved in the collision, and is provided with a set of options 829 to indicate the relative speeds of each vehicle. Referring to FIG. 8E, the computing system 100 can process the inputs provided by the user 194 to generate a simulation of the vehicle collision 870, and can query the user to indicate whether the simulation is accurate. In variations, other users and individuals that witnessed or were party to the vehicle collision may be presented with the collision interface 805 and can provide input to indicate what happened in the collision, including indicating the user's vehicle path, the other vehicle's path, and relative speeds.

In various examples, the computing system 100 can process all the inputs provided by the user 194 and/or other individuals via the collision interface 805 to generate the collision simulation 870, and may further determine whether the inputs provided by any of the individuals is inconsistent with the other individuals. In further examples, the computing system 100 can process the collision interface inputs along with witness statements, the user's statements, damage content, damage interface inputs, injury inputs, and the like, to generate the vehicle simulation. In generating the vehicle simulation, the computing system 100 can execute a physics engine 147 that can utilize the damage of the vehicle(s) involved (e.g., as indicated in captured content) to adjust the simulation such that the user inputs on the collision interface 805 match the damage as shown in the captured content. While the vehicle collision shown in FIGS. 8A through 8E involves two vehicles, the embodiments described herein can process inputs provided for any number of vehicles, including any combination of a single vehicle collision, a single vehicle or multiple vehicles involving one or more pedestrians and/or cyclists, or a multiple vehicle collision.

Figure 9:
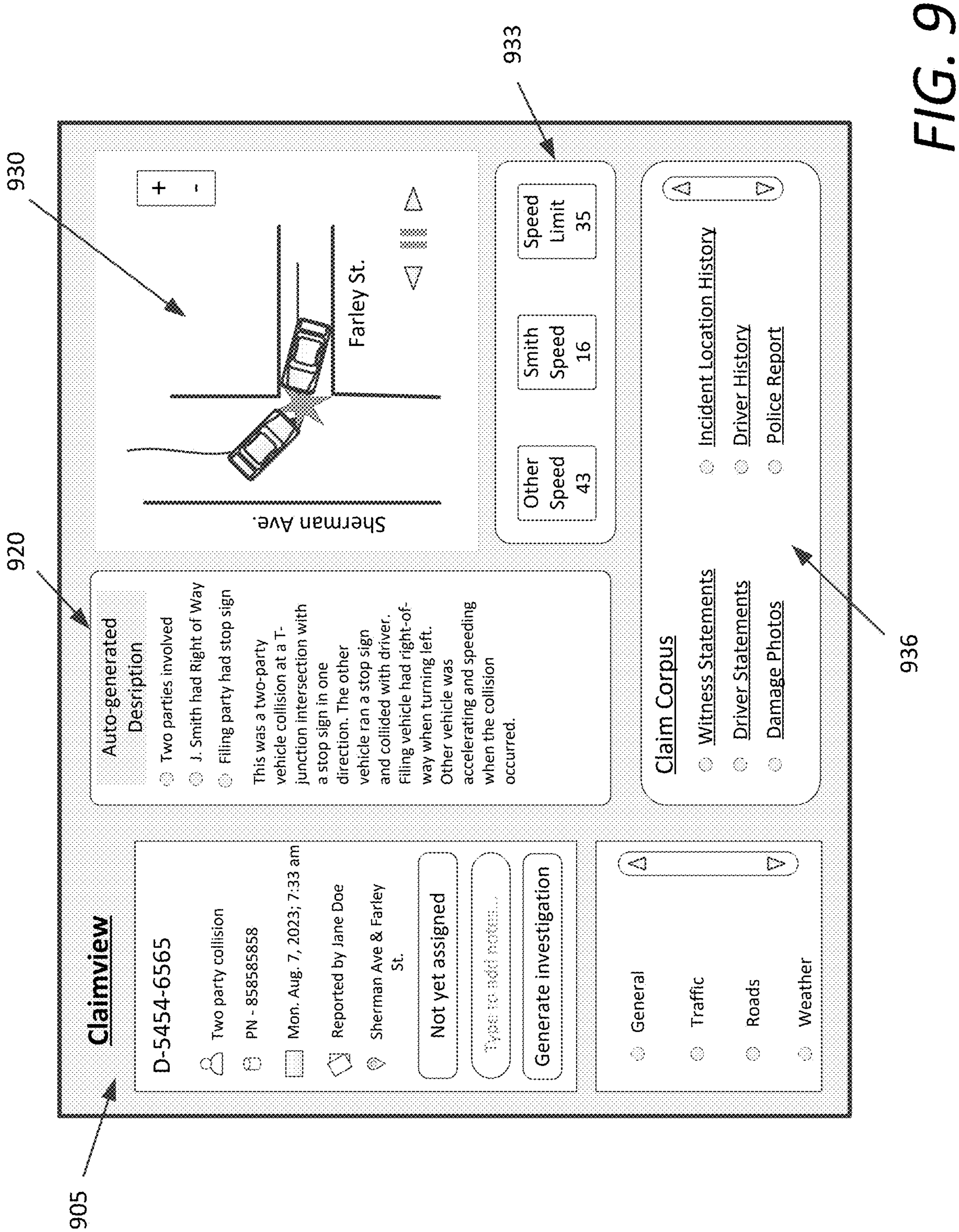
FIG. 9 illustrates an example collision reconstruction interface providing a large language model (LLM) summary of a collision event, according to various examples provided herein.

FIG. 9 illustrates an example collision reconstruction interface 905 providing a large language model (LLM) summary 920 of a collision event, according to various examples provided herein. Referring to FIG. 9, based the corpus of information corresponding to a claim event (e.g., a vehicle collision), the computing system 100 can generate a collision reconstruction interface 905 that includes all important aspects of the claim. In various implementations, the collision reconstruction interface 905 can include a simulation 930 of the vehicle collision, with contextual information 933 indicating the respective speeds of the vehicles, right-of-way rules, and/or road regulations at the collision location.

In various examples, the collision reconstruction interface 905 can also include links or scrollable data 936 to various portions of the corpus of information, which can include statements of the user 194, any passengers or witnesses, accident history at the collision location, accident history of the drivers and/or vehicles involved, damage content, police reports, and/or medical information corresponding to any injuries resulting from the collision. According to examples described herein, the collision reconstruction interface 905 can also include an LLM summary 920 of the vehicle collision, which is generated by a third-party LLM engine based on an AI prompt generated by the computing system 100. As described herein, the AI prompt can be automatically generated using the entire corpus of information in a particular claim file 112, and may be pre-processed based on quality information of the LLM engine, including adding synthetic facts, suppressing language that the LLM tends to focus on that is not relevant, and the like.

Upon receiving the LLM summary, the computing system 100 can perform post-language processing on the LLM summary, which can comprise a manual or automated process that deletes or otherwise edits the LLM summary 920 for the collision reconstruction interface 905. Thereafter, the computing system 100 can generate the collision reconstruction interface 905 to include the various information of the claim event for the purpose of expediting the claim process. This information can include policy number information, a claim identifier, contextual information for the claim, the collision simulation 930 and additional data 933, links to various additional information 936 obtained via the information gathering process, and the like. In various examples, the collision reconstruction interface 905 can be provided to a claims adjuster, investigator, policy provider, or the policy holder.

Methodology

In the below descriptions of the various flow charts described below, reference may be made to reference characters representing various features as shown and described in connection with the previously described drawings. Furthermore, any step corresponding to the individual blocks described in the flow charts below may be performed prior to, in conjunction with, or subsequent to any other step. Still further, the various step represented by the blocks below may be performed by one or more modules or engines of the computing system 100, user device 190, call representative device 195, or any combination of the foregoing, including via one or software applications or browser applications, as described herein.

Figure 10:
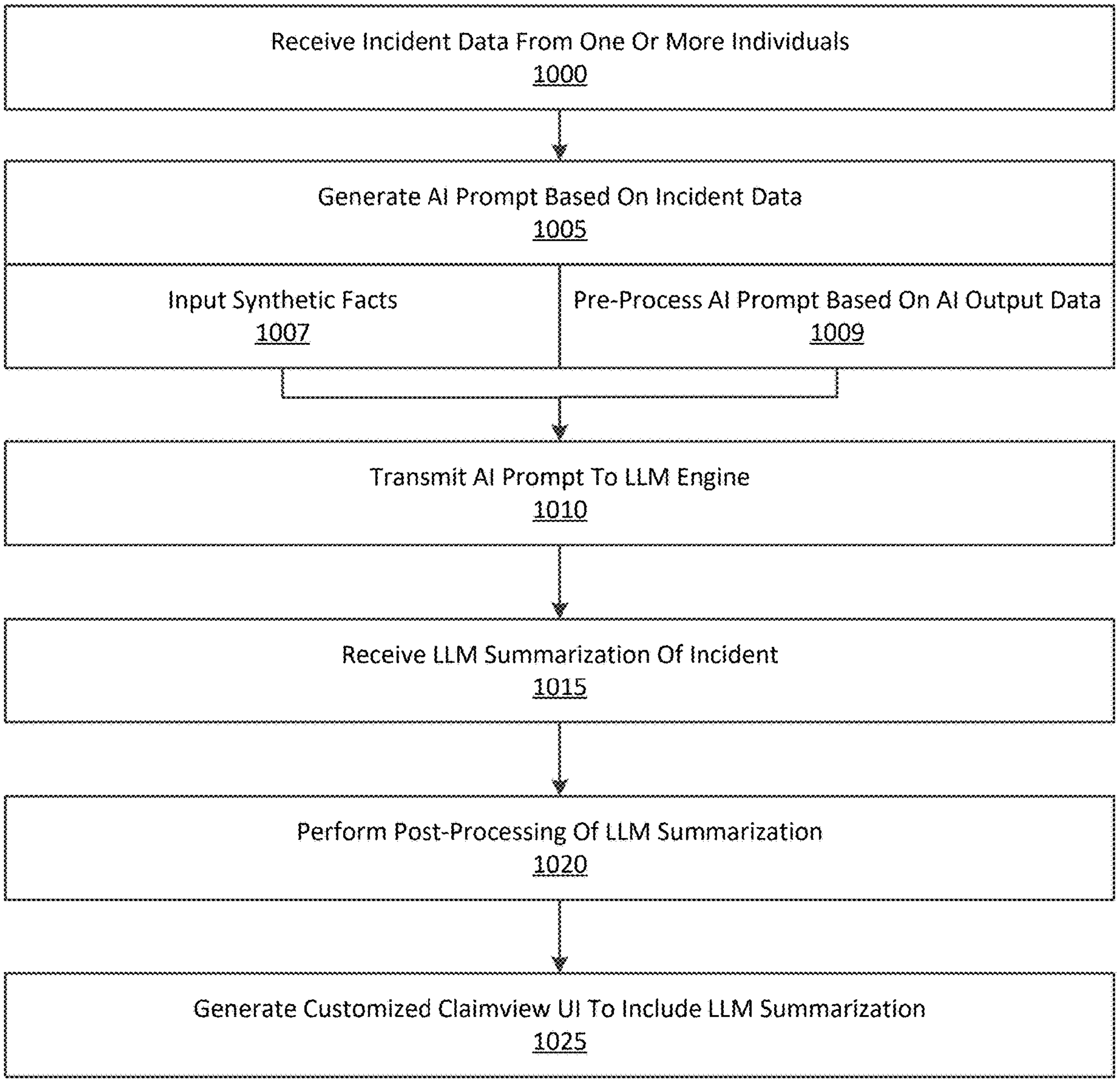
FIG. 10 is a flow chart describing a method of generating artificial intelligence prompts to obtain LLM summaries of claim files, according to examples described herein.

FIG. 10 is a flow chart describing a method of generating artificial intelligence prompts to obtain LLM summaries of claim files, according to examples described herein. Referring to FIG. 10, the computing system 100 can receive incident data corresponding to a claim event from one or more individuals (1000). The individuals can comprise a victim, policy holder, user 194, witness, or any other party to the claim event, and the incident data can be received through one or more call sessions or application sessions with any combination of these individuals. Throughout these sessions, the computing system 100 can receive a corpus of information corresponding to the incident, which can comprise a vehicle incident, property damage incident, and/or injury incident. This information can include captured photographs and/or video (e.g., of damage and/or injury), statements and contextual descriptions of the incident, location information of the incident, policy data of any insurance policies involved, and the like.

In various examples, the computing system 100 can generate an AI prompt using the corpus of information corresponding to the claim incident (1005). In doing so, the computing system 100 can automatically include synthetic facts (1007), as described above, and can further pre-process the AI prompt based on AI output data (1009). For example, the synthetic facts included in the AI prompt can be purposefully included in the AI prompt based on LLM outputs to facilitate the LLM engine in generating a more relevant and useful LLM summary. For example, the AI prompt generator 120 of the computing system 100 can include specific information about the curb weight of a vehicle involved in a collision to provide the LLM engine with contextual information about the severity of the collision, thereby facilitating a more optimal summary (e.g., a summary that focused on the severity of the user's injuries).

As provided herein, the pre-processing of the AI prompt can involve the AI prompt generator 120 performing automated language cleaning to make the LLM engines of the third-party resources 180 (e.g., CHATGPT® or GOOGLE GEMINI®) more efficient and effective for claim purposes. This cleaning or pre-processing can include automated removal or rephrasing of AI prompt language that an LLM engine is known to fixate on, or suppression of irrelevant language, to provide the LLM engine with an effective AI prompt. Additionally, upon transmitted the AI prompt to the LLM engine, the computing system 100 can receive the LLM summary and perform automated post-processing, which can comprise automated tools for editing and word suppression to generate the finalized LLM summary.

In various examples, the computing system 100 can transmit the AI prompt to an LLM engine 177 executed by a third-party computing system 180 (1010). The LLM engine 177 can process the AI prompt to generate an LLM summary of the claim corpus or claim file 112. Thereafter, the computing system 100 can receive the LLM summarization of the claim corpus or claim file 112 (1015). In certain implementations, the computing system 100 can perform automated post-processing of the LLM summarization (1020). In the post-processing phase, the computing system 100 can include an automated editing tool that automatically suppresses irrelevant information or edits the LLM summary for relevance and brevity.

In various examples, the computing system 100 can generate a customized claimview user interface to include the LLM summarization (1025). The claimview interface can comprise a collision reconstruction interface 905 as shown and described with respect to FIG. 9, and therefore include additional contextual information of a vehicle collision, such as a collision simulation, and various other details corresponding to the incident. In variations, the claimview interface can correspond to any claim event, such as a property damage event, injury event, or any other insurance claim event, and can be provided to any entity related to the claim event. As such, the LLM summary included in the claimview interface can be provided to the user 194, policy provider, claim investigator, attorney, or medical care provider, and can comprise only the most relevant information corresponding to the claim file 112 or the claim event specific for the purposes of those individuals.

Figure 11A:
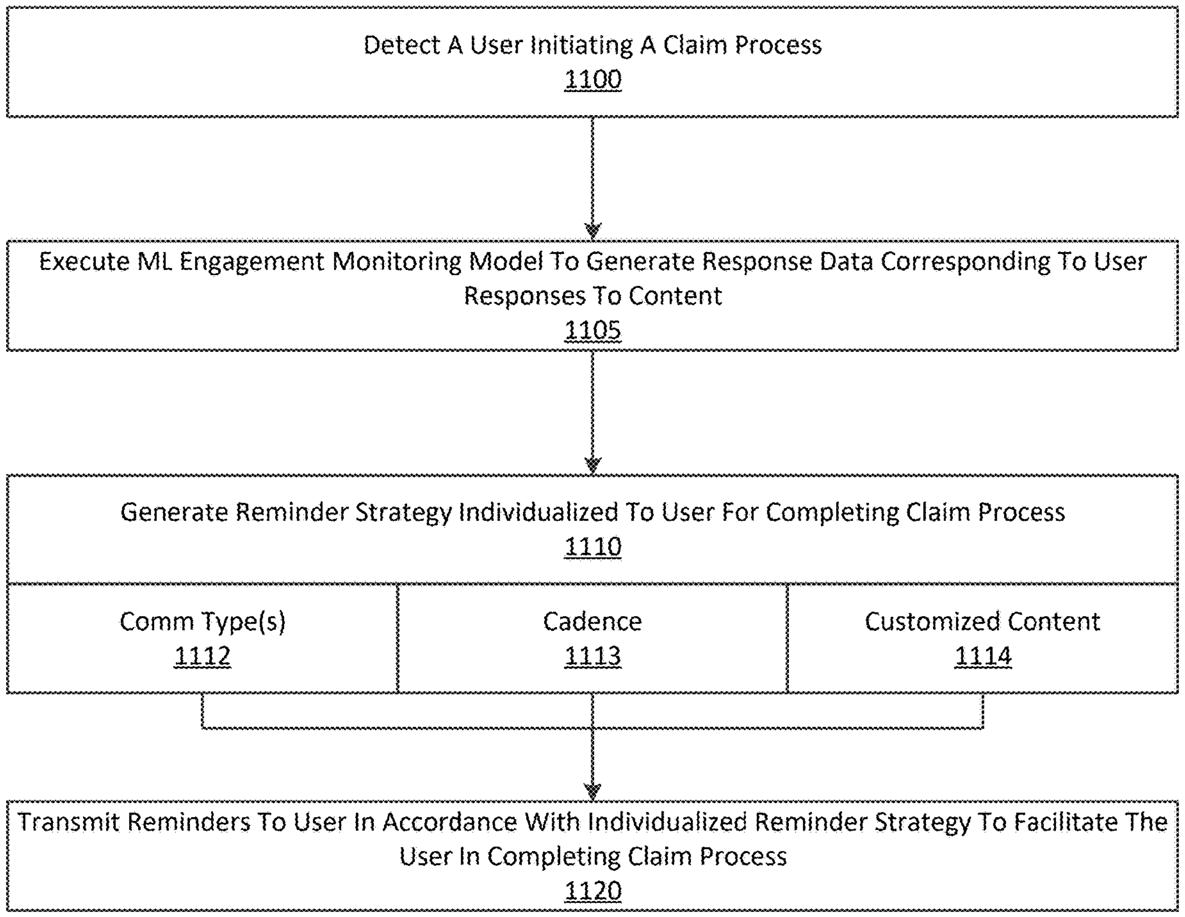
FIGS. 11A and 11B are flow charts describing methods of engagement monitoring and generating reminder strategies for users to complete a claim process, according to examples described herein.
Figure 11B:
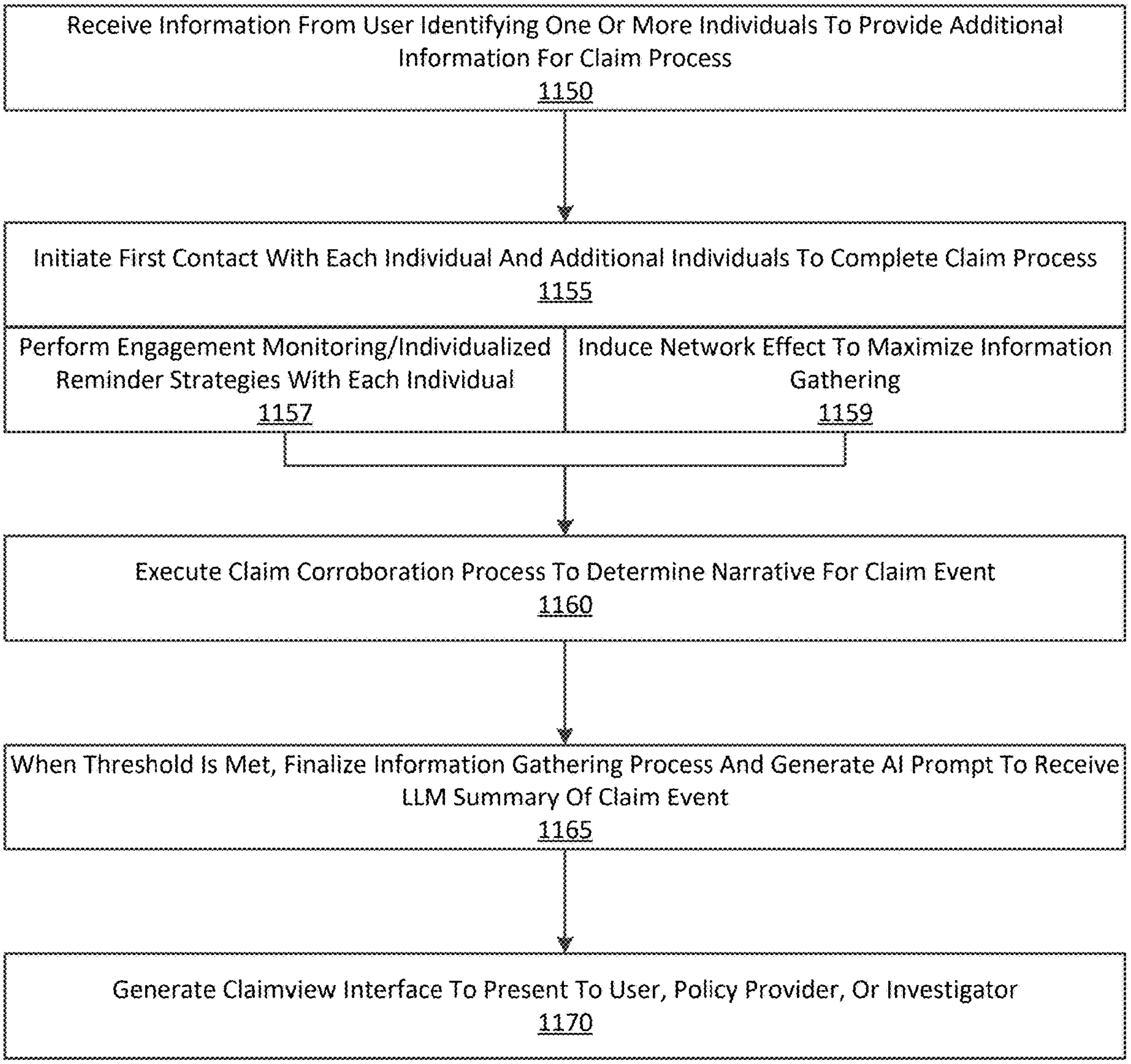

FIGS. 11A and 11B are flow charts describing methods of engagement monitoring and generating reminder strategies for users 194 to complete a claim process, according to examples described herein. Referring to FIG. 11A, the computing system 100 can detect a user 194 initiating a claim process (1100). For example, the initiation of the claim process can follow a vehicle incident, such as a collision or breakdown. Alternatively, the initiation of the claim process can follow a property damage incident (e.g., catastrophic weather event, earthquake, wildfire, flood, etc.). The claim process can correspond an information gathering process that includes one or more call sessions with a call representative, or one or more application sessions that enables the user 194 to provide contextual information related to the claim event.

In various examples, the computing system 100 can generate one or more content flows for the user 194 to provide detailed information of the claim event. The content flows can comprise customized content specific for the user 194, and can include specific user interface designs, font types, font sizes, and color schemes and themes, and can be accessed by the user via one or more specified communication methods (e.g., links to the content flows provided via text, phone calls, links to content flows provided via email, etc.). In various examples, the computing system 100 can execute a machine-learning engagement monitoring model to generate response data corresponding to the user's specific responses to content flows provided to the user 194 (1105).

As provided herein, the response data can identify content and communication methods that the user 194 responds to, such as links to customized content flows provided via email versus text message. The response data can further indicate which content designs (e.g., fonts, font sizes, themes, styles, etc.) for the content flows the user 194 that facilitates increased engagement by the user 194 versus which content designs the user 194 tends to ignore or provide less engagement. In certain implementations, the response data can further indicate a most effective cadence for communicating with the user 194, such as sending the user 194 communications during specified times of the day, and determining optimal times of the day and/or days of the week in which the user 194 is most likely to engage with a content flow. As further provided herein, the machine-learning engagement monitoring model may be executed for policy holders, witnesses to a claim event, victims of a claim event, claim filers, or any other party to a claim, and with the purpose of providing a customized user experience with the goal of maximizing information gathering pertaining to a particular claim.

Based on the response data specific to the user 194, the computing system 100 can generate a reminder strategy individualized to the user 194 for completing the claim process, including information gathering for a particular claim file 112 (1110). In various implementations, the reminder strategy can comprise any combination of communication types (1112) (e.g., email, text, phone, messenger app, content sharing app, etc.), cadence or timing of communication (1113), and customized content for the user 194 (1114). As provided herein, the customized reminder strategy can be implemented for each individual involved in a particular information gathering process, which can comprise any number of individuals that can provide useful information for a particular claim. The computing system 100 may transmit reminders to each user 194 in accordance with the individualized reminder strategy to facilitate completion of the claim process (1120).

FIG. 11B is a flow chart describing a method of progressing a claim process to completion using first contact and network effect techniques, according to examples described herein. Referring to FIG. 11B, the computing system 100 can receive information for a user 194 identifying one or more individuals to provide additional information for a claim process (1150). As an example, a vehicle collision involving three vehicles having a total of nine occupants, having been witnessed by twenty individuals, can involve vehicle damage and injuries. The injuries may be attended to by multiple paramedics and the collision may result in a police report. In certain implementations, the computing system 100 can detect one of the individuals involved in the vehicle collision initiate a claim process, which can trigger the computing system 100 to identify one or more of the individuals involved (e.g., as identified by the initiator or any other individual involved in the incident). The computing system 100 can initiate first contact with the individual(s) identified by the initiator, who can also identify other individuals involved in the incident until each of the nine vehicle occupants and the twenty witnesses are identified. In certain examples, the paramedics, police officers, emergency response people, firefighters, etc. can also be identified and contacted by the computing system 100. Accordingly, the computing system 100 can initiate first contact with each individual named by the initiator and each of the contacted individuals to complete the claim process (1155).

In various examples, the computing system 100 can perform engagement monitoring and individualized reminder strategy techniques for each individual (1157), and can induce a network effect in which information gathering from the initiator and those identified by the initiator can cascade until everyone or almost everyone that can provide valuable information for the claim event is contacted and performs their individual information gathering processes (1159). In certain implementations, the computing system 100 can perform claim corroboration techniques to identify whether one or more of the individuals are provide information that is inconsistent with the majority of the individuals (e.g., which can amount to evidence of fraud), or to determine the correct narrative or verified facts for the claim event (1160).

In various examples, when a particular threshold is met, the computing system 100 can finalize the information gathering process and generate an AI prompt to receive an LLM summary of the claim event (1165). The threshold can correspond to each of the identified individuals being contacted and completing their individual information gathering processes (e.g., through customized content flows and reminder strategies), or can correspond to a final state of the claim process. The final state of the claim process can comprise a state in which all individuals identified have been contacted, and a set of the individuals have completed their information gathering processes while computing system 100 is unsuccessful in inducing others from completing theirs. As provided herein, the computing system 100 can then generate a claimview interface or collision reconstruction interface that includes the LLM summary (1170). In certain examples, the claimview interface or collision reconstruction interface can include a simulation of the vehicle collision and can be provided to the user 194, a policy provider of the user 194, or a claim investigator.

Figure 12:
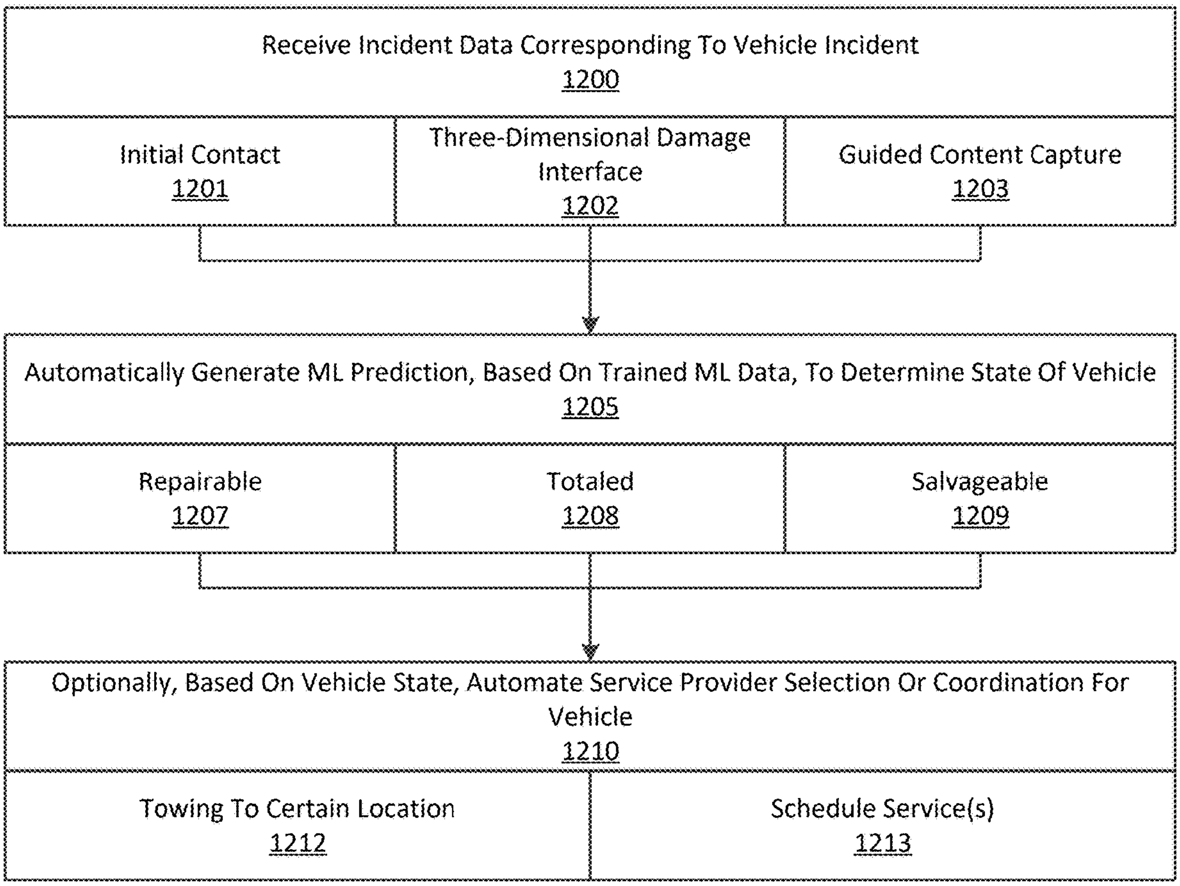
FIG. 12 is a flow chart describing a method of total loss prediction, according to examples described herein.

FIG. 12 is a flow chart describing a method of total loss prediction, according to examples described herein. In various examples, the computing system 100 can receive incident data corresponding to a vehicle incident, such as a vehicle accident or collision (1200). For example, the computing system 100 can receive initial contact from a claimant or claim filer, and perform first contact with any number of individuals involved in the vehicle incident and perform an information gathering process for each of the individuals (1201). In certain implementations, the computing system 100 can further receive contextual data from one or more users 194 that indicate damage to a vehicle involved in the incident on a three-dimensional damage interface (1202). Additionally or alternatively, the computing system 100 can receive content data of the vehicle damage through a guided content capture process (1203). As provided herein, the timing of receiving incident data can vary. For example, the incident data may be received immediately after the vehicle incident (e.g., before the vehicle is towed), or at any time in the claim process.

According to certain examples, the computing system can automatically generate a machine learning prediction, based on trained machine learning data, to determine a state of the vehicle (1205). In various examples, the state of the vehicle can correspond to whether the vehicle is repairable (1207), totaled (1208), or salvageable (1209). Optionally, based on the vehicle state, the computing system 100 can automate service provider selection or coordinate service providers to handle the vehicle (1210). This can comprise arranging towing of the vehicle to a certain location based on the state of the (1212) (e.g., a repair shop, salvage yard, or scrapyard). Alternatively, the computing system 100 can advise the user 194 to instruct a towing service to tow the vehicle to a particular location based on the vehicle state. Additionally or alternatively, the computing system 100 can advise the user 194 in scheduling services for the vehicle or can automatically schedule services for the vehicle (1213) (e.g., towing services, repair services, etc.).

Figure 13:
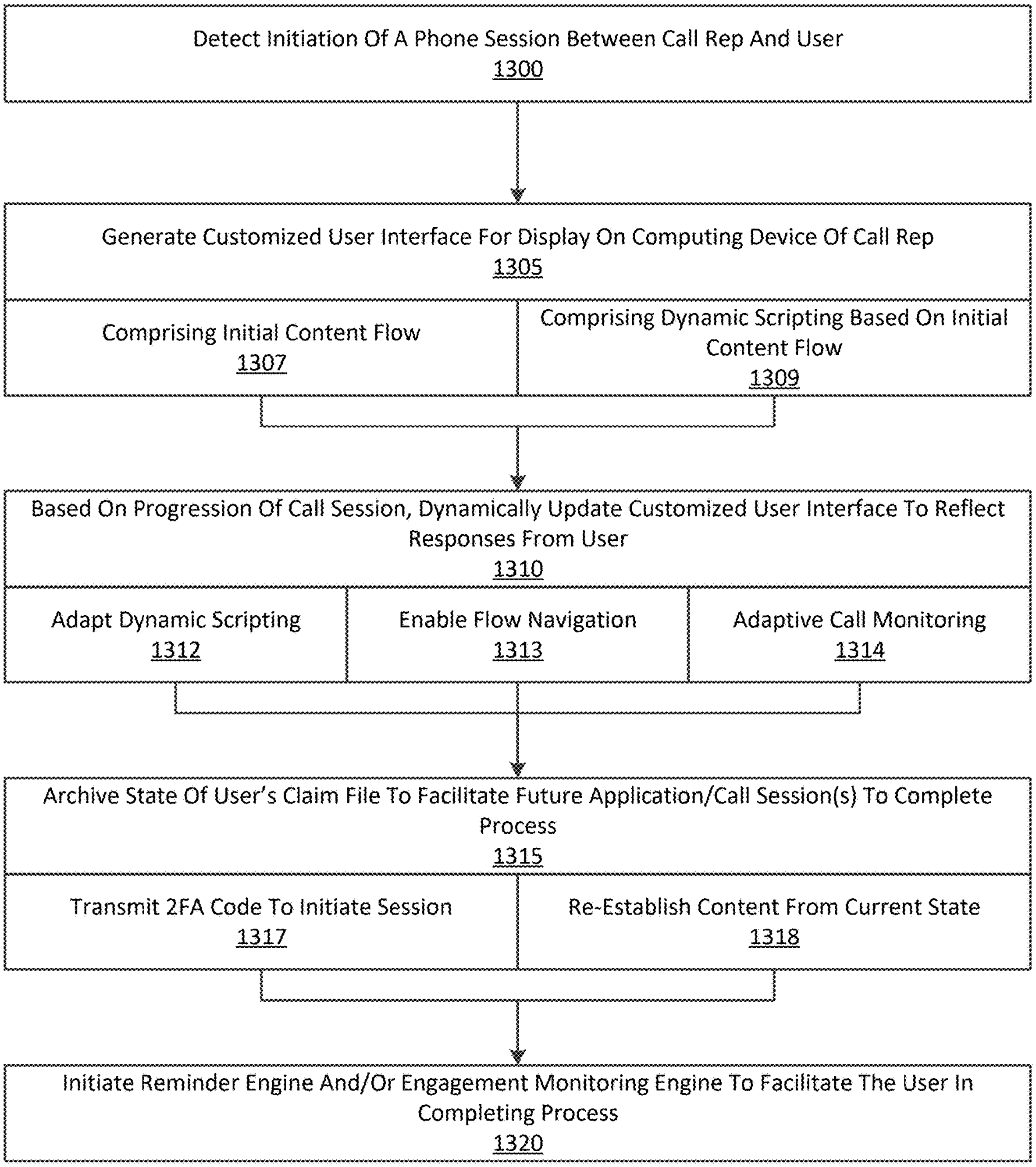
FIG. 13 is a flow chart describing a method of generating a dynamic user interface for facilitating a call session between a call representative and a user, according to examples described herein.

FIG. 13 is a flow chart describing a method of generating a dynamic user interface for facilitating a call session between a call representative 196 and a user 194, according to examples described herein. In various examples, the user 194 can comprise any party to a claim event, such as a claimant, witness, victim, driver, passenger, paramedic, police officer, etc. Referring to FIG. 13, the computing system 100 can detect the initiation of a phone session between a call representative 196 and a user 194 (1300). A dynamic content generator 155 of the computing system 100 can generate a customized user interface for display on the computing device 195 of the call representative 196 (1305). For example, the dynamic content generator 155 can generate an initial content flow to facilitate information gathering and caller verification for a claim process (1307), and can further initiate a dynamic scripting engine 159 to provide the call representative 196 with a dynamic script based on an initial content flow for the call session (1309).

In various examples, based on a progression of the call session, the dynamic content generator 155 can dynamically update the customized user interface to reflect responses to the dynamic script by the user 194 (1310). This can comprise adapting the dynamic script based on information inputted by the call representative (1312), enabling flowing navigation by the all representative (1313) (e.g., hopping to subflows, previous pages, or other category groupings), and/or performing adaptive call monitoring, such as implementing voice recognition and translation of the user's voice responses on the phone to automatically progress the content flow, hop to sub-flows, or automatically input the user's answers into the user interface (1314).

In certain examples, the computing system 100 can automatically archive or save the state of the user's claim file 112 periodically to facilitate future application sessions or call sessions to complete the information gathering process for the claim event (1315). Accordingly, when the call session ends, the current state of the claim process is preserved and enables the user 194 to continue the process in a subsequent call session or independently by continuing the process via and service application 192. to continue a claim process from an archived or saved state, the computing system 100 can transmit a two-factor authentication code to the computing device 190 of the user 194 (e.g., via text message or email) to initiate a new session (1317) (e.g., either a new call session or application session). When the user 194 confirms the code via input into the service application 192 or via voice input to a call representative 196, the computing system 100 can initiate the session from the current state of the claim file 112 (1318). According to one or more implementations, the computing system 100 can further initiate the reminder engine 125 and/or engagement monitoring engine 157 to facilitate the user 194 in completing the claim process (1320).

Figure 14:
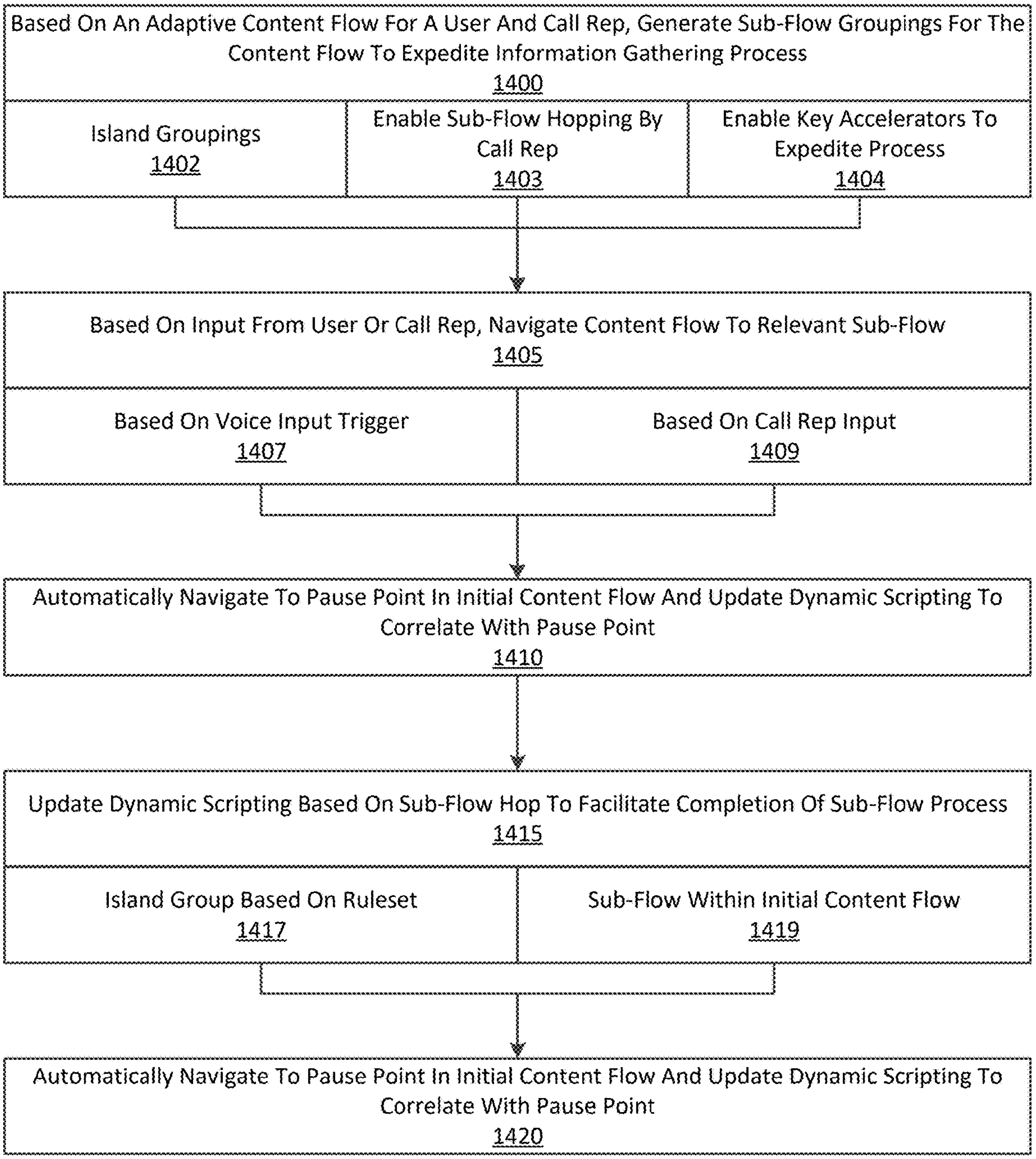
FIG. 14 is a flow chart describing a dynamic user interface providing sub-flow groupings for a call session, according to examples described herein.

FIG. 14 is a flow chart describing a dynamic user interface providing sub-flow groupings for a call session, according to examples described herein. The sub-flow groupings can be provided as respective categorical portions of an initial content flow provided to a call representative 196 on a user interface during one or more call sessions with a user 194. Referring to FIG. 14, the dynamic content generator 155 of the computing system 100 can generate a set of sub-flow groupings for the content flow to expedite an information gathering process based on an adaptive content flow for the user 194 and call representative 196 (1400). As described herein, the sub-flow groupings can comprise island groupings, which are not necessary for the completion of the information gathering process, but may be brought up by the user 194 (1402). These island groupings can correspond to, for example, whether anyone involved in the claim incident is represented by an attorney or whether an injury resulted from the incident. The dynamic content generator 155 can enable sub-flow hopping by the call representative (1403) (e.g., via a command K feature described herein). Additionally, the dynamic content generator 155 can enable key accelerators to expedite the information gathering process for the call representative (404).

According to certain embodiments, the dynamic content generator 155 can navigate the content flow to selected sub-flows based on input from the user 194 or the call representative 196 (1405). In one aspect, if the computing system 100 monitors the call session using voice recognition techniques, the dynamic content generator 155 can automatically navigate to a sub-flow based on detecting voice input from the user 194 that mentions the category of the sub-flow (1407). For example, if the user 194 mentions the word "lawyer" or "attorney," the dynamic content generator 155 can pause a current page of the content flow and automatically navigate to an island grouping of the content flow corresponding to attorney representation and provide dynamic scripting corresponding to that island grouping. In variations, the dynamic content generator 155 can be triggered to navigate to a particular sub-flow of the content flow based on input provided by the call representative 196 (1409).

When the sub-flow has been completed, the dynamic content generator 155 can automatically navigate back to the pause point of the content flow and update the dynamic scripting to correlate with the pause point (1410). In certain examples, the call session can involve navigating back to a sub-flow or a down-line grouping, in which case the dynamic content generator 155 can update the dynamic scripting based on the sub-flow hop to facilitate completion of the sub-flow process (1415). As described herein, the sub-flow can include a set of UI pages of the overall content flow (1419), or can comprising an independent island grouping (1417), as described herein. Upon completing the sub-flow, the dynamic content generator 155 can automatically navigate back to the pause point in the content flow and update the dynamic scripting to correlate with the pause point (1420).

Figure 15:
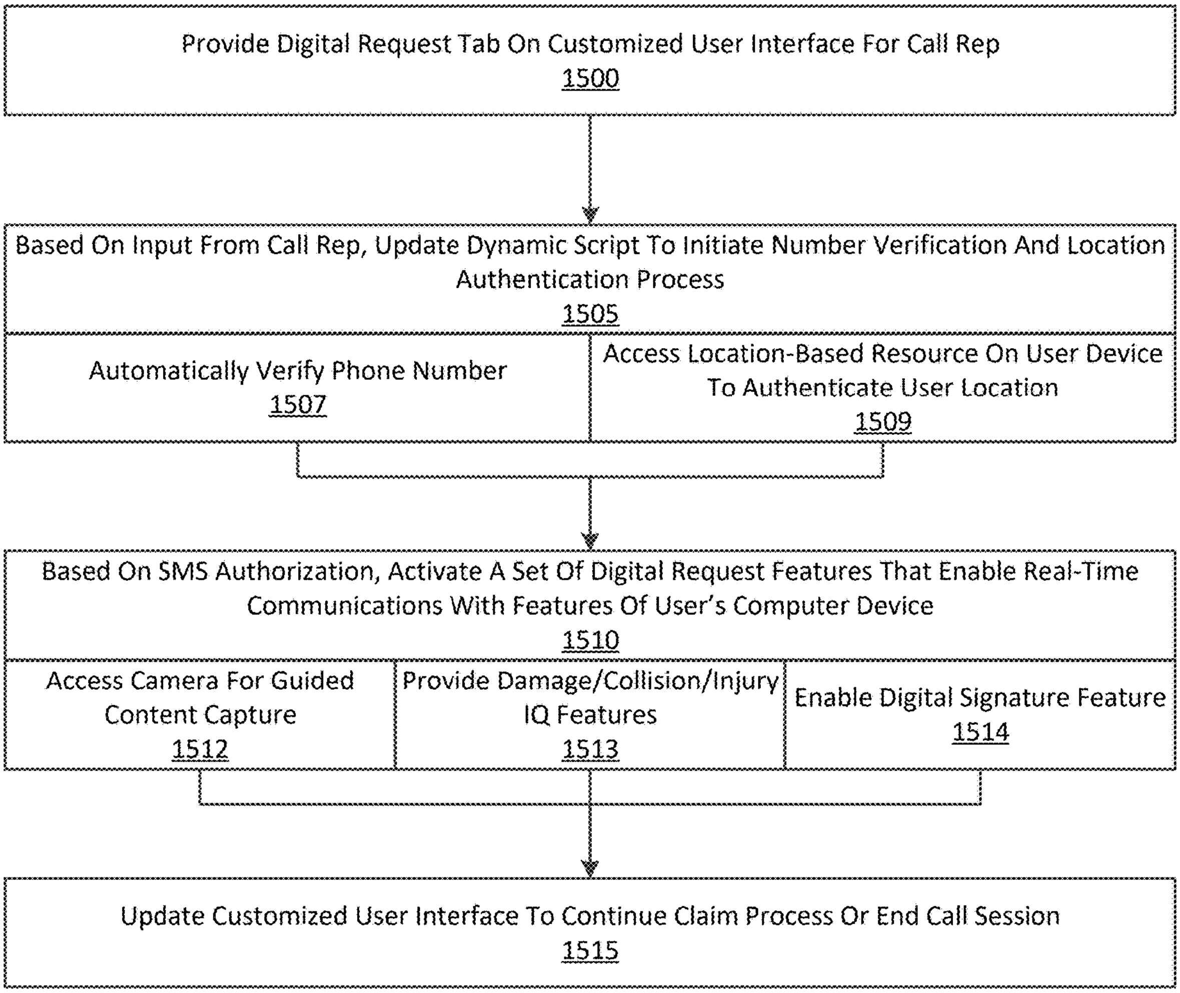
FIG. 15 is a flow chart describing a dynamic user interface providing digital request features for a call session, according to examples described herein.

FIG. 15 is a flow chart describing a dynamic user interface providing digital request features for a call session, according to examples described herein. The digital request features can be provided in a tab on the call representative's assistance interface to enable the call representative 196 to receive additional content or information corresponding to the claim process. Referring to FIG. 15, the dynamic content generator 155 can provide a digital requests tab of selectable feature on a customized user interface for the call representative 196 during a call session with a user 194 (1500). Based on an input from the call representative 196 via the digital requests feature, the dynamic content generator 155 can update the dynamic script to initiate a phone number verification and/or location verification process (1505).

In certain examples, the user 194 can provide a phone number for verification, and when the call representative 196 inputs the user's phone number into a text box, the computing system 100 can automatically verify the phone number (1507). For example, the computing system 100 can perform a lookup in a phone number database, and match the user's phone number with the user's name or other identifying information. In variations, the computing system 100 can perform alternative phone number verification techniques, such as line tests, two-factor authentication, number format validation check (e.g., via JavaScript function), soft tokens, push messages, Turing test, and the like.

In further examples, using the digital requests feature, the dynamic content generator 155 can update the dynamic script to instruct the call representative 196 to ask the user 194 for permission to access the location-based resource (e.g., a GPS or other satellite-based location system) on the user's computing device 190. If the user 194 provides authorization, the computing system 100 can remotely access the location-based resource on the user's computing device 190 (e.g., via cellular or other network access) to determine and authenticate the current location of the user 194 (1509). As described herein, each of these verifications can correspond to satisfying a ruleset, such as a policy provider ruleset or a regulatory ruleset, in order to discuss privacy protected information with the user 194 (e.g., policy coverage details).

In various implementations, based on an SMS or text message authorization provided by the user 194 (e.g., verbally over the phone), the computing system 100 can activate a set of digital request features that enable real-time communications with various features of the user's computing device 190 (1510). In one aspect, these digital request features can involve requesting access to the camera of the user's computing device 190 to facilitate real-time guided content capture during a call session (1512). For example, this can enable the user 194 to capture image data of vehicle damage during a call session with the call representative using a browser application or software application on the user's computing device 190, which can facilitate real-time authentication of the image data (e.g., to prevent fraud).

As another example, the digital request features can provide, on a display screen of the user's computing device 190, a damage IQ, collision IQ, or injury IQ interface that enables the user 194 to indicate damage on the user's vehicle (e.g., via a three-dimensional representation of the user's vehicle), provide trajectory information and collision details (e.g., to facilitate the computing system 100 in generating a collision simulation), and/or provide injury inputs to indicate the location and severity of injuries of the user 194 or any other injured party respectively (1513). In further examples, the digital request features can include a digital signature feature that enables the user 194 to remotely sign documents required for the claim process, such as statements, claim forms, hospital certificates, settlement documents, and the like (1514).

When the call representative 196 and user 194 complete one or more digital requests, the dynamic content generator 155 can update the call representative's assistance interface to continue the claim process or end the call session (1515). For example, if the digital request feature was accessed by the call representative 196 at a certain stopping point or page of the content flow, the dynamic content generator 155 can update the assistance interface to present the stopping point or page after the digital request process has been completed. This can comprise collapsing a side panel in which the digital request feature is location (e.g., automatically or based on call representative input), or can comprise closing a digital request page of the content flow.

Figure 16:
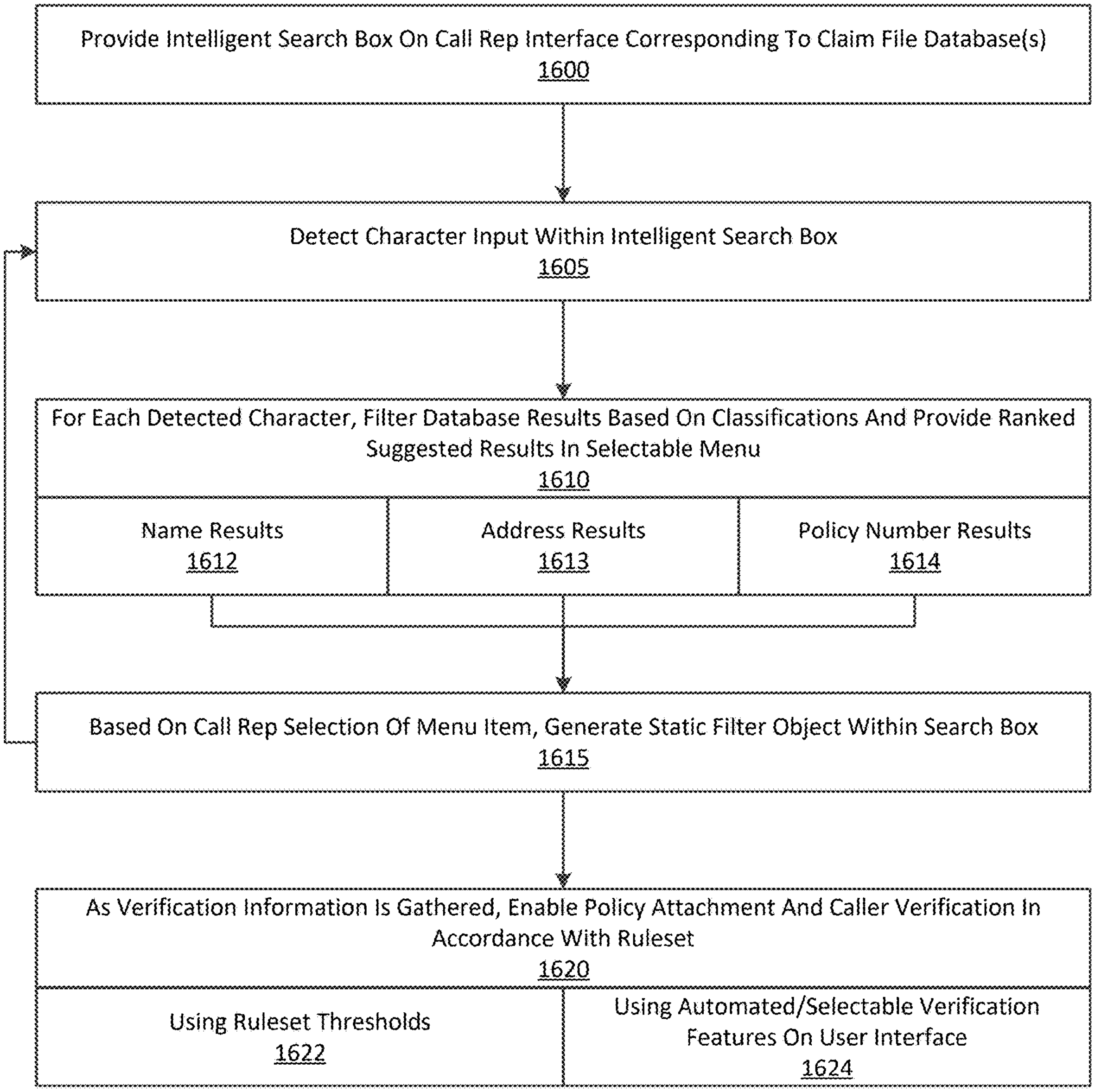
FIG. 16 is a flow chart describing a dynamic user interface providing an intelligent search box yielding ranked filtering and results, according to examples described herein.

FIG. 16 is a flow chart describing a dynamic user interface providing an intelligent search box 244, 508 yielding ranked filtering and results, according to examples described herein. In various examples, the intelligent search box 244, 508 can be provided on a call representative's assistance interface during a call session with a user 194, and can be utilized to quickly input information provided by the user 194 using certain acceleration and filtering techniques described herein. Referring to FIG. 16, the dynamic content generator 155 can provide an intelligent search box 244, 508 on a call representative's assistance interface, where the intelligent search box 244, 508 can correspond to one or more databases (1600) (e.g., one or more claim file databases). In certain examples, the databases can be included in the computing system 100 or may be accessed remotely by the computing system 100 via one or more networks 175 (e.g., included in one or more policy provider computing systems 185, or third-party resources 180).

According to examples described herein, the computing system 100 can detect a character input by the call representative 196 within the intelligent search box 244, 508 (1605). For each detected character input, the computing system 100 can filter database results based on a set of classifications and provide a ranked list of suggested results in a selectable menu (1610). In various examples, the computing system 100 can filter the results based on name results (1612), address results (1613), policy number results (1614), or any other specific classification pertaining to the claim process (e.g., vehicle models, policy type, coverage types, etc.).

The character-by-character analysis performed by the computing system 100 can involve filtering database entries, which can comprise any number of insurance policies (e.g., car insurance, homeowner's insurance, business insurance, life insurance, health insurance, disability insurance, umbrella insurance, etc.). For example, this analysis can identify a character as a letter, and filter database results for categories that begin with a letter, such as a name, a vehicle model, coverage types, and the like. The computing system 100 can then perform a ranking process to determine most likely results (e.g., based on historical data and/or training data for machine-learning implementations), and provide the ranked list of results in real-time for each inputted character by the call representative 196. As described herein, these results can comprise insurance policy results, which can be categorized based on searchable information in the policy, such as name, policy number, address, coverages, vehicle make and/or model, and the like.

As another example, if the call representative 196 initially inputs a number into the intelligent search box 244, 508, the computing system 100 can filter database results for categories that begin with a number, such as an address, policy number, vehicle year, etc. The computing system 100 may then provide a ranked list of results (e.g., list of insurance policies) that match the information inputted by the call representative 196. Each character inputted by the call representative 196 can comprise an additional filter, such that the ranked list of results only yields policies that match the inputted characters. Thus, the call representative 196 can quickly filter through the database(s) to select the relevant entry pertaining to the call session.

According to various examples, based on the call representative's selection of a menu item in the selectable menu of ranked search results, the computing system 100 can generate a static filter object or element within the search box 244, 508 (1615). The static filter object or element can comprise an additional filtering layer (e.g., on top of the character-by-character filtering that the computing system 100 performs dynamically). The static filter object can be categorical (e.g., a name filter, policy number filter, address filter, etc.) such that results for any additional characters inputted into the intelligent search box 244, 508 must match those characters and also match the static filter object(s). As provided herein, multiple static filter objects can be selected and configured by the call representative 196.

As further provided herein, the intelligent search box 244, 508 can be combined with verification features to authenticate or verify the caller to enable discussed of privacy controlled information (e.g., policy details). As verification information is gathered by the call representative 196, the computing system 100 can enable policy attachment and caller verification in accordance with a ruleset (1620). For example, enabling policy attachment can be triggered by a first threshold in the ruleset, and verifying the caller can be triggered by a second threshold in the ruleset (1622). These thresholds can involve certain levels of authentication based on information provided by the caller, such as any combination of verifying the caller's name, address, social security number, policy number, birthdate, vehicle year, make, and model, verifying location of the caller, phone number verification, coverage information, and the like. When a certain combination of this information is provided by the caller and meets the first or second threshold of the ruleset, the computing system 100 can release a specified control corresponding to the threshold (e.g., enabling policy attachment or a releasing a caller verification control). In certain examples, the call representative can select verification features as the user 194 provides them, or the computing system 100 can automatically select verification features on the assistance interface (1624) (e.g., using voice recognition and monitoring techniques). When the caller has been sufficiently verified based on satisfying ruleset thresholds, then privacy controlled policy information may be discussed.

Figure 17:
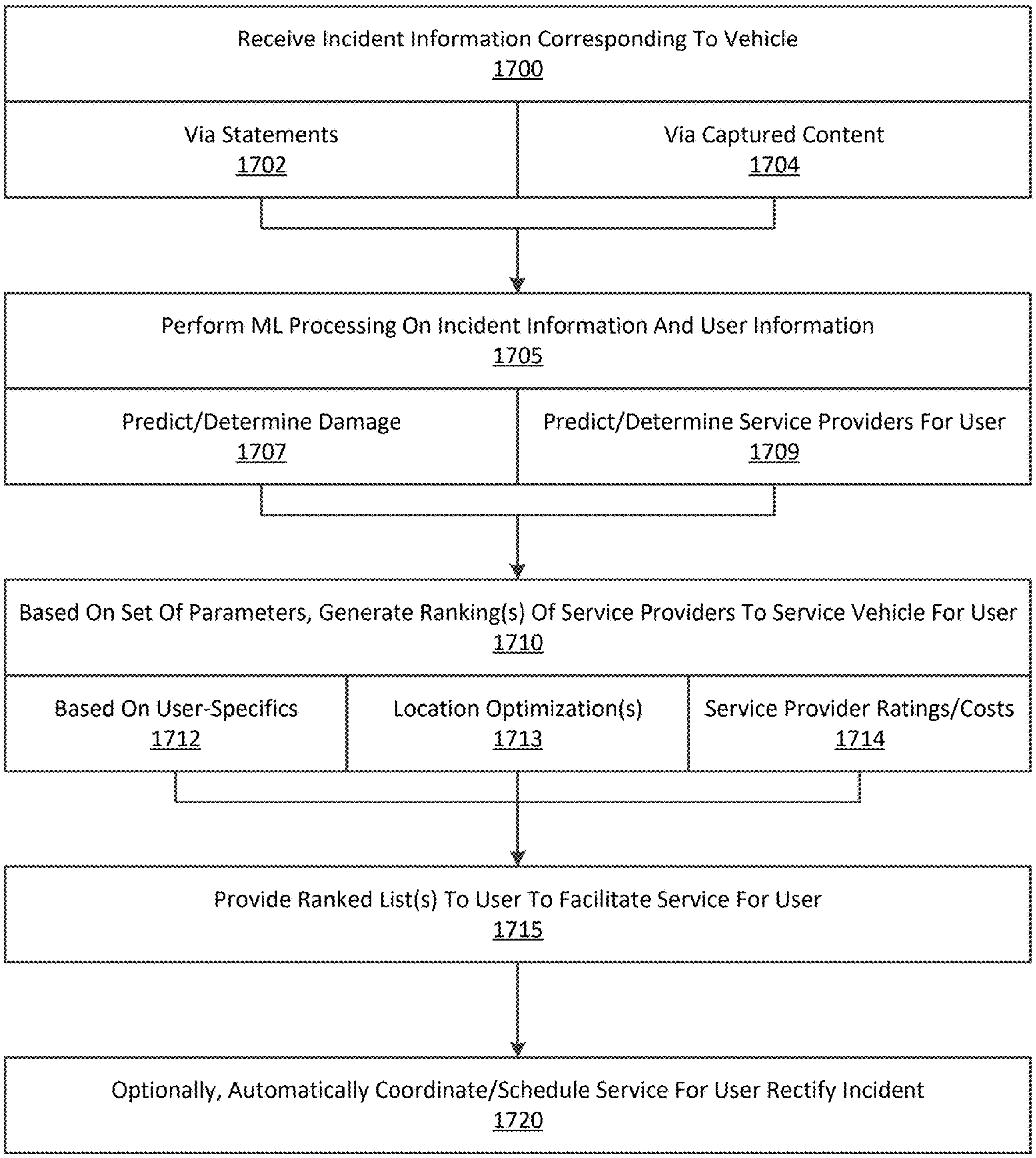
FIG. 17 is a flow chart describing a method of optimizing and filtering and service providers for users, according to examples described herein.

FIG. 17 is a flow chart describing a method of optimizing and filtering and service providers for users, according to examples described herein. The service providers can comprise any organization, business, or individual that provides any service in connection with vehicles or property, and can include towing service entities, automotive repair services, home repair services (e.g., flood damage repair, fire damage repair, smoke damage repair, builders, roofers, flooring specialists, appliance specialists), vehicle rental agencies, salvage yards, junk yards, and the like. Referring to FIG. 17, the computing system 100 can receive incident information corresponding to a vehicle incident, such as a vehicle collision or breakdown (1700). In some scenarios, the incident information can be received via one or more statements from people involved in the incident (1702) (e.g., via call session(s) or application session(s)). Additionally or alternatively, the incident information can be receive via captured content (1704) (e.g., at the accident scene or tow yard).

In various examples, the computing system 100 can execute a trained machine-learning model to process the incident information and user information of the user 194 (1705). In doing so, the trained machine learning model can output a prediction and/or determination of damage to the user's vehicle (1707), and can further output a prediction and/or determination of a set of services providers for the user 194 (1709). Based on a set of parameters, the computing system 100 can generate rankings of service providers to service the vehicle for the user 194 (1710). In some aspects, the prediction of the damage can be based on damage inputted by the user 194 and/or captured via the user's computing device, and can comprise an automated determination of whether the user's vehicle is repairable, which parts are likely to need replacement or repair, damage repair costs, and the like. In further aspects, the prediction of the service providers to service the vehicle for the user can comprise an optimization based on any combination of the set of parameters, which can include service provider locations in relation to the user's home or incident location (1713), public reviews or ratings of the service providers, service provider qualifications and/or certificates, service provider costs, and/or service provider quality (1714), and/or predicted user preferences based on user-specifics (1712) (e.g., based on user preferences for repair quality, the user's vehicle, cost, and/or distance, or demographic information and/or user's net worth or income, etc.).

Based on the set of optimizations, the computing system 100 can provide the ranked list(s) of service providers to the user 194 to facilitate service of the damaged vehicle for the user 194 (1715). In certain examples, the computing system 100 can provide a ranked list of service providers for each particular service needed for the user 194, such as a ranked list of towing services, body repair shops, mechanics, drive train repair shops, dent repair shops, etc. Optionally, the computing system 100 can also automatically coordinate and/or schedule the service(s) for the user 194 to rectify the vehicle incident (1720). For example, the computing system 100 can send a message to the user's computing device 190 to authorize automated service scheduling. If the user 194 agrees, the computing system 100 can automatically coordinate the necessary services for the user 194.

Figure 18:
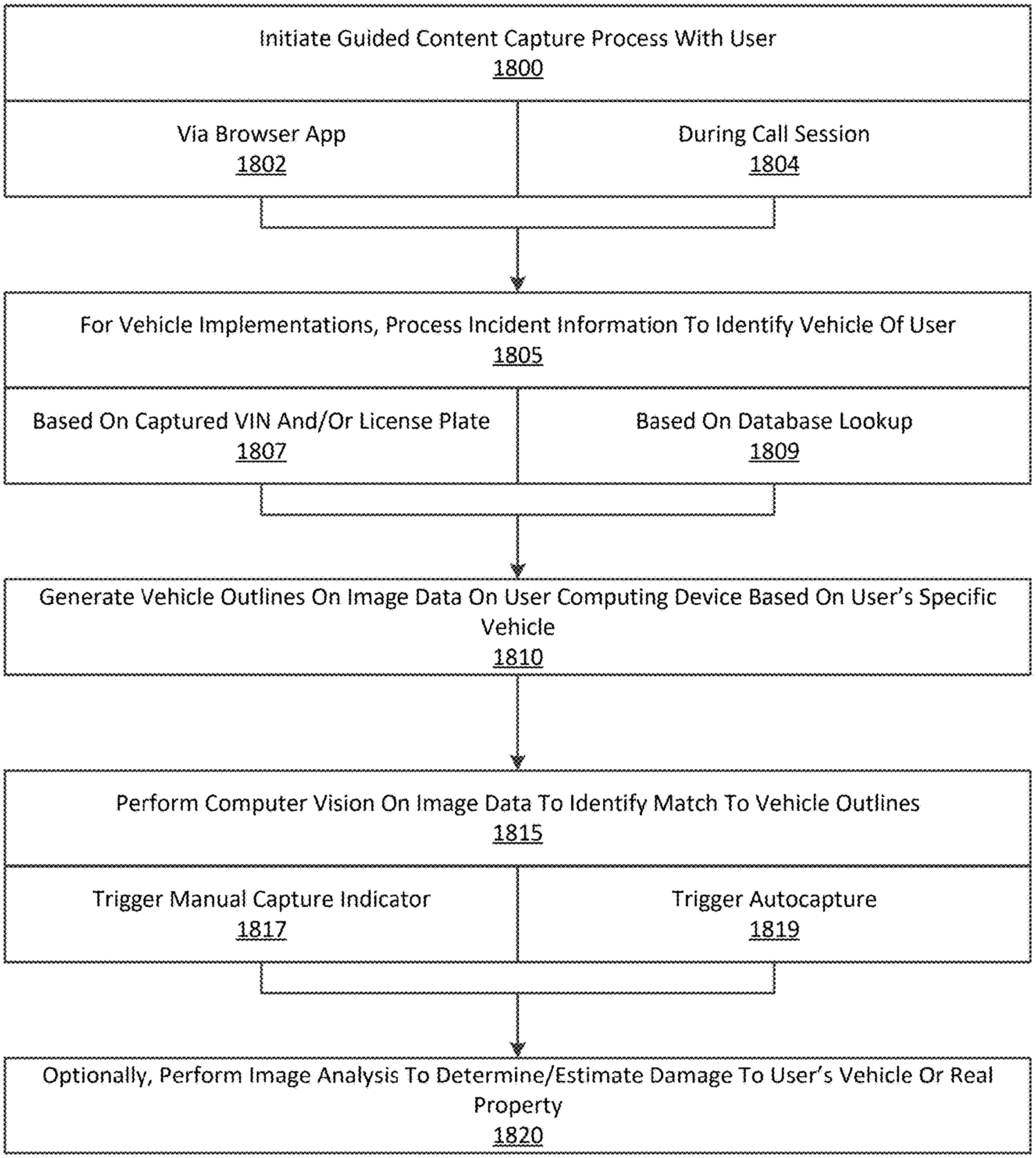
FIG. 18 is a flow chart describing a method of guided content capture for a user, according to examples described herein.

FIG. 18 is a flow chart describing a method of guided content capture for a user, according to examples described herein. As provided herein, the guided content capture process may be performed at any time during the claim process, including immediately after a vehicle collision, during a call session with a call representative 196, after a catastrophic event to record damage to the user's home, or independent during one or more application sessions. Referring to FIG. 18, the computing system 100 can initiate a guided content capture process with the user 194 (1800). In one embodiment, the guided content capture process can be initiated through a browser application executing on a browser of the user's computing device 190 (1802), and/or can be initiated during a call session between the user 194 and a call representative (1804). In variations, the guided content capture process can be initiated during an application session via an executing service application 192 executing on the user's computing device 190.

For certain vehicle incident scenarios, the computing system 100 can process incident information to identify the vehicle of the user 194 (1805). For example, the computing system 100 can determine the user's vehicle based on the user 194 capturing the vehicle's VIN or license plate (1807). In such an example, the computing system 100 can initially request that the user 194 capture a photograph of the vehicle's VIN and/or license plate, and can perform optical character recognition (OCR) on the image data of the photograph to determine the VIN and/or license plate number. The computing system 100 may then determine the user's vehicle by performing a lookup in a vehicle database (1809) (e.g., a department of motor vehicle database, vehicle insurance database, and the like). Alternatively, the vehicle details of the user's vehicle can be determined based on claim information provided by the user 194 during an information gathering process (e.g., during an application session or call session).

According to examples provided herein, the computing system 100 can generate vehicle outlines on image data presented on the computing device 190 of the user 194 based on the user's specific vehicle during the guided content capture process (1810). These vehicle outlines can correspond to the specific vehicle model, year, and make, or can comprise more generalized outlines based on the user's vehicle being identified as a compact car, mid-sized car, full sized car, station wagon, hatchback, minivan, van, light pickup truck, full-sized pickup truck, cargo truck, and the like.

As the user 194 captures content (e.g., images and/or video content) of the user's vehicle, the computing system 100 can perform computer vision techniques on the image data to identify when the vehicle in the image data aligns with the generated vehicle outlines (1815). For example, the computing system 100 perform edge analysis and detection to identify when the vehicle's edges align with the overlaid outlines for each exterior angle of the vehicle during the guided content capture process. Based on determining when the vehicle aligns with the vehicle outline for each angle, the computing system 100 can either trigger a manual capture indicator to be presented on the display screen to induce the user 194 to take a photo or record video (1817), or can automatically capture the photograph or record video of the vehicle (1819). When all requested content is captured, the computing system 100 can incorporate the content in the claim file 112 for the user 194 to be utilized for various purposes in the claim process. Optionally, the computing system 100 can perform automated image analysis on the captured content to, for example, determine or estimate damage to the user's vehicle or real property (e.g., when guided capture is used for home damage) (1820). The estimated damage determination may be used to determine service providers for repair purposes, or to estimate the costs of repair.

Figure 19:
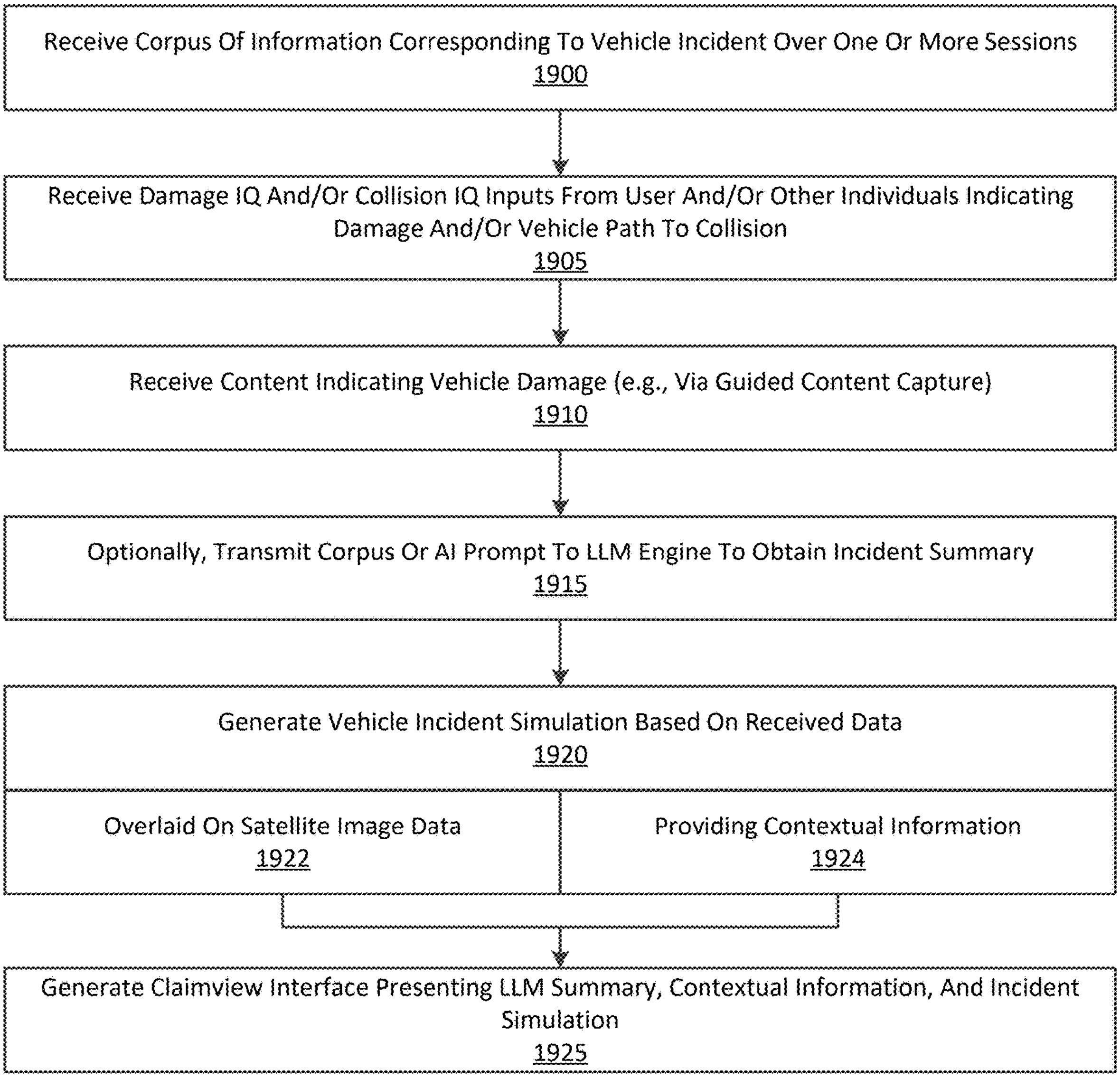
FIG. 19 is a flow chart describing a method of generating a collision reconstruction based on claim data, according to examples described herein.

FIG. 19 is a flow chart describing a method of generating a collision reconstruction based on claim data, according to examples described herein. Referring to FIG. 19, the computing system 100 can receive a corpus of information corresponding to vehicle incident over one or more sessions (1900), such as one or more application sessions or call sessions. In various examples, the computing system 100 can receive damage IQ and/or collision IQ inputs from the user 194 and/or other individuals indicating damage and/or vehicle path(s) to the collision (1905). As provided herein, the damage IQ interface can comprise a three-dimensional representation of the user's vehicle in which the user can indicate damage, and the collision IQ interface can indicate the collision location (e.g., in satellite data) in which the user 194 can provide additional details of the collision (e.g., vehicle trajectories and estimated speeds.

In certain implementations, the computing system 100 can receive content indicating vehicle damage, such as through a guided content capture process (1910). In further examples, the computing system 100 can optionally transmit the corpus or an AI prompt corresponding to the corpus to an LLM engine to obtain an incident summary of the vehicle incident (1915). The computing system 100 can further generate a vehicle incident simulation based on the received data (e.g., via the collision IQ interface) (1920). As provided herein, the incident simulation can be overlaid on satellite image data at the incident location (1922), and can further provide contextual information of the collision (1924). The contextual information can comprise descriptions of the vehicles' speeds and trajectories, any passengers within each vehicle, the driver's name, and the like.

In various examples, the computing system 100 may generate a claimview interface presenting each of the LLM summary, the contextual information of the vehicle incident, and the collision simulation (1925). Thereafter, the claimview interface can be provided to the claimant, user 194, claims investigator, and/or policy provider to complete the claim process. In certain examples, the claimview interface can also provide access to the details of the claim process, such as witness statements, photographs and video of the vehicle incident, medical records, injury reports, police reports, and the like.

Figure 20:
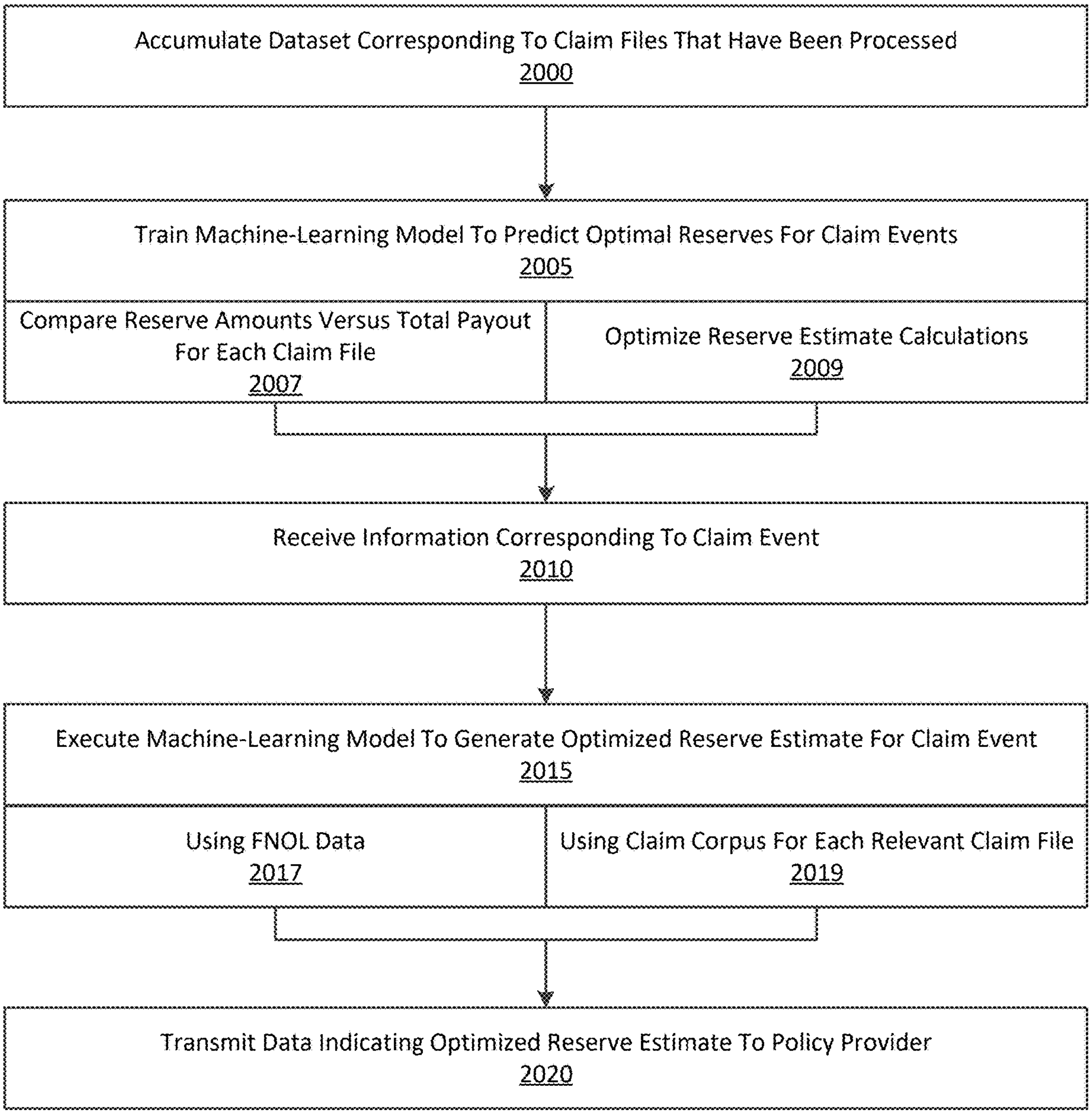
FIG. 20 is a flow chart describing a machine-learning method of generating a reserve estimate for a claim event, according to examples described herein.

FIG. 20 is a flow chart describing a machine-learning method of generating a reserve estimate for a claim event, according to examples described herein. The claim event can comprise a vehicle incident, a home damage event, a weather event (e.g., storm, tornado, hurricane, etc.), disaster event (e.g., earthquake, wildfire, drought, flood, etc.), an injury event, or other claim event. Referring to FIG. 20, the computing system 100 can accumulate a dataset corresponding to claim files 112 that have been process (2000). In various examples, the computing system 100 can train a machine-learning model to predict optimal reserves for each claim event corresponding to the claim files 112 (2005).

In various implementations, the machine-learning model can be trained by comparing reserve amounts for each claim file 112 versus the finalized total payout for the claim file 112 (2007). The machine-learning model can identify inefficiencies in the comparison, such as potential overestimations in certain categories of the estimation (e.g., injury estimation, damage repair estimation, liability estimation, etc.), and the underlying reasons for certain overestimations. In certain examples, the machine-learning model can further optimize reserve estimates, or run simulations of incidents and reserve estimate calculations, to more accurately compute reserve estimates for policy providers (2009). For example, optimizing the reserve estimate for each claim file 112 in the dataset while training the machine learning model can comprise running one or more simulations of (i) receiving first notice of loss (FNOL) information of the claim file 112, (ii) generating an optimized reserve estimate for the claim file 112, and (iii) determining a difference between the optimized reserve estimate and a total payout of the claim file 112 to refine the machine learning model to compute more accurate reserve estimates. As provided herein, refinement of the machine learning model can be a continuous process as more and more claim file data are received.

According to embodiments described herein, the computing system 100 can receive information corresponding to a claim event, such as a vehicle incident, injury event, or property damage event (2010). In various examples, the computing system 100 can execute the trained machine-learning model to generate an optimized reserve estimate for the claim event (2015). In certain examples, the machine-learning model can generate the reserve estimate based on an initial dataset received about the claim event, such as first notice of loss (FNOL) information identifying damage resulting from the claim event (2017), and can further filter each claim file 112 for similar incidents to run the machine learning model.

In variations, the machine-learning model can generate or update a reserve estimate at any stage in the claim process using the current state of the claim corpus for each relevant claim file 112 (2019). As an example, a catastrophic weather event can result in many FNOL filings for a particular policy provider. Based on these initial filings, the trained machine learning model can generate a reserve estimate for the catastrophic weather event, which can correspond to the exposure risk for the policy provider for the cumulative filings. As another example, the user 194 may submit an FNOL for a vehicle incident (e.g., a collision). The FNOL can comprise an initial notification to the computing system 100 that an incident has occurred and can comprise basic information of the claim event, such as location, nature of the event (e.g., vehicle incident, fire damage, flood damage, etc.), whether any injuries occurred, and the like. Based on a dataset comprising the FNOL for the incident and/or damage information of the user's vehicle as provided by the user 194 (e.g., via damage IQ input and/or guided content capture), the trained machine learning model can generate a reserve estimate that comprises the policy provider's exposure risk for the vehicle incident.

In either case, the reserve estimate can comprise an increasingly accurate prediction of the eventual total payout for the policy provider as more and more data are obtained and the machine-learning model is consequently refined. The computing system 100 can transmit data indicating the optimized reserve estimate to the policy provider (2020). It is contemplated that the machine learning model for generating reserve estimates can be trained to calculate reserve estimates for any claim event with far more accuracy than current implementations, which can unlock float of policy providers to, for example, increase coverage for more individuals and/or make insurance premiums less costly.

Figure 21:
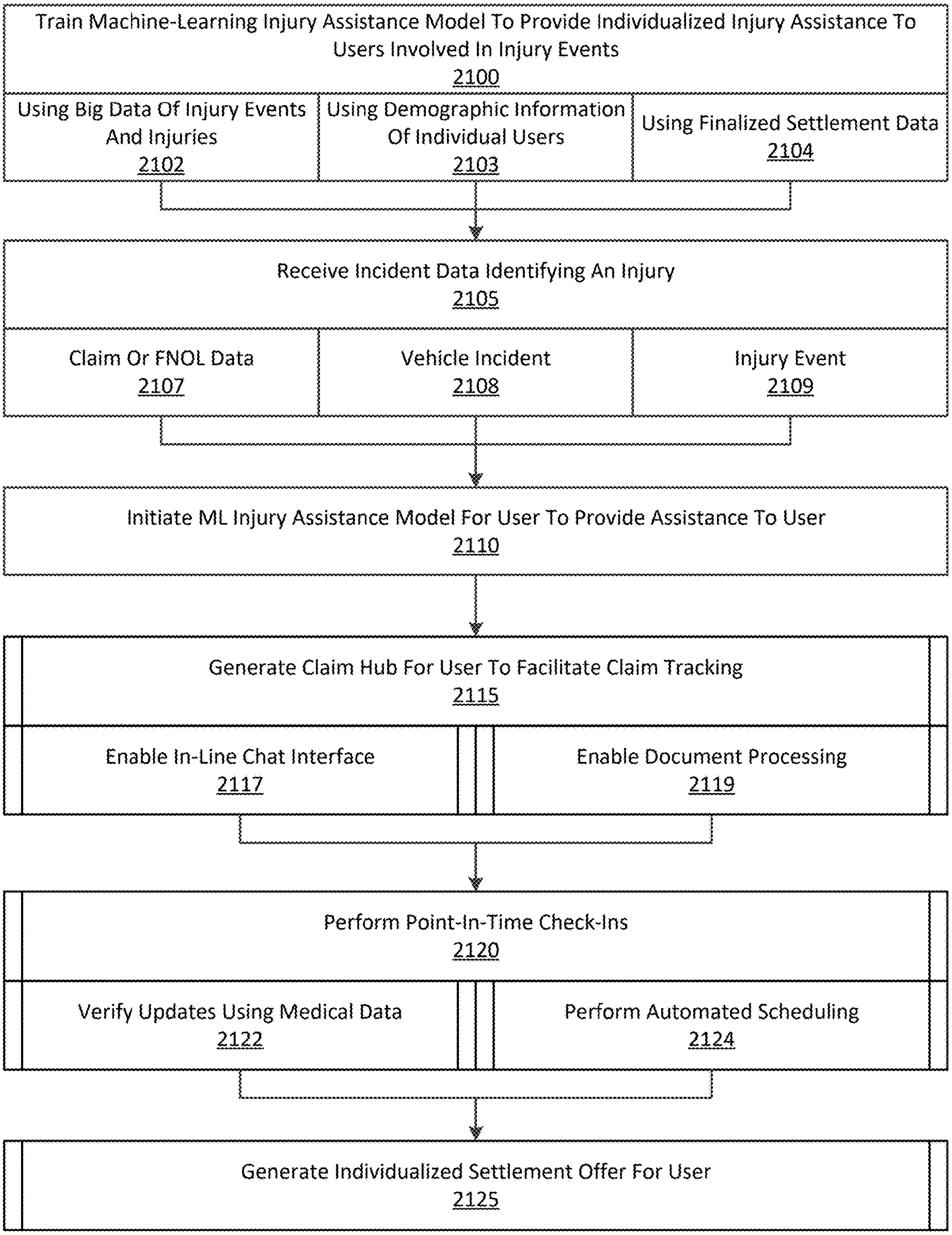
FIG. 21 is a flow chart describing a method executing a machine learning model for providing injury assistance to users, according to examples described herein.

FIG. 21 is a flow chart describing a method executing a machine learning model for providing injury assistance to users, according to examples described herein. Referring to FIG. 21, the computing system 100 can train a machine learning injury assistance model to provide individualized injury assistance to users involved in injury events (2100). In this training phase, the computing system 100 can implement a big data technique to obtain claim files and or injury records of injury events and injuries to train the machine learning model (2102). In further examples, the computing system 100 can also use demographic information of injure individuals and users 194, such as age information, gender or sex information, home location information, etc. to train the machine learning model (2103). In still further examples, the computing system 100 can use finalized settlement data, comprising settlement offers and amounts in previous claim files 112 to train the machine learning model (2104). It is contemplated that the information obtained to train the machine learning model can provide the model with predictive capabilities in aiding users 194 in the healing process for their injuries.

The computing system 100 can then receive incident data identifying an injury (2105), such via a claim filing or FNOL filing (2107), vehicle incident (2103), or generally any injury event (2109). The computing system 100 can initiate the trained machine learning injury assistance model for the user 194 to provide injury assistance to the user 194 (2110). As the machine learning injury assistance model provides assistance to the user 194 over the healing period, the model can generate a claim hub for the user 194 to facilitate claim tracking (2115). The claim hub can provide the user 194 with updates to the claim process, reminders to complete certain portions of the claim process, enable an in-line chat interface for the user 194 (2117), and enable document processing for the user 194 (2119). This can enable the user 194 to interact with a chatbot to determine the current state of the claim process, determine if any other documentation or information gathering is needed (or if the user 194 is requested to e-sign a document), and provide the user 194 with quick and easy features to provide updated information corresponding to the user's injuries.

In certain examples, the injury assistance model can further perform point-in-time check-ins for the user 194 (2120), which can ask the user 194 periodically for an update (e.g., "how is your knee injury healing?"). In certain implementations, the injury assistance model can be executed by the dynamic content generator 155 to engage with the user 194 using individualized reminder strategies, customized content, contact methods (e.g., email, text, automated phone call, etc.), or via application notifications. Based on the user's responses, the injury assistance model can verify the updates provided by the user 194 using medical data accessed by the model (2122). In doing so, the injury assistance model can verify recovery update information provided by the user 194 by accessing medical data of the user 194 and verifying whether the recovery update information matches the medical data. For example, if the user 194 states that an injury is nearly healed and stitches have been removed, the injury assistance model can access the user's medical records to confirm that this is indeed the case. Alternatively, if the user 194, for whatever reason, is dishonest about a particular injury, the injury assistance model can perform fraud detection techniques described herein. In further examples, the injury assistance model can further perform automated scheduling for the user 194 (2124), such as synching with the user's calendar application to automatically schedule medical or physical therapy appointments to ensure that the user 194 heals from the injuries.

It is contemplated that the injury assistance techniques described throughout the present disclosure can contribute to a more efficient insurance and health care regime that promotes recovery care and, overall, a more health user base. Furthermore, the injury assistance techniques can perform verification and/or fraud detection tasks such that the industry as a whole moves towards greater vigilance and efficiency, which can have the effect of reducing costs in terms of both insurance and medical care. In certain implementations, the computing system 100 can further process the information in the claim corpus and injury assistance process to generate an individualized settlement offer for the user 194 (2125). This settlement offer can be generated based on industry standards, reserved estimate, rulesets, historical offers, acceptance and rejection data, user-specific information of the user 194, and the like.

Figure 22:
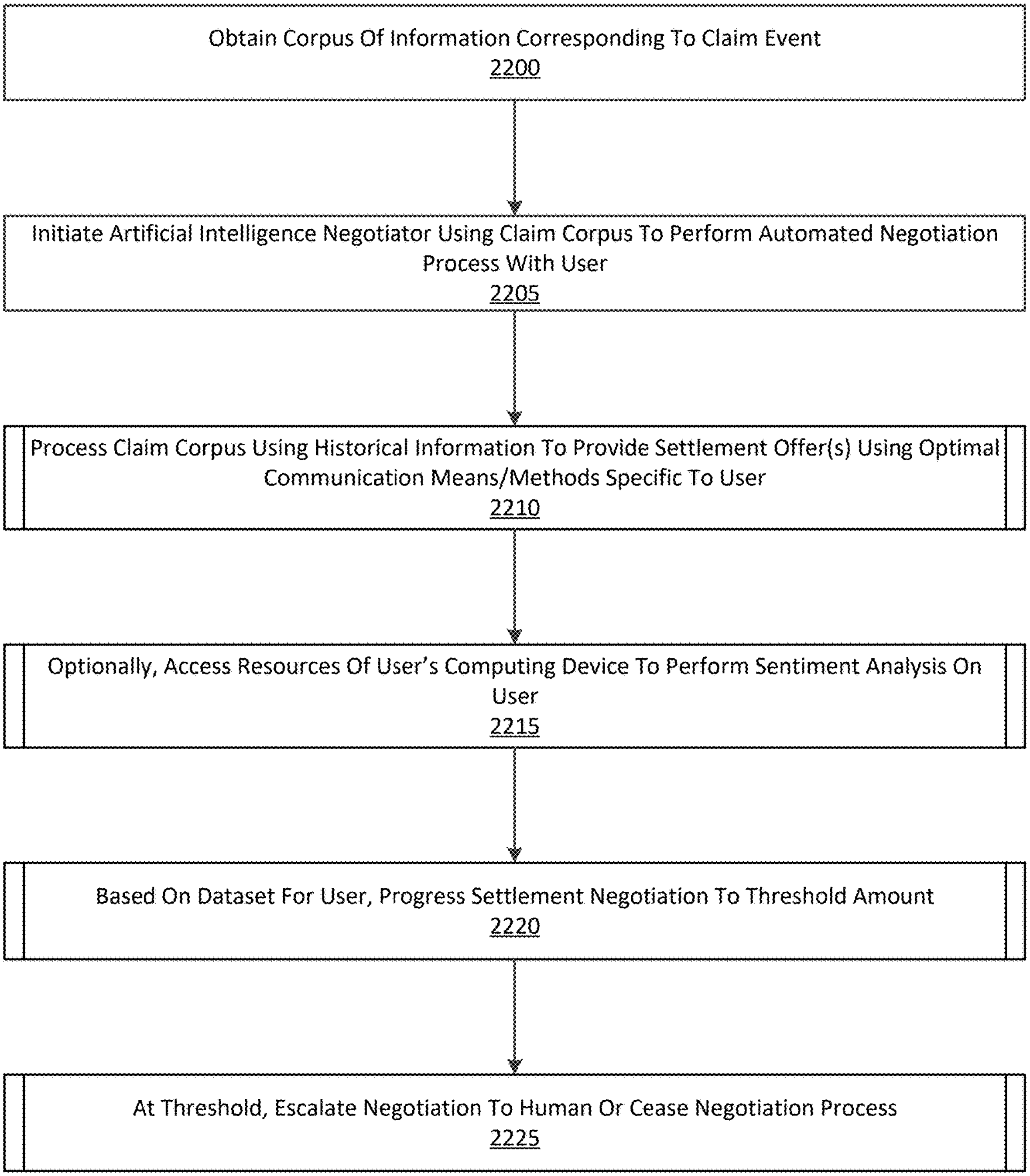
FIG. 22 is a flow chart describing a method of automated settlement negotiation, in accordance with examples described herein.

FIG. 22 is a flow chart describing a method of automated settlement negotiation, in accordance with examples described herein. In certain examples, the automated settlement negotiation can be performed following injury assistance, or can be performed at the later stages of the claim process when information gathering, automated corroboration, injury inputs, damage inputs, fraud detection, content capture, and/or collision simulations have been completed. Referring to FIG. 22, the computing system 100 can obtain the corpus of information corresponding to a particular claim event or claim file 112 (2200). In certain examples, the computing system 100 can initiate an artificial intelligence negotiator that uses the claim corpus to perform an automated settlement negotiation process with the user 194 (2205). In certain examples, the artificial intelligence negotiator can determine respective settlement offers for the user 194 using user-specific information (e.g., in the claim corpus), which can comprise demographic information, age information, income or net worth information, home location, and the like.

In various examples, the artificial intelligence negotiator can process the claim corpus using historical information to provide the settlement offer(s) using optimal communication means and methods specific to the user 194 (2110). These optimal communication means and methods can be determined during the reminder strategy process in which engagement data is determined for the user 194. In various examples, the artificial intelligence negotiator can optionally access resources of the user's computing device 190 to perform sentiment analysis on the user 194 (2215). For example, the sentiment analysis can be performed to determine whether the user 194 is open to accepting the settlement offer or if the user 194 is likely to reject the settlement offer.

If the user 194 does not accept, the artificial intelligence negotiator can progress the settlement negotiation to a threshold amount (2220), which can be determined based on the reserve amount determined at an earlier stage of the claim process, or historical information of similar claims and claim processes. After reaching the threshold, the artificial intelligence negotiator can escalate the negotiation process to a human negotiator or can cease advancing with negotiation process (2225).

Figure 23:
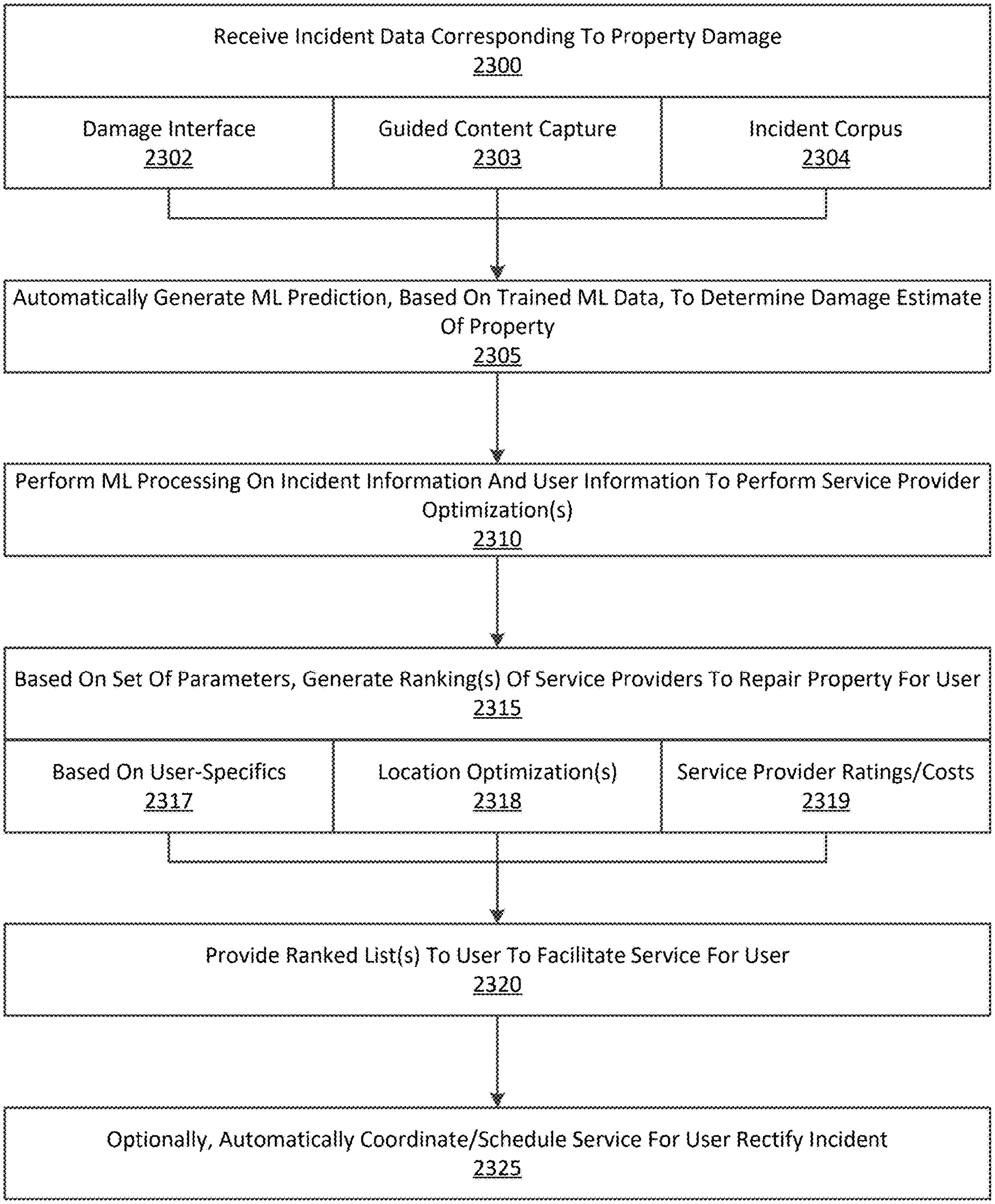
FIG. 23 is a flow chart describing a method of generating a prediction of damage for property, according to examples described herein.

FIG. 23 is a flow chart describing a method of generating a prediction of damage for property, according to examples described herein. Referring to FIG. 23, a total loss prediction module 130 of the computing system 100 can receive incident data corresponding to property damage (2300) (e.g., of the user's home). In various examples, the computing system 100 can receive the incident from the user's inputs on a three-dimension damage interface (2302) (e.g., identifying damage to the user's home), through a guided content capture process that guides the user 194 to capture content of damage to the user's property (2303), and/or from the incident corpus of the claim event as obtained through the information gathering process (2304).

In various examples, the computing system 100 can automatically generate a machine learning prediction, based on trained machine learning data, to determine a damage estimate of the user's property (2305). The damage estimate can correspond to a cost estimate for repairing the user's property, and can be based on training data of previously determined costs for completing repair work on any number of homes and properties. In certain examples, the computing system 100 can also perform machine learning processing on the incident information and user information to perform service provider optimization to determine one or more service providers to repair the user's property, as described herein (2310). Based on a set of parameters, the computing system 100 can generate rankings of the service providers to repair the property for the user 194 (2315). For example, these rankings can be based on user-specific information (2317), as described above, location optimizations (2318), and/or service provider ratings, qualifications, and/or costs (2319).

In certain examples, the computing system 100 can provide the ranked list(s) of service providers to the user 194 to facilitate repair services for the user 194 (2320). Alternatively and/or optionally, the computing system 100 can automatically coordinate and/or schedule the repair services for the user 194 to rectify the property damage event (2325). For example, based on the user 194 providing permission (e.g., selections of specific service providers, or authorization to coordinate service with top-ranked service providers), the computing system 100 can provide the damage or repair cost estimate to the user 194, and upon authorization, the computing system 100 can automatically contact and schedule the repair services to repair the user's property. In one example, the computing system 100 coordinates and schedules service providers from one or more ranked lists based on the total loss prediction, such that the cost of repair services provided by automatically selected service providers from the ranked lists substantially matches the total loss prediction that indicates the estimated repair cost.

It is contemplated that the various combinations of steps described in connection with the flow charts provided herein can automate certain processes previously performed manually by humans, and can further provide significant efficiencies in the multiple stages of the claim filing and information gathering processes that contribute to add-on efficiencies further down the line, such as expediting claim investigation, civil litigation, and/or damage mitigation processes. The methods described throughout the present disclosure may further achieve various practical applications in the field of claim processing, such as reducing costs, inducing user engagement, dynamically adapting content flows, facilitating dynamic scripting and call representative assistance, and the like.

Hardware Diagrams

Figure 24:
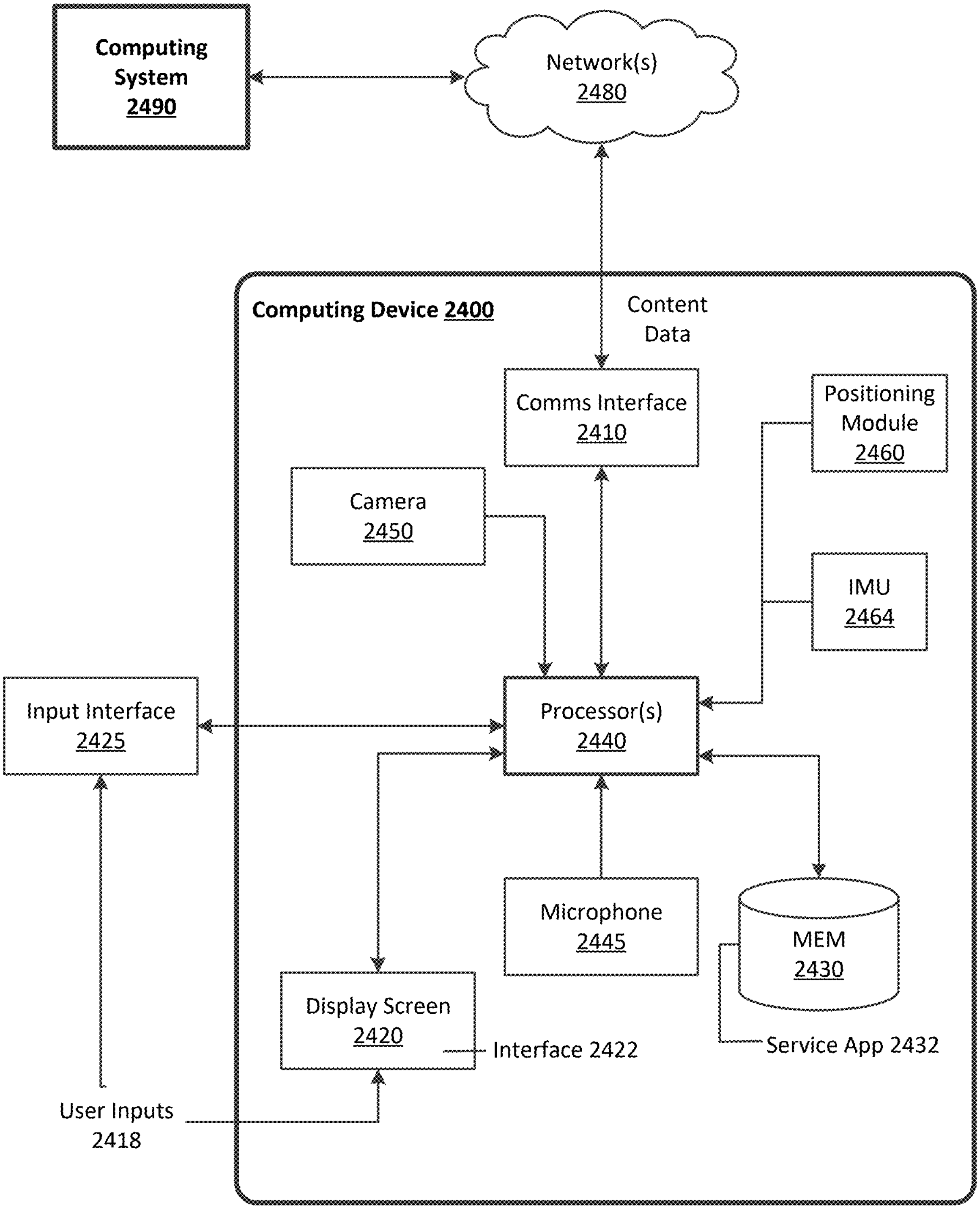
FIG. 24 is a block diagram illustrating an example user computing device, according to examples described herein.

FIG. 24 is a block diagram illustrating an example user computing device, according to examples described herein. In many implementations, the computing device 2400 can comprise a mobile computing device, such as a smartphone, tablet computer, laptop computer, VR or AR headset device, and the like. As such, the computing device 2400 can include telephony features such as a microphone 2445, a camera 2450, and a communication interface 2410 to communicate with external entities using any number of wireless communication protocols. In variations, the computing device 2400 can comprise a personal computer or desktop computer that a user can engage with to access the services implemented by the computing system 100 of FIG. 1, and can include an input interface 2425 that includes, for example, a keyboard and/or mouse to enable a user to provide inputs, such as mouse and typing inputs. The computing device 2400 can further include a positioning module 2460 (e.g., GPS receiver) and an inertial measurement unit 2464 that includes one or more accelerometers, gyroscopes, or magnetometers. In certain aspects, the computing device 2400 can store a designated service application 2432 in a memory 2430 of the computing device 2400. In variations, the memory 2430 can store additional applications executable by one or more processors 2440 of the computing device 2400, enabling access and interaction with one or more host servers over one or more networks 2480.

The computing device 2400 can be operated by a user 194 through execution of the service application 2432, which can enable communications with the computing system 2490 to access the various services described herein. As such, a user can launch the service application 2432 to receive content data that causes a user interface 2422 to be presented on the display screen 2420. The user interface 2422 can present content flows for information gathering, guided content capture, damage IQ interfaces, collision IQ interfaces, injury IQ interfaces, and other adaptive content flows, as described throughout the present disclosure.

As provided herein, the application 2432 can enable a communication link with the computing system 2490 over one or more networks 2480, such as the computing system 100 as shown and described with respect to FIG. 1. The processor 2440 can generate user interface features using content data received from the computing system 2490 over the network 2480. Furthermore, as discussed herein, the application 2432 can enable the computing system 2490 to cause the generated user interface 2422 to be displayed on the display screen 2420 and enable the user to interact with the content flows, as further described herein.

In variations, the user can access one or more interfaces described here through execution of a browser application access to computing system features over the network(s) 2480. In one example, the guided content capture (e.g., during a call session) can be performed through execution of a browser application, such that the user need not download a new application and can enable real-time content verification.

In various examples, the positioning module 2460 can provide location data indicating the current location of the user to the computing system 2490. In further examples, the IMU 2464 can provide IMU data, such as accelerometer data, magnetometer data, and/or gyroscopic data to the computing system 2490 to, for example, enable the computing system 2490 to corroborate contextual information provided in connection with a claim event. In examples described herein, the computing system 2490 can transmit content data to the communication interface 2410 of the computing device 2400 over the network(s) 2480. The content data can cause the executing service application 2432 to display the user interface 2422 for the executing application 2432.

When a particular content flow is presented on the user interface 2422, the user can provide user inputs 2418 to interact with the content flows (e.g., via the display screen 2420 or input interface 2425). The content flows can correspond to information gathering for a claim process that facilitate processing a claim for a user.

Figure 25:
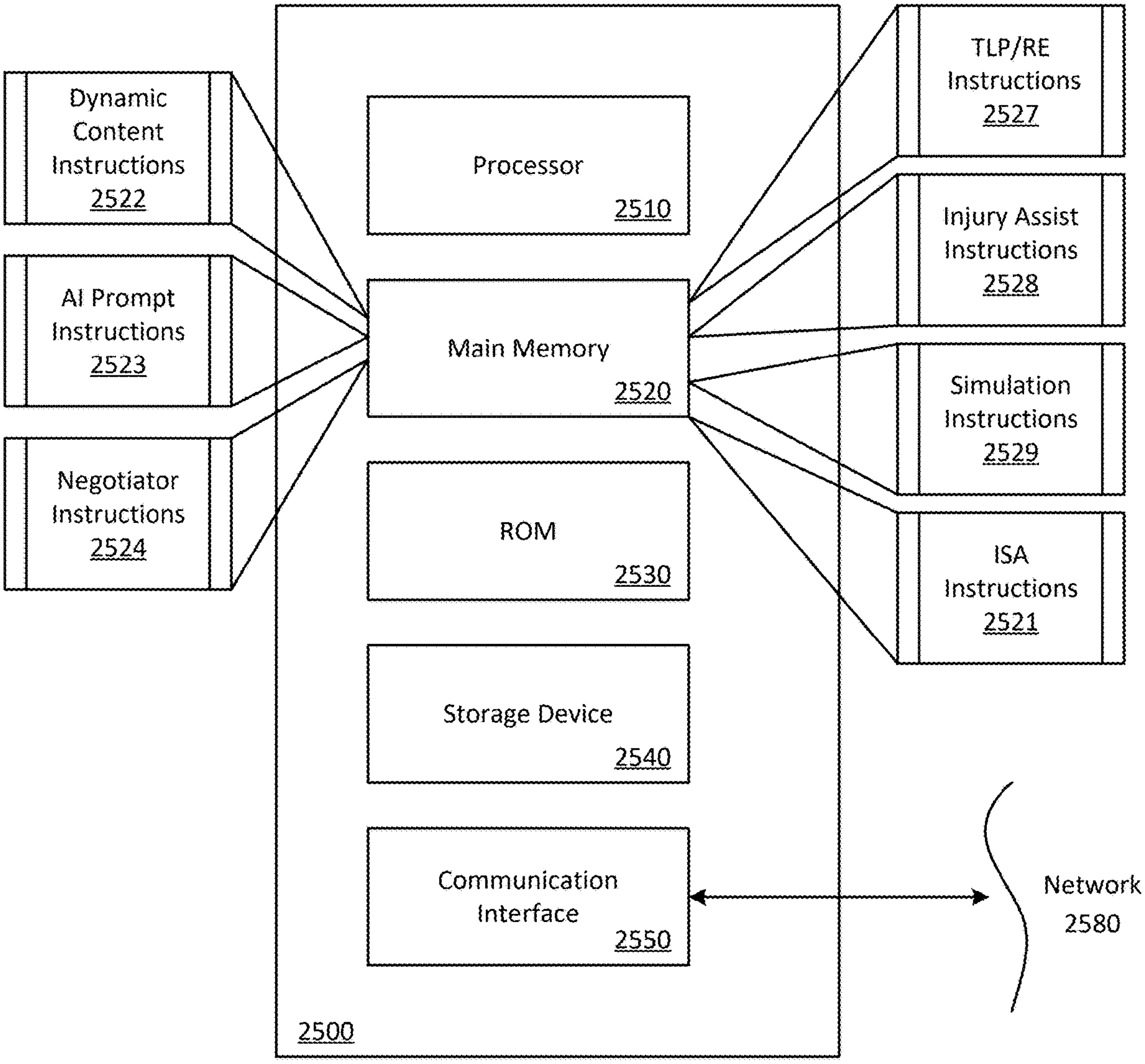
FIG. 25 is a block diagram that illustrates a computer system upon which examples described herein may be implemented.

FIG. 25 is a block diagram that illustrates a computer system 2500 upon which examples described herein may be implemented. A computer system 2500 can be implemented on, for example, a server or combination of servers. For example, the computer system 2500 may be implemented as part of a network service, such as described in connection with FIGS. 1 through 24. In the context of FIG. 1, the computer system 100 may be implemented using a computer system 2500 described in connection with FIG. 25. The computing system 100 may also be implemented using a combination of multiple computer systems as described in connection with FIG. 25.

In one implementation, the computer system 2500 includes processing resources 2510, a main memory 2520, a read-only memory (ROM) 2530, a storage device 2540, and a communication interface 2550. The computer system 2500 includes at least one processor 2510 for processing information stored in the main memory 2520, such as provided by a random-access memory (RAM) or other dynamic storage device that stores information and instructions which are executable by the processor 2510. The main memory 2520 also may be used for storing temporary variables or other intermediate information during execution of instructions to be executed by the processor 2510. The computer system 2500 may also include the ROM 2530 or other static storage device for storing static information and instructions for the processor 2510. A storage device 2540, such as a magnetic disk or optical disk, is provided for storing information and instructions.

The communication interface 2550 enables the computer system 2500 to communicate via one or more networks 2580 (e.g., cellular network) through use of the network link (wireless or wired). Using the network link, the computer system 2500 can communicate with one or more computing devices, one or more servers, and/or one or more databases. In accordance with examples described throughout the present disclosure, the computer system 2500 stores executable instructions stored in the memory 2530, which can include various instructions including dynamic content instructions 2522, AI prompt instructions 2523, negotiator instructions 2524, total loss prediction and reserve estimation instructions 2527, injury assistance instructions 2528, collision simulation instructions 2529, and intelligent service assignment instructions 2521.

By way of example, the instructions and data stored in the memory 2520 can be executed by the processor 2510 to implement the functions of an example computing system 100 of FIG. 1. In various examples, the processor 2510 can execute the dynamic content instructions 2522 to perform dynamic scripting, engagement monitoring, adaptive content flow, digital request, command K, and other dynamic interface generating techniques described throughout the present disclosure. In further examples, the processors 2510 can execute the AI prompt instructions 2523 to generate AI prompts and perform pre and post processing of the AI prompt and LLM summary respectively, as described herein. In further examples, the processors 2510 can execute the negotiator instructions 2524 to perform automated settlement negotiation with a user, or can link with an artificial intelligence engine (e.g., over network 2580) to facilitate negotiations with the user.

In various examples, the processors 2510 can execute the total loss prediction and reserve estimation instructions 2527 to process claim corpus data at any stage and generate loss predictions (e.g., for vehicle damage or property damage) and highly accurate reserve estimates (e.g., exposure risk for policy providers). The processors 2510 can further execute the injury assistance instructions 2528 to provide injured users with individualized claim hub features and recovery assistance. The processors 2510 can further executed the simulation instructions 2529 to generate collision simulations based on inputs provided by one or more individuals (e.g., a driver of a damaged vehicle, passengers, or others involved in the incident). In further examples, the processors 2510 can execute the intelligent service assignment instructions 2521 to create customized service provider rankings based on various parameters pertaining to the claim file and/or user-specific information.

Examples described herein are related to the use of the computer system 2500 for implementing the techniques described herein. According to one example, the techniques are performed by the computer system 2500 in response to the processor 2510 executing one or more sequences of one or more instructions contained in the main memory 2520. Such instructions may be read into the main memory 2520 from another machine-readable medium, such as the storage device 2540. Execution of the sequences of instructions contained in the main memory 2520 causes the processor 2510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:

a network communication interface;

one or more processors; and a memory storing instructions that, when executed by the one or more processors, cause the computing system to perform operations that include:

training one or more injury assistance models to provide, based on incident data provided by users involved in injury events, individualized injury assistance to the users, the training being based on claim information obtained from a plurality of settled claims, the training including;

(i) identifying, from the claim information, each of (a) injury inputs received from claimants, (b) recovery information for each claimant, (c) initial reserve estimates determined for the claimants based on their injury inputs, and (d) finalized settlement offers provided to claimants;

(ii) for each settled claim of the plurality of settled claims, determining a discrepancy between an initial reserve estimate determined for a claimant of the settled claim, and a finalized settlement offer provided to the claimant; and (iii) tuning the one or more injury assistance models based on the determined discrepancies;

receiving, over one or more networks, incident data identifying an injury to a user; and executing the one or more injury assistance models on the incident data to provide individualized injury assistance to the user while the user recovers from the injury, wherein the executing generates a set of predictive determinations for a treatment plan for the user's recovery; and based on the predictive determinations, performing point-in-time check-ins with the user.

2. The computing system of claim 1, wherein the operations include:

simulating an event that caused the injury to the user based at least in part on the incident data provided by the user; and corroborating the injury to the user based on the simulation.

3. The computing system of claim 2, wherein the operations include:

verifying recovery update information provided by the user by accessing medical data of the user and verifying whether the recovery update information matches the medical data.

4. A non-transitory computer readable medium storing instructions that, when executed by one or more processors of a computing system, cause the computing system to perform operations that include:

training one or more injury assistance models to provide, based on incident data provided by users involved in injury events, individualized injury assistance to the users, the training being based on claim information obtained from a plurality of settled claims, the training including:

(i) identifying, from the claim information, each of (a) injury inputs received from claimants, (b) recovery information for each claimant, (c) initial reserve estimates determined for the claimants based on their injury inputs, and (d) finalized settlement offers provided to claimants;

(ii) for each settled claim of the plurality of settled claims, determining a discrepancy between an initial reserve estimate determined for a claimant of the settled claim, and a finalized settlement offer provided to the claimant; and (iii) tuning the one or more injury assistance models based on the determined discrepancies;

receiving, over one or more networks, incident data identifying an injury to a user; and executing the one or more injury assistance models on the incident data to provide individualized injury assistance to the user while the user recovers from the injury, wherein the executing generates a set of predictive determinations for a treatment plan for the user's recovery; and based on the predictive determinations, performing point-in-time check-ins with the user.

5. The non-transitory computer readable medium of claim 4, wherein the operations include:

simulating an event that caused the injury to the user based at least in part on the incident data provided by the user; and corroborating the injury to the user based on the simulation.

6. The non-transitory computer readable medium of claim 5, wherein the operations include:

verifying recovery update information provided by the user by accessing medical data of the user and verifying whether the recovery update information matches the medical data.

7. A computer-implemented method of providing automated injury assistance, the method being performed by one or more processors and comprising:

training one or more injury assistance models to provide, based on incident data provided by users involved in injury events individualized injury assistance to the users, the training being based on claim information obtained from a plurality of settled claims, the training including:

(i) identifying, from the claim information, each of (a) injury inputs received from claimants, (b) recovery information for each claimant, (c) initial reserve estimates determined for the claimants based on their injury inputs, and (d) finalized settlement offers provided to claimants;

(ii) for each settled claim of the plurality of settled claims, determining a discrepancy between an initial reserve estimate determined for a claimant of the settled claim, and a finalized settlement offer provided to the claimant; and (iii) tuning the one or more injury assistance models based on the determined discrepancies;

receiving, over one or more networks, incident data identifying an injury to a user; and executing the one or more injury assistance models on the incident data to provide individualized injury assistance to the user while the user recovers from the injury, wherein the executing generates a set of predictive determinations for a treatment plan for the user's recovery; and based on the predictive determinations, performing point-in-time check-ins with the user.

8. The method of claim 7, wherein the method includes:

simulating an event that caused the injury to the user based at least in part on the incident data provided by the user; and corroborating the injury to the user based on the simulation.

* * * * *